(12) United States Patent
Duan et al.

(10) Patent No.: US 12,058,027 B2
(45) Date of Patent: Aug. 6, 2024

(54) PACKET TRANSMISSION METHOD, CORRESPONDENCE OBTAINING METHOD, APPARATUS, AND SYSTEM

(71) Applicant: Huawei Technologies Co., Ltd., Shenzhen (CN)

(72) Inventors: Fanghong Duan, Nanjing (CN); Jingrong Xie, Beijing (CN); Zhidan Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/327,563

(22) Filed: Jun. 1, 2023

(65) Prior Publication Data
US 2023/0318966 A1    Oct. 5, 2023

Related U.S. Application Data

(63) Continuation of application No. PCT/CN2021/116686, filed on Sep. 6, 2021.

(30) Foreign Application Priority Data

Dec. 2, 2020 (CN) .......... 202011393626.5
Mar. 30, 2021 (CN) .......... 202110343220.4

(51) Int. Cl.
*H04L 45/16* (2022.01)
*H04L 12/46* (2006.01)
*H04L 45/741* (2022.01)

(52) U.S. Cl.
CPC .......... *H04L 45/16* (2013.01); *H04L 12/4641* (2013.01); *H04L 45/741* (2013.01); *H04L 2212/00* (2013.01)

(58) Field of Classification Search
CPC ... H04L 45/16; H04L 12/4641; H04L 45/741; H04L 2212/00
USPC ......................................................... 370/392
See application file for complete search history.

(56) References Cited

U.S. PATENT DOCUMENTS

| | | | |
|---|---|---|---|
| 9,712,458 B2 | 7/2017 | Wijnands et al. | |
| 9,832,031 B2 | 11/2017 | Zhao et al. | |
| 10,003,494 B2 | 6/2018 | Wijnands et al. | |
| 10,158,566 B2 * | 12/2018 | Lakshmikanthan | .. H04L 12/465 |

(Continued)

FOREIGN PATENT DOCUMENTS

| | | |
|---|---|---|
| CN | 110784411 A | 2/2020 |
| CN | 111147383 A | 5/2020 |
| EP | 3734906 A1 | 11/2020 |

OTHER PUBLICATIONS

Z. Zhang et al, BIER Prefix Redistribute, draft-ietf-bier-prefix-redistribute-00, BIER Internet-Draft, Aug. 4, 2020, 23 pages.

(Continued)

*Primary Examiner* — Melvin H Pollack
(74) *Attorney, Agent, or Firm* — Slater Matsil, LLP

(57) ABSTRACT

This application provides a packet transmission method, a correspondence obtaining method, and an apparatus and a system that are related to the foregoing method. For the packet transmission method, a first PE receives a first BIER packet sent by a first CE, determines, based on the received first BIER packet, a first VPN to which the first CE belongs, and transmits the first BIER packet based on the first VPN.

20 Claims, 18 Drawing Sheets

(56) References Cited

U.S. PATENT DOCUMENTS

| | | | |
|---|---|---|---|
| 10,164,794 B2* | 12/2018 | Wijnands | H04L 45/745 |
| 10,212,069 B2* | 2/2019 | Hasani | H04L 45/16 |
| 10,218,524 B2* | 2/2019 | Wijnands | H04L 12/18 |
| 10,270,809 B2* | 4/2019 | Williams | H04L 12/4641 |
| 10,432,425 B2* | 10/2019 | Wang | H04L 12/4625 |
| 10,476,691 B2 | 11/2019 | Xu | |
| 10,574,589 B2 | 2/2020 | Kotalwar et al. | |
| 10,608,922 B2* | 3/2020 | Dutta | H04L 12/1854 |
| 10,616,063 B1* | 4/2020 | Dutta | H04L 65/611 |
| 10,630,743 B2* | 4/2020 | Wijnands | H04L 61/103 |
| 10,637,675 B2* | 4/2020 | Wijnands | H04L 12/1886 |
| 10,644,900 B2* | 5/2020 | Zhang | H04L 12/1836 |
| 10,680,945 B1* | 6/2020 | Ye | H04L 12/4641 |
| 10,764,082 B2* | 9/2020 | Bidgoli | H04L 12/2861 |
| 10,771,380 B2* | 9/2020 | Jonnalagadda | H04L 45/28 |
| 10,841,111 B2* | 11/2020 | Zhang | H04L 45/16 |
| 10,855,576 B2 | 12/2020 | Zhang et al. | |
| 10,873,524 B2* | 12/2020 | Allan | H04L 45/122 |
| 10,887,209 B2 | 1/2021 | Nainar et al. | |
| 10,931,478 B2* | 2/2021 | Nunes | H04L 12/4633 |
| 10,999,137 B2* | 5/2021 | Cidon | H04L 43/026 |
| 11,025,689 B1* | 6/2021 | Bidgoli | H04L 65/611 |
| 11,038,790 B2 | 6/2021 | Nainar et al. | |
| 11,050,587 B1* | 6/2021 | Norbutas | H04L 12/4633 |
| 11,050,657 B2* | 6/2021 | Zhang | H04L 12/184 |
| 11,070,464 B2 | 7/2021 | Goud Gadela et al. | |
| 11,075,833 B2* | 7/2021 | Xiong | H04L 45/16 |
| 11,102,107 B1* | 8/2021 | Mishra | H04L 45/04 |
| 11,115,329 B1 | 9/2021 | Mishra et al. | |
| 11,184,192 B2* | 11/2021 | Huang | H04L 45/02 |
| 11,196,580 B2* | 12/2021 | Peng | H04L 12/185 |
| 11,233,724 B2 | 1/2022 | Xie et al. | |
| 11,296,983 B1* | 4/2022 | Dutta | H04L 45/302 |
| 11,362,941 B2* | 6/2022 | Dutta | H04L 45/16 |
| 11,374,862 B2* | 6/2022 | Wang | H04L 12/4633 |
| 11,394,578 B2 | 7/2022 | Bidgoli et al. | |
| 11,394,635 B2* | 7/2022 | Mahadevan | H04L 61/5069 |
| 11,398,983 B2* | 7/2022 | Wijnands | H04L 47/125 |
| 11,405,307 B2 | 8/2022 | Zhang et al. | |
| 11,451,474 B2* | 9/2022 | Wijnands | H04L 45/7453 |
| 11,483,237 B2* | 10/2022 | Dutta | H04L 47/724 |
| 11,522,980 B2* | 12/2022 | Bleidorn | H04L 12/2859 |
| 11,621,914 B2* | 4/2023 | Barman | H04L 45/60 370/392 |
| 11,627,017 B2* | 4/2023 | Boutros | H04L 45/16 370/254 |
| 11,627,070 B2* | 4/2023 | Zhu | H04L 45/16 370/389 |
| 11,705,983 B2* | 7/2023 | Mishra | H04L 45/745 370/389 |
| 11,792,044 B2* | 10/2023 | Dutta | H04L 12/4641 370/254 |
| 2018/0205636 A1* | 7/2018 | Hu | H04L 47/825 |
| 2019/0182155 A1* | 6/2019 | Chang | H04L 45/24 |
| 2019/0356500 A1 | 11/2019 | Wijnands et al. | |
| 2019/0386837 A1* | 12/2019 | Zhang | H04L 12/18 |
| 2020/0106628 A1* | 4/2020 | Nainar | H04L 12/18 |
| 2020/0245206 A1 | 7/2020 | Allan | |
| 2021/0243111 A1* | 8/2021 | Dutta | H04L 45/745 |
| 2021/0367883 A1* | 11/2021 | Zhang | H04L 41/122 |
| 2022/0045938 A1 | 2/2022 | Senoo et al. | |
| 2022/0150155 A1* | 5/2022 | Xiong | H04L 45/12 |
| 2023/0040579 A1* | 2/2023 | Peng | H04L 45/50 |
| 2023/0127464 A1* | 4/2023 | Xiong | H04L 69/22 709/238 |
| 2023/0155932 A1* | 5/2023 | Zhang | H04L 45/04 709/238 |
| 2023/0231780 A1* | 7/2023 | Qiu | H04L 12/1863 370/252 |
| 2023/0291682 A1* | 9/2023 | Zhu | H04L 45/586 |
| 2023/0336459 A1 | 10/2023 | Zhang et al. | |

OTHER PUBLICATIONS

Request for Comments: 5130, S. Previdi et al, A Policy Control Mechanism in IS-IS Using Administrative Tags, Network Working Group, Feb. 2008, 8 pages.

Request for Comments: 8401, L. Ginsberg, Ed. et al, Bit Index Explicit Replication (BIER) Support via IS-IS, Internet Engineering Task Force (IETF), Jun. 2018, 12 pages.

Request for Comments: 8444, P. Psenak, Ed. et al, OSPFv2 Extensions for Bit Index Explicit Replication (BIER), Nov. 2018, Nov. 2018, 12 pages.

Request for Comments: 8556, E. Rosen, Ed. et al, Multicast VPN Using Bit Index Explicit Replication (BIER), Internet Engineering Task Force (IETF), Apr. 2018, 17 pages.

Request for Comments: 8279, IJ. Wijnands, Ed. et al, Multicast Using Bit Index Explicit Replication (BIER), Internet Engineering Task Force (IETF), Nov. 2017, 43 pages.

Z. Zhang et al, Multicast/BIER As A Service, draft-zzhang-bier-multicast-as-a-service-01, Internet-Draft, May 24, 2020, 24 pages.

* cited by examiner

Table 1: Information list formed based on BIER information advertised between PEs

| Local VPN identifier | BFR ID | Next hop | Neighbor type |
|---|---|---|---|
| First VPN instance | 4 | CE 4 | Direct connection |
| First VPN instance | 2 | PE 2 | Remote |
| First VPN instance | 3 | PE 3 | Remote |

Table 2: Correspondence (where bold fonts are key fields)

| Local VPN identifier | Bit mask | Outbound interface | Remote VPN identifier | Next hop | |
|---|---|---|---|---|---|
| First VPN instance | 1000 | PE 1 to CE 4 | Invalid | CE 4 | → First relationship |
| First VPN instance | 0010 | Invalid | BS-ID PE 2 | PE 2 | ⎫ Second relationship |
| First VPN instance | 0100 | Invalid | BS-ID PE 3 | PE 3 | ⎭ |

FIG. 5

```
+-+-+-+-+-+-+-+-+-+-+-+-+-+-+-+-+-+-+-+-+-+-+-+-+-+-+-+-+-+-+-+-+
|            Type (type)            |         Length (length)          |
+-+-+-+-+-+-+-+-+-+-+-+-+-+-+-+-+-+-+-+-+-+-+-+-+-+-+-+-+-+-+-+-+
|Type length value type|      Length            |   Reserved field    |
|      (tlv type)      |                        |    (reserved) 0     |
+-+-+-+-+-+-+-+-+-+-+-+-+-+-+-+-+-+-+-+-+-+-+-+-+-+-+-+-+-+-+-+-+
| Sub-type length value | Sub-type length value length |                    |
| type (sub-tlv type)=1 |      (sub-tlv length)        |  Reserved field 0  |
+-+-+-+-+-+-+-+-+-+-+-+-+-+-+-+-+-+-+-+-+-+-+-+-+-+-+-+-+-+-+-+-+
//              BIER service identifier (BS-id)                  //
+-+-+-+-+-+-+-+-+-+-+-+-+-+-+-+-+-+-+-+-+-+-+-+-+-+-+-+-+-+-+-+-+
```

FIG. 6

```
+-+-+-+-+-+-+-+-+-+-+-+-+-+-+-+-+-+-+-+-+-+-+-+-+-+-+-+-+-+-+-+-+
|    Sub-sub-type (sub-sub-type) 1     |        Length (length)        |
+-+-+-+-+-+-+-+-+-+-+-+-+-+-+-+-+-+-+-+-+-+-+-+-+-+-+-+-+-+-+-+-+
|   Maximum SI   |      BS Len         |            BIFT-id            |
+-+-+-+-+-+-+-+-+-+-+-+-+-+-+-+-+-+-+-+-+-+-+-+-+-+-+-+-+-+-+-+-+
|                                     ...                                     |
+-+-+-+-+-+-+-+-+-+-+-+-+-+-+-+-+-+-+-+-+-+-+-+-+-+-+-+-+-+-+-+-+
```

FIG. 22

```
+-+-+-+-+-+-+-+-+-+-+-+-+-+-+-+-+-+-+-+-+-+-+-+-+-+-+-+-+-+-+-+-+
|           Sub-sub-type 2             |        Length (length)        |
+-+-+-+-+-+-+-+-+-+-+-+-+-+-+-+-+-+-+-+-+-+-+-+-+-+-+-+-+-+-+-+-+
|                                                                              |
|                              IPv6 address                                    |
|                                                                              |
+-+-+-+-+-+-+-+-+-+-+-+-+-+-+-+-+-+-+-+-+-+-+-+-+-+-+-+-+-+-+-+-+
```

FIG. 23

| Route distinguisher (RD) (8 octets) |
| Internet protocol prefix length (IP prefix length) |
| Internet protocol prefix (IP prefix) |
| Identifier (flags) |
| Originating router IP address (originating router IP address) |

```
  7   6   5   4   3   2   1   0
+---+---+---+---+---+---+---+---+
|   Reserved field (reserved)   | L |
+---+---+---+---+---+---+---+---+
```

FIG. 24

PACKET TRANSMISSION METHOD, CORRESPONDENCE OBTAINING METHOD, APPARATUS, AND SYSTEM

CROSS-REFERENCE TO RELATED APPLICATIONS

This application is a continuation of International Application No. PCT/CN2021/116686, filed on Sep. 6, 2021, which claims priorities to Chinese Patent Application No. 202011393626.5, filed on Dec. 2, 2020, and Chinese Patent Application No. 202110343220.4, filed on Mar. 30, 2021. All of the aforementioned applications are hereby incorporated by reference in their entireties.

TECHNICAL FIELD

Embodiments of this application relate to the field of communication technologies, and in particular, to a packet transmission method, a correspondence obtaining method, an apparatus, and a system.

BACKGROUND

A bit index explicit replication (BIER) technology is a technology that has been proposed in the communication field in recent years and that is used to construct a multicast packet forwarding path. In this technology, a multicast distribution tree does not need to be constructed, and efficient point-to-multipoint data transmission in a network is implemented. This effectively reduces a network bandwidth and reduces a network load.

In a related technology, the BIER technology is deployed in a provider network, and a protocol independent multicast (PIM) protocol is deployed in a customer network, so that packets between different customer sides in the customer network can be transmitted in the provider network by using the BIER technology. However, currently, it is limited that the BIER technology is merely applied to the provider network, and sites in the customer network cannot be supported to communicate with each other by using the BIER technology. In addition, the provider network needs to maintain a large quantity of packets. As a result, the network is overloaded and extensibility is not strong.

SUMMARY

This application provides a packet transmission method, a correspondence obtaining method, an apparatus, and a system, to transmit a BIER packet between user equipment across a provider network. This improves network extensibility and reduces a load of the provider network.

According to a first aspect, a packet transmission method is provided. The method is applied to a first provider edge (PE), and includes: The first PE receives a first BIER packet sent by a first customer edge (CE); the first PE determines, based on the received first BIER packet, a first virtual private network (VPN) to which the first CE belongs; and the first PE transmits the first BIER packet based on the first VPN. The first PE may determine, based on a VPN bound to an interface for receiving the first BIER packet, that the first CE belongs to the first VPN, and may also determine, based on indication information in the first BIER packet, that the first CE belongs to the first VPN.

According to the technical solution provided in this application, different customer networks are distinguished by using VPNs, and a BIER packet is forwarded in the VPN networks. In this way, the BIER packet is transmitted across a provider network, thereby improving network extensibility and reducing a load of the provider network.

In a possible implementation, an implementation in which the first PE transmits the first BIER packet based on the first VPN includes: The first PE determines a first forwarding bit mask based on the first VPN and a first relationship, and transmits the first BIER packet based on the first forwarding bit mask. The first relationship includes a correspondence between an identifier of the first VPN and the first forwarding bit mask, the first forwarding bit mask is obtained based on a bit-forwarding router identifier (BFR ID) of a second CE receiving the first BIER packet, and the second CE is a device in the first VPN. For example, the second CE is a device located at a same site as the first CE, and the second CE may be connected to the first PE in a direct connection manner or an indirect connection manner. The first relationship includes the correspondence between the first forwarding bit mask obtained based on the BFR ID of the second CE and the identifier of the first VPN, and the second CE is a device in the first VPN. Therefore, the first PE may determine the first forwarding bit mask based on the first VPN and the first relationship, and transmit the first BIER packet from the first CE to the second CE based on the first forwarding bit mask.

In a possible implementation, an implementation in which the first PE transmits the first BIER packet based on the first VPN includes: The first PE determines a second forwarding bit mask and a second identifier based on the first VPN and a second relationship, and transmits the first BIER packet based on the second forwarding bit mask, where the second relationship includes a correspondence between the second forwarding bit mask, an identifier of the first VPN, and the second identifier, the second forwarding bit mask is obtained based on a BFR ID of a third CE receiving the first BIER packet, the second identifier is used by a second PE to identify the first VPN to which the first BIER packet belongs, and the third CE receives the first BIER packet via the second PE. It may be understood that the second PE is a remote device of the first PE, and the third CE is connected to the second PE in a direct connection manner or an indirect connection manner. The first PE can determine the second relationship based on the first VPN, the second relationship includes the correspondence between the second forwarding bit mask, the identifier of the first VPN, and the second identifier, and the second PE can identify, based on the second identifier, the first VPN to which the first BIER packet belongs. Therefore, the third CE can receive the first BIER packet via the second PE, and transmit the first BIER packet the first CE to the third CE.

In a possible implementation, the first relationship further includes a first packet encapsulation type field. The first PE encapsulates the first BIER packet based on a first encapsulation type indicated by the first packet encapsulation type field in the first relationship, to obtain a second BIER packet, and transmits the second BIER packet to the second CE based on the first forwarding bit mask. A packet encapsulation type field is carried in the first relationship, so that the first PE can quickly determine an encapsulation type, to further improve transmission efficiency of the first BIER packet.

In a possible implementation, the second relationship further includes a second packet encapsulation type field. The first PE encapsulates the first BIER packet based on a second encapsulation type indicated by the second packet encapsulation type field in the second relationship, to obtain a third BIER packet, and transmits the third BIER packet to the second PE based on the second forwarding bit mask, where the third BIER packet includes the second identifier. A packet encapsulation type field is carried in the second relationship, so that the first PE can quickly determine an encapsulation type, to further improve transmission efficiency of the first BIER packet.

In a possible implementation, the first encapsulation type includes: BIER over internet protocol version 6 (IPv6) unicast, BIER over BIER multicast BIERv6, BIER over IPv6 multicast, BIER over internet protocol version 4 (IPv4) unicast, BIER over BIER, BIER over IPv4 multicast, or BIER over multi-protocol label switching (MPLS) multicast.

In a possible implementation, the second encapsulation type includes: BIER over IPv6 unicast, BIER over BIER multicast BIERv6, BIER over IPv6 multicast, BIER over IPv4 unicast, BIER over BIER, BIER over IPv4 multicast, or BIER over multi-protocol label switching MPLS multicast.

In a possible implementation, when the second encapsulation type includes the BIER over IPv6 unicast, a destination address field of the third BIER packet includes the second identifier; or when the second encapsulation type includes the BIER over MPLS multicast, an MPLS label of the third BIER packet includes the second identifier.

In a possible implementation, the first PE is located in a first network and a provider network, the provider network is connected to the first network and a second network, and the first CE is located in the first network.

In a possible implementation, the second PE is located in a second network and a provider network.

According to a second aspect, a packet transmission method is provided. The method is applied to a second PE, and includes: The second PE receives a third BIER packet transmitted by a first PE, where the third BIER packet includes a second identifier, and the second identifier is used by the second PE to identify a VPN to which the third BIER packet belongs. Therefore, the second PE can determine, based on the second identifier, that the VPN to which the third BIER packet belongs is a first VPN. The second PE can determine the third relationship based on the first VPN, and then transmit the third BIER packet based on the third relationship. The third BIER packet includes the second identifier, the second PE can distinguish, by using the second identifier, the VPN to which the third BIER packet belongs. Therefore, the third relationship to be used can be further determined, and the BIER packet can be forwarded in the VPN based on the third relationship. In this way, a BIER technology is directly deployed on a CE, and the BIER packet can be transmitted across a provider network, thereby improving network extensibility and reducing a load of the provider network.

In a possible implementation, the third relationship includes a third forwarding bit mask, an identifier of the first VPN, and a packet encapsulation type field. The third forwarding bit mask is obtained based on a bit-forwarding router identifier BFR ID of a third CE receiving the third BIER packet. The identifier of the first VPN is used by the second PE to identify the first VPN. The third CE receives the third BIER packet via the second PE. An implementation in which the second PE transmits the third BIER packet based on the third relationship includes: The second PE encapsulates the third BIER packet based on a third encapsulation type indicated by the packet encapsulation type field in the third relationship, to obtain a fourth BIER packet. The second PE transmits the fourth BIER packet to the third CE based on the third forwarding bit mask.

In a possible implementation, the third encapsulation type includes: BIER over IPv6 unicast, BIER over BIER multicast BIERv6, BIER over IPv6 multicast, BIER over IPv4 unicast, BIER over BIER, BIER over IPv4 multicast, or BIER over MPLS multicast.

According to a third aspect, a packet transmission apparatus is provided. The apparatus is used in a first PE. The apparatus includes: a receiving module, configured to receive a first BIER packet sent by a first CE; a determining module, configured to determine, based on the received first BIER packet, a first VPN to which the first CE belongs; and a transmission module, configured to transmit the first BIER packet based on the first VPN.

In a possible implementation, the transmission module is configured to: determine a correspondence based on the first VPN, and transmit the first BIER packet based on the correspondence, where the correspondence includes at least one of a first relationship and a second relationship; the first relationship includes a correspondence between an identifier of the first VPN and a first forwarding bit mask, the first forwarding bit mask is obtained based on a bit-forwarding router identifier BFR ID of a second CE receiving the first BIER packet, and the second CE is a device in the first VPN; and the second relationship includes a correspondence between a second forwarding bit mask, the identifier of the first VPN, and a second identifier, the second forwarding bit mask is obtained based on a BFR ID of a third CE receiving the first BIER packet, the second identifier is used by a second PE to identify the first VPN to which the first BIER packet belongs, and the third CE receives the first BIER packet via the second PE.

In a possible implementation, the transmission module is configured to: determine the first forwarding bit mask based on the first VPN and the first relationship, and transmit the first BIER packet based on the first forwarding bit mask.

In a possible implementation, the transmission module is configured to: determine the second forwarding bit mask and the second identifier based on the first VPN and the second relationship, and transmit the first BIER packet based on the second forwarding bit mask.

In a possible implementation, the first relationship further includes a first packet encapsulation type field. The transmission module is configured to: encapsulate the first BIER packet based on a first encapsulation type indicated by the first packet encapsulation type field in the first relationship, to obtain a second BIER packet, and transmit the second BIER packet to the second CE based on the first forwarding bit mask.

In a possible implementation, the second relationship further includes a second packet encapsulation type field. The transmission module is configured to: encapsulate the first BIER packet based on a second encapsulation type indicated by the second packet encapsulation type field in the second relationship, to obtain a third BIER packet, and transmit the third BIER packet to the second PE based on the second forwarding bit mask, where the third BIER packet includes the second identifier.

In a possible implementation, the first encapsulation type includes: BIER over IPv6 unicast, BIER over BIER multicast BIERv6, BIER over IPv6 multicast, BIER over IPv4 unicast, BIER over BIER, BIER over IPv4 multicast, or BIER over multi-protocol label switching MPLS multicast.

In a possible implementation, the second encapsulation type includes: BIER over IPv6 unicast, BIER over BIER multicast BIERv6, BIER over IPv6 multicast, BIER over IPv4 unicast, BIER over BIER, BIER over IPv4 multicast, or BIER over multi-protocol label switching MPLS multicast.

In a possible implementation, when the second encapsulation type includes the BIER over IPv6 unicast, a destination address field of the third BIER packet includes the second identifier; or when the second encapsulation type includes the BIER over MPLS multicast, an MPLS label of the third BIER packet includes the second identifier.

In a possible implementation, the first PE is located in a first network and a provider network, the provider network is connected to the first network and a second network, and the first CE is located in the first network.

In a possible implementation, the second PE is located in the second network and the provider network.

According to a fourth aspect, a packet transmission apparatus is provided. The apparatus is used in a second PE. The apparatus includes: a receiving module, configured to receive a third BIER packet transmitted by a first PE, where the third BIER packet includes a second identifier, and the second identifier is used by the second PE to identify a VPN to which the third BIER packet belongs; a determining module, configured to: determine, based on the second identifier, that the VPN to which the third BIER packet belongs is a first VPN, and determine a third relationship based on the first VPN; and a transmission module, configured to transmit the third BIER packet based on the third relationship.

In a possible implementation, the third relationship includes a third forwarding bit mask, an identifier of the first VPN, and a packet encapsulation type field, the third forwarding bit mask is obtained based on a bit-forwarding router identifier BFR ID of a third CE receiving the third BIER packet, the identifier of the first VPN is used by the second PE to identify the first VPN, and the third CE receives the third BIER packet via the second PE; and the transmission module is configured to: encapsulate the third BIER packet based on a third encapsulation type indicated by the packet encapsulation type field in the third relationship, to obtain a fourth BIER packet, and transmit the fourth BIER packet to the third CE based on the third forwarding bit mask.

In a possible implementation, the third encapsulation type includes: BIER over IPv6 unicast, BIER over BIER multicast BIERv6, BIER over IPv6 multicast, BIER over IPv4 unicast, BIER over BIER, BIER over IPv4 multicast, or BIER over MPLS multicast.

According to a fifth aspect, a packet transmission device is provided. The packet transmission device includes a processor, the processor is coupled to a memory, the memory stores at least one instruction, and the at least one instruction is loaded and executed by the processor, to enable the packet transmission device to implement the packet transmission method according to any one of the first aspect and the second aspect or any one of the possible implementations of the first aspect and the second aspect.

According to a sixth aspect, a computer-readable storage medium is provided. The computer-readable storage medium stores at least one instruction, and the instruction is loaded and executed by a processor, to enable a computer to implement the packet transmission method according to any one of the first aspect and the second aspect or any one of the possible implementations of the first aspect and the second aspect.

According to a seventh aspect, a computer program product is provided, and includes a computer program or code. When the computer program or the code are or is executed by a computer, the packet transmission method according to any one of the first aspect and the second aspect or any one of the possible implementations of the first aspect and the second aspect is implemented.

According to an eighth aspect, a communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform the packet transmission method according to any one of the first aspect and the second aspect or any one of the possible implementations of the first aspect and the second aspect.

In an example embodiment, there are one or more processors, and there are one or more memories.

In an example embodiment, the memory and the processor may be integrated together, or the memory and the processor are disposed separately.

In a specific implementation process, the memory may be a non-transitory memory, for example, a read-only memory (ROM), and the memory and the processor may be integrated on a same chip, or may be separately disposed on different chips. A type of the memory and a manner of disposing the memory and the processor are not limited in this embodiment of this application.

According to a ninth aspect, a chip is provided, and includes a processor, configured to: invoke, from a memory, instructions stored in the memory and run the instructions, to enable a communication device on which the chip is installed to perform the packet transmission method according to any one of the first aspect and the second aspect or any one of the possible implementations of the first aspect and the second aspect.

According to a tenth aspect, another chip is provided, and includes an input interface, an output interface, a processor, and a memory. The input interface, the output interface, the processor, and the memory are connected through an internal connection path. The processor is configured to execute code in the memory, and when the code is executed, the processor is configured to perform the packet transmission method according to any one of the first aspect and the second aspect or any one of the possible implementations of the first aspect and the second aspect.

According to an eleventh aspect, a packet transmission system is provided. The packet transmission system includes a first provider edge PE and a second PE. The first PE performs the packet transmission method according to any one of the first aspect and the second aspect or any one of the possible implementations of the first aspect and the second aspect. The second PE performs the packet transmission method according to any one of the first aspect and the second aspect or any one of the possible implementations of the first aspect and the second aspect. The second PE receives a packet sent by the first PE.

This application further provides a correspondence obtaining method, an apparatus, and a system, to transmit a BIER packet between user equipment across a provider network. This improves network extensibility and reduces a load of the provider network.

According to a twelfth aspect, a correspondence obtaining method is provided. The method is applied to a first PE, and includes: The first PE obtains BIER information, where the BIER information includes at least one of first BIER information and second BIER information, the first BIER information includes BIER information of a second CE, the second BIER information includes BIER information of a second PE and BIER information of a third CE that are sent by the second PE, and the second CE and the third CE are devices in a first VPN; and the first PE determines a correspondence based on the BIER information, where the correspondence is used by the first PE to transmit a BIER packet.

According to the technical solution provided in this application, different customer networks are distinguished by using VPNs, and the correspondence for transmitting the BIER packet is determined based on the BIER information, to forward the BIER packet in the VPNs, and transmit the BIER packet across a provider network. This improves network extensibility and reduces a load of the provider network.

In a possible implementation, the correspondence includes at least one of a first relationship and a second relationship.

The first relationship includes a first forwarding bit mask and an identifier of the first VPN, the first forwarding bit mask is obtained based on a bit-forwarding router identifier BFR ID of the second CE, and the identifier of the first VPN is used by the first PE to identify the first VPN to which the second CE belongs.

The second relationship includes a second forwarding bit mask, an identifier of the first VPN, and a second identifier, the second forwarding bit mask is obtained based on a BFR ID of the third CE, and the second identifier is used by the second PE to identify a VPN to which the BIER packet belongs. The BIER packet may be transmitted from a first CE to the second CE by using the first relationship, and the BIER packet may be transmitted from the first CE to the third CE by using the second relationship.

In a possible implementation, the BIER information of the second CE includes the BFR ID of the second CE; and an implementation in which the first PE determines a correspondence based on the BIER information includes: The first PE determines the first forwarding bit mask based on the BFR ID of the second CE, determines the identifier of the first VPN based on a VPN bound to a connection interface between the first PE and the second CE, and determines the first relationship based on the first forwarding bit mask and the identifier of the first VPN.

In a possible implementation, the BIER information of the second PE includes the second identifier, the BIER information of the second PE further includes at least one of a route distinguisher (RD) and a route target (RT), the RD and the RT identify a VPN, and the BIER information of the third CE includes the BFR ID of the third CE; and an implementation in which the first PE determines a correspondence based on the BIER information includes: The first PE determines the second forwarding bit mask based on the BFR ID of the third CE, determines the identifier of the first VPN based on the RD or the RT, determines the second identifier based on the BIER information of the second PE, and determines the second relationship based on the second forwarding bit mask, the identifier of the first VPN, and the second identifier.

In a possible implementation, the BIER information of the second PE further includes an originating router IP address of the second PE; and the determining the second identifier based on the BIER information of the second PE includes: determining, based on the originating router IP address in the BIER information of the second PE, that the second PE is used as a remote neighbor of the first PE, where the second PE includes the originating router IP address that is the same as that of the third CE; and determining the second identifier based on the BIER information of the second PE.

In a possible implementation, after the first PE obtains bit index explicit replication BIER information, the method further includes: The first PE generates a link state database based on the BIER information of the third CE; and the first PE advertises the link state database to a first CE, where the first CE is a device in the first VPN. The first PE advertises, to the first CE, the link state database generated based on the BIER information of the third CE, so that the first CE can obtain the BIER information of the third CE in time.

In a possible implementation, an implementation in which the first PE generates a link state database based on the BIER information of the third CE includes: The first PE generates the link state database based on the BFR ID of the third CE being valid. The first PE generates the link state database only when the BFR ID of the third CE is valid, so that a quantity of pieces of BIER information to be advertised can be reduced, and resources can be saved.

In a possible implementation, the advertising the link state database to a first CE includes: sending first signaling to the first CE, where the first signaling carries the link state database. The first signaling includes BIER via border gateway protocol BGP signaling, BIER via intermediate system to intermediate system protocol ISIS signaling, or BIER via open shortest path first protocol OSPF signaling.

In a possible implementation, that the first PE obtains bit index explicit replication BIER information includes: The first PE receives second signaling sent by the second PE, where the second signaling carries the second BIER information. The second signaling includes BIER via BGP signaling, BIER via ISIS signaling, or BIER via OSPF signaling.

In a possible implementation, when the second signaling includes the BIER via BGP signaling, the second identifier is carried in a BIER service identifier attribute in the BIER via BGP signaling, the BFR ID of the third CE is carried in a BIER service encapsulation attribute in the BIER via BGP signaling, and the RT is carried in an extended community attribute in the BIER via BGP signaling.

According to a thirteenth aspect, a correspondence obtaining apparatus is provided. The apparatus is used in a first PE, and the apparatus includes: an obtaining module, configured to obtain bit index explicit replication BIER information, where the BIER information includes at least one of first BIER information and second BIER information, the first BIER information includes BIER information of a second customer edge CE, the second BIER information includes BIER information of a second PE and BIER information of a third CE that are sent by the second PE, and the second CE and the third CE are devices in a first VPN; and a determining module, configured to determine a correspondence based on the BIER information, where the correspondence is used by the first PE to transmit a BIER packet.

In a possible implementation, the correspondence includes at least one of a first relationship and a second relationship.

The first relationship includes a first forwarding bit mask and an identifier of the first VPN, the first forwarding bit mask is obtained based on a bit-forwarding router identifier BFR ID of the second CE, and the identifier of the first VPN is used by the first PE to identify the first virtual private network VPN to which the second CE belongs.

The second relationship includes a second forwarding bit mask, the identifier of the first VPN, and a second identifier, the second forwarding bit mask is obtained based on a BFR ID of the third CE, the second identifier is used by the second PE to identify the first VPN to which the first BIER packet belongs.

In a possible implementation, the BIER information of the second CE includes the BFR ID of the second CE. The determining module is configured to: determine the first forwarding bit mask based on the BFR ID of the second CE, determine the identifier of the first VPN based on a VPN bound to a connection interface between the first PE and the second CE, and determine the first relationship based on the first forwarding bit mask and the identifier of the first VPN.

In a possible implementation, the BIER information of the second PE includes the second identifier, the BIER information of the second PE further includes at least one of a route distinguisher RD and a route target RT, the RD and the RT identify a VPN, and the BIER information of the third CE includes the BFR ID of the third CE; and the determining module is configured to: determine the second forwarding bit mask based on the BFR ID of the third CE, determine the identifier of the first VPN based on the RD or the RT, determine the second identifier based on the BIER information of the second PE, and determine the second relationship based on the second forwarding bit mask, the identifier of the first VPN, and the second identifier.

In a possible implementation, the BIER information of the second PE further includes an originating router IP address of the second PE. The determining module is configured to: determine, based on the originating router IP address in the BIER information of the second PE, that the second PE is used as a remote neighbor of the first PE, where the second PE includes the originating router IP address that is the same as that of the third CE; and determine the second identifier based on the BIER information of the second PE.

In a possible implementation, after obtaining the bit index explicit replication BIER information, the obtaining module is further configured to: generate a link state database based on the BIER information of the third CE, and advertise the link state database to a first CE, where the first CE is a device in the first VPN.

In a possible implementation, the obtaining module is configured to generate the link state database based on the BFR ID of the third CE being valid.

In a possible implementation, the obtaining module is configured to send first signaling to the first CE, where the first signaling carries the link state database. The first signaling includes BIER via border gateway protocol BGP signaling, BIER via intermediate system to intermediate system protocol ISIS signaling, or BIER via open shortest path first protocol OSPF signaling.

In a possible implementation, the obtaining module is configured to receive second signaling sent by the second PE, where the second signaling carries the second BIER information. The second signaling includes BIER via BGP signaling, BIER via ISIS signaling, or BIER via OSPF signaling.

In a possible implementation, when the second signaling includes the BIER via BGP signaling, the second identifier is carried in a BIER service identifier attribute in the BIER via BGP signaling. The BFR ID of the third CE is carried in a BIER service encapsulation attribute in the BIER via BGP signaling. The RT is carried in an extended community attribute in the BIER via BGP signaling.

According to a fourteenth aspect, a correspondence obtaining device is provided, and includes a processor. The processor is coupled to a memory, the memory stores at least one instruction, and the at least one instruction is loaded and executed by the processor, to enable the correspondence obtaining device to implement the correspondence obtaining method according to any one of the twelfth aspect or the possible implementations of the twelfth aspect.

According to a fifteenth aspect, a computer-readable storage medium is provided. The computer-readable storage medium stores at least one instruction, and the instruction is loaded and executed by a processor, to enable a computer to implement the correspondence obtaining method according to any one of the twelfth aspect or the possible implementations of the twelfth aspect.

According to a sixteenth aspect, a computer program product is provided, and includes a computer program. When the computer program is executed by a computer, the correspondence obtaining method according to any one of the twelfth aspect or the possible implementations of the twelfth aspect is implemented.

According to a seventeenth aspect, a communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform the correspondence obtaining method according to any one of the twelfth aspect or the possible implementations of the twelfth aspect.

In an example embodiment, there are one or more processors, and there are one or more memories.

In an example embodiment, the memory and the processor may be integrated together, or the memory and the processor are disposed separately.

In a specific implementation process, the memory may be a non-transitory memory, for example, a read-only memory (ROM), and the memory and the processor may be integrated on a same chip, or may be separately disposed on different chips. A type of the memory and a manner of disposing the memory and the processor are not limited in this embodiment of this application.

According to an eighteenth aspect, a chip is provided, and includes a processor, configured to: invoke, from a memory, instructions stored in the memory and run the instructions, to enable a communication device on which the chip is installed to perform the correspondence obtaining method according to any one of the twelfth aspect or the possible implementations of the twelfth aspect.

According to a nineteenth aspect, another chip is provided, and includes an input interface, an output interface, a processor, and a memory. The input interface, the output interface, the processor, and the memory are connected through an internal connection path. The processor is configured to execute code in the memory. When the code is executed, the processor is configured to perform the correspondence obtaining method according to any one of the twelfth aspect or the possible implementations of the twelfth aspect.

According to a twentieth aspect, a correspondence obtaining system is provided. The correspondence obtaining system includes a first PE and a second PE. The second PE sends BIER information of the second PE and BIER information of a third CE, and the third CE is a device in a first virtual private network VPN. The first PE performs the correspondence obtaining method according to any one of the twelfth aspect or the possible implementations of the twelfth aspect.

BRIEF DESCRIPTION OF THE DRAWINGS

FIG. 5 is a schematic diagram of a correspondence according to an embodiment of this application;

FIG. 6 is a schematic diagram of a manner of carrying a BIER service identifier according to an embodiment of this application;

FIG. 22 is a schematic diagram of a sub-sub-tlv field according to an embodiment of this application;

FIG. 23 is a schematic diagram of a sub-sub-tlv field according to an embodiment of this application;

FIG. 24 shows some fields included in second signaling according to an embodiment of this application;

DETAILED DESCRIPTION OF ILLUSTRATIVE EMBODIMENTS

The following further describes implementations of this application in detail with reference to the accompanying drawings.

With continuous development of a BIER technology, there are more and more application scenarios for packet transmission based on a BIER network. The BIER network includes an intermediate node and an edge node. The intermediate node is configured to forward a BIER packet. The edge node can not only communicate with another node in the BIER network, but also implement communication between the BIER network and another communication network. Each edge node in the BIER network is configured with a bit-forwarding router identifier (BFR ID). For example, the BFR ID is set to be a value ranging from 1 to 256. Configuration information of each edge node in the BIER network may be flooded in the network, and such flooded information is referred to as BIER information. Through flooding, each node in the network can determine the BFR ID and a corresponding node. In this application, the node in the BIER network is a network device in the BIER network, and may be a data communication device such as a router or a switch.

Figure 1:
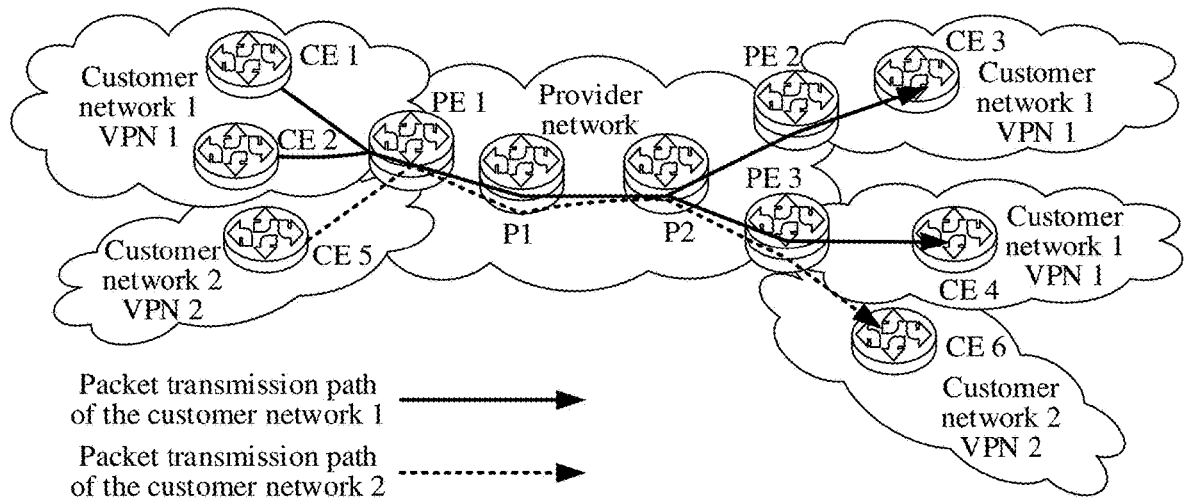
FIG. 1 shows a network scenario of a packet transmission method according to an embodiment of this application.

Currently, the BIER technology is mainly applied to a provider network, as shown in a schematic diagram of a network scenario shown in FIG. 1. As shown in FIG. 1, the network scenario includes devices such as a provider edge (PE) 1, a PE 2, a PE 3, a customer edge (CE) 1, a CE 2, a CE 3, a CE 4, a CE 5, and a CE 6. The network scenario includes two packet transmission paths. The first packet transmission path is shown by using solid lines in FIG. 1, and is a transmission path that uses the CE 1 as a source sender of a packet and uses the CE 2, the CE 3, and the CE 4 as final receivers of the packet. The second packet transmission path is shown by using a dashed line in FIG. 1, and is a transmission path that uses the CE 5 as a source sender of a packet and uses the CE 6 as a final receiver of the packet.

The first packet transmission path is used as an example. In a related technology, the BIER technology is used only in the provider network (namely, a network including P1, P2, the PE 1, PE 2, and the PE 3). PIM protocols are respectively deployed between the CE 1 and the PE 1, between the CE 2 and the PE 1, between the CE 3 and the PE 2, and between the CE 4 and the PE 3. To be specific, in the related technology, the packet sent by the CE 1 is first transmitted to the PE 1 based on the PIM protocol, is encapsulated into a BIER packet on the PE 1, and is transmitted to the PE 2 and the PE 3 through the provider network. After the packet is decapsulated on the PE 2 and the PE 3, the PE 2 and the PE 3 then respectively send the packet to the CE 3 device and the CE 4 device based on the PIM protocols.

However, due to a limitation on a quantity of edge nodes in the BIER technology, a quantity of CEs that can be accessed when the BIER technology is used in the provider network in the related technology is also limited, and extensibility is not strong. In addition, the provider network needs to maintain a large quantity of packets, and consequently, the provider network is overloaded.

In this regard, embodiments of this application provide a packet transmission method. In the method, different customer networks are distinguished by using virtual private networks (VPNs), and a BIER packet is forwarded in the VPNs, so that a BIER technology is directly deployed on a CE. In this way, customers of different sites of a provider communicate with each other by using the BIER technology, and the BIER packet is transmitted across a provider network, thereby improving network extensibility and reducing a load of the provider network.

For ease of understanding, the following describes, based on the network scenario shown in FIG. 1, concepts that may be used in embodiments of this application.

In embodiments of this application, in addition to the provider network, there may be one or more customer networks based on different customers. For example, a network in which a PE and a CE that a BIER packet transmission path passes through are located is referred to as a customer network. To distinguish between different customer networks, one VPN may be configured for one customer network. In addition, one customer network may be divided into one or more sites, and each site is a part of the customer network. Each site includes one or more CEs connected to a same PE in a same VPN. The PE may be connected to the CE in a direct connection manner or an indirect connection manner. As shown in FIG. 1, the PE 1, the PE 2, the PE 3, the CE 1, the CE 2, the CE 3, and the CE 4 are located in a customer network 1, and the PE 1, the PE 3, the CE 5, and the CE 6 are located in a customer network 2. The customer network 1 is divided into three sites. The CE 1 and the CE 2 that are connected to the PE 1 belong to one site, the CE 3 connected to the PE 2 belongs to one site, and the CE 4 connected to the PE 3 belongs to one site. The customer network 2 is divided into two sites. The CE 5 connected to the PE 1 belongs to one site, and the CE 6 connected to the PE 3 belongs to one site.

It should be noted that, in FIG. 1, descriptions are provided by using only an example in which a network in which the PE 1, the PE 2, the PE 3, the CE 1, the CE 2, the CE 3, and the CE 4 are located is used as one customer network 1, and is configured with one VPN. However, division of the customer network is not limited. In an example embodiment, the network in which the PE 1, the PE 2, the PE 3, the CE 1, the CE 2, the CE 3, and the CE 4 are located may alternatively be divided into three different customer networks. For example, a network in which the PE 1, the CE 1, and the CE 2 are located is one customer network, a network in which the PE 2 and the CE 3 are located is one customer network, and a network in which the PE 3 and the CE 4 are located is one customer network.

In the method provided in embodiments of this application, VPNs are configured on provider PE nodes to distinguish between different customer networks, and services are independently provided for the different customer networks to run BIER. In this way, customers of different sites communicate with each other by using the BIER technology.

For example, on each PE, a VPN, referred to as a VPN 1, is configured for the customer network 1, and another VPN, referred to as a VPN 2, is configured for the customer network 2.

In addition, in the network scenario, by flooding BIER information of a PE and a CE, the PE may establish a correspondence between the PE and the CE or a correspondence between the PE and another PE based on the BIER information of the devices. Each PE further adds VPN information to the correspondence. For example, the correspondence not only includes a forwarding bit mask, but also includes an identifier of a first VPN used to identify the VPN and a second identifier used to identify a VPN. For a correspondence obtaining process, refer to related content in FIG. 20 below. Details are not described herein. After the correspondence is established, the PE and the CE may implement packet transmission across the provider network based on the correspondence. For example, as shown in FIG. 1, the CE 1 in the site connected to the PE 1 may send the BIER packet to the CE 3 in the site connected to the PE 2. The CE 1 in the site connected to the PE 1 may alternatively send the BIER packet to another CE, for example, the CE 2, in the site connected to the PE 1.

Figure 2:
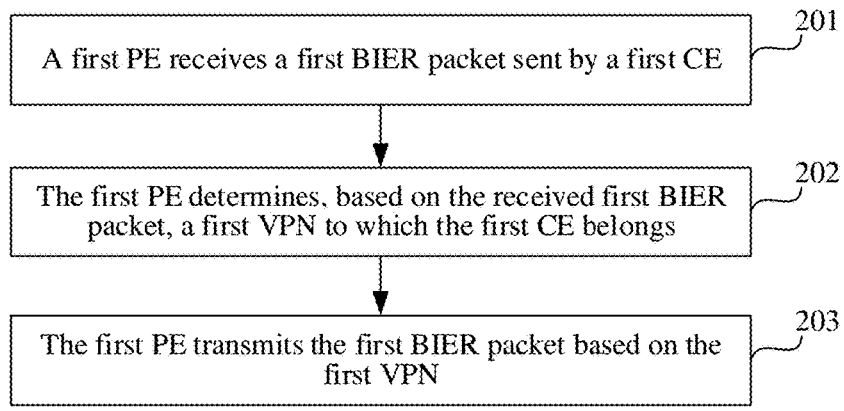
FIG. 2 is a flowchart of a packet transmission method according to an embodiment of this application.

Based on the network scenario shown in FIG. 1, embodiments of this application provide a packet transmission method. FIG. 2 is a flowchart of a packet transmission method according to an embodiment of this application. The method is applied to a first PE. In addition, in this embodiment of this application, a CE that is in a customer network and that needs to transmit a BIER packet via the first PE is referred to as a first CE, a network in which a site to which the first CE belongs and the first PE are located is referred to as a first network, and a destination CE to which the BIER packet is to be reached, namely, a CE receiving the BIER packet, is referred to as a second CE or a third CE. The second CE is a CE receiving a BIER packet transmitted by the first PE across a provider network, and the third CE is a CE receiving a BIER packet transmitted by the first PE in the first network without crossing the provider network. It may be understood that the second CE is a device at a same site as the first CE. A network in which the site to which the second CE belongs and a second PE are located is referred to as a second network, and the second PE is a remote device of the first PE. Optionally, the second network may include one site of the customer network, or may include a plurality of sites of the customer network. This is not limited in this embodiment of this application. The first network and the second network are connected through a third network. The third network may be the provider network. In other words, the method provided in this embodiment of this application implements a process of transmitting the BIER packet of the first network to the second network across the provider network, and may also implement a process of transmitting the BIER packet of the first network in the first network.

As shown in FIG. 2, the packet transmission method provided in this embodiment of this application includes the following several steps.

Step 201: The first PE receives a first BIER packet sent by the first CE.

The first PE is connected to one or more customer networks, different customer networks are distinguished by using VPNs on the first PE, and services are provided for the different customer networks to run BIER. A connection manner between the first PE (for example, the PE 1 in FIG. 1) and the first CE (for example, the CE 1 in FIG. 1) includes a direct connection manner and an indirect connection manner. With reference to the descriptions in the foregoing implementation environment in FIG. 1, the CE 1 is located in the first network (for example, the customer network 1 in FIG. 1). The first network is a BIER network, and the CE 1 sends the BIER packet to the PE 1.

In a possible implementation, before the first PE receives the first BIER packet sent by the first CE, the first PE configures VPNs for the first network and the second network. That the first network and the second network belong to a same VPN is used as an example. The first PE configures a first VPN for a same customer network to which the first network and the second network belong, where the first VPN is used to isolate a BIER packet transmitted in the customer network from a packet transmitted in another customer network.

Optionally, the first PE may further configure a corresponding VPN for the another customer network. In this embodiment of this application, only a method for transmitting the BIER packet in the first VPN is used as an example for description. For a method for transmitting a BIER packet in another VPN, refer to the method for transmitting the BIER packet in the first VPN. Details are not described in this embodiment of this application.

BIER sub-domain identifiers and BFR IDs in different VPNs may be planned independently without affecting signaling and a forwarding technology that are selected by a provider public network. For example, the customer network 1 and the customer network 2 in FIG. 1 respectively belong to two independent VPNs (which are respectively, for example, the VPN 1 and the VPN 2) on the provider PE. A sub-domain 0 and a sub-domain 1 may be configured in the customer network 1. The sub-domain 0 and the sub-domain 1 may also be configured in the customer network 2. In each of the VPN 1 and the VPN 2, the PE independently generates a correspondence, namely, a forwarding entry, for the sub-domain 0 or the sub-domain 1 without constituting a limitation on or affecting each other.

After the VPN is configured for the first network and the second network on the first PE, the first PE binds, to the corresponding VPN, an interface that is on the first PE and that is connected to the CE. For example, as shown in FIG. 1, the PE 1 is used as an example. A connection interface between the PE 1 and the CE 1 on the PE 1 is bound to the VPN 1, a connection interface between the PE 1 and the CE 2 on the PE 1 is bound to the VPN 1, and a connection interface between the PE 1 and the CE 5 on the PE 1 is bound to the VPN 2. The PE 2 is used as an example. A connection interface between the PE 2 and the CE 3 on the PE 2 is bound to the VPN 1. The PE 3 is used as an example. A connection interface between the PE 3 and the CE 4 on the PE 3 is bound to the VPN 1, and a connection interface between the PE 3 and the CE 6 is bound to the VPN 2.

After the VPN is configured for the first network and the second network on the first PE, and a connection interface (namely, the connection interface between the first PE and the first CE) between the first PE and the CE is bound to the corresponding first VPN, the first PE receives the first BIER packet sent by the first CE. Optionally, the first PE receives, through the connection interface between the first PE and the first CE, the first BIER packet sent by the first CE.

Step 202: The first PE determines, based on the received first BIER packet, the first VPN to which the first CE belongs.

As described in 201, after the VPN is configured for the first network and the second network on the first PE, the first PE binds, to the corresponding first VPN, the interface that is on the first PE and that is connected to the CE. The first PE may determine, based on a VPN bound to an interface for receiving the first BIER packet, that the first CE belongs to the first VPN, and may also determine, based on indication information in the first BIER packet, that the first CE belongs to the first VPN. Therefore, in a possible implementation, the first PE can determine an interface from which the BIER packet is received, and then query for a VPN bound to the interface, to determine a corresponding VPN. In other words, the first PE determines, based on a VPN bound to the connection interface between the first PE and the first CE, the first VPN to which the first CE belongs.

Step 203: The first PE transmits the first BIER packet based on the first VPN.

In a possible implementation, an implementation in which the first PE transmits the first BIER packet based on the first VPN includes: The first PE determines a correspondence based on the first VPN, and transmits the first BIER packet based on the first VPN and the correspondence.

The correspondence is used by the first PE to forward the first BIER packet. For example, the correspondence may be a forwarding entry. In this embodiment of this application, because locations of CEs receiving the first BIER packet in the network are different, the first PE transmits the first BIER packet based on different correspondences. The following provides descriptions by using an example in which the correspondence is classified into two cases, to be specific, the correspondence includes a first relationship and a second relationship. It should be noted that the correspondence provided in this embodiment of this application includes at least one of the first relationship and the second relationship, and the correspondence is determined based on a location of a destination CE.

The first relationship is used by the first PE to transmit the first BIER packet in the first network. In other words, the second CE receiving the first BIER packet is located in the first network (namely, a local site) in the first VPN, and the second CE is a device in a site connected to the first PE. The device in the site connected to the first PE includes a CE directly connected to the first PE, and also includes a CE indirectly connected to the first PE. The first relationship includes a correspondence between a first forwarding bit mask and an identifier of the first VPN, the first forwarding bit mask is obtained based on a BFR ID of the second CE, and the identifier of the first VPN is used by the first PE to identify the first VPN.

The second relationship is used by the first PE to transmit the first BIER packet across the provider network. In other words, the third CE receiving the first BIER packet is located in the second network (namely, a remote site), and the third CE receives the first BIER packet via the second PE. In other words, the third CE is a device in a site connected to the second PE. The device in the site connected to the second PE includes a CE directly connected to the second PE, and also includes a CE indirectly connected to the second PE. The second relationship includes a second forwarding bit mask, the identifier of the first VPN, and a second identifier, the second forwarding bit mask is obtained based on a BFR ID of the third CE receiving the first BIER packet, and the second identifier is used by the second PE to identify the first VPN to which the first BIER packet belongs.

A correspondence obtaining manner is not limited in this embodiment of this application. For example, the first PE reads the correspondence from locally stored information. The locally stored correspondence may be obtained by the first PE based on the BIER information advertised by another device. For a process in which the first PE obtains the correspondence based on the BIER information advertised by the another device, refer to the following correspondence obtaining process shown in FIG. 20. Details are not described herein.

For example, when the correspondence includes the first relationship, the first PE determines the correspondence between the first VPN and the first forwarding bit mask based on the first VPN. For example, when the correspondence includes the second relationship, the first PE determines the correspondence between the first VPN, the second forwarding bit mask, the second identifier based on the first VPN.

That the correspondence includes the first relationship is used as an example. A manner in which the first PE transmits the first BIER packet based on the first VPN includes but is not limited to: determining the first forwarding bit mask based on the first VPN and the first relationship, and transmitting the first BIER packet based on the first forwarding bit mask.

The first relationship further includes a first packet encapsulation type field. The first PE encapsulates the first BIER packet based on a first encapsulation type indicated by the first packet encapsulation type field in the first relationship, to obtain a second BIER packet, and transmits the second BIER packet to the second CE based on the first forwarding bit mask in the first relationship.

That the correspondence includes the second relationship is used as an example. A manner in which the first PE transmits the first BIER packet based on the first VPN includes but is not limited to: The first PE determines the second forwarding bit mask and the second identifier based on the first VPN and the second relationship, and transmits the first BIER packet based on the second forwarding bit mask.

The second relationship further includes a second packet encapsulation type field. The first PE encapsulates the first BIER packet based on a second encapsulation type indicated by the second packet encapsulation type field in the second relationship, to obtain a third BIER packet, where the third BIER packet includes the second identifier; and transmits the third BIER packet to the second PE based on the second forwarding bit mask in the second relationship.

In a manner of transmitting the first BIER packet based on the second relationship, to enable a PE (for example, the second PE) that subsequently receives the packet to be capable of determining a VPN to which an encapsulated BIER packet belongs, the encapsulated BIER packet carries the second identifier, for example, a BIER service identifier. When the encapsulated BIER packet is forwarded to a remote neighbor (for example, the second PE) of the first PE that needs to receive the BIER packet, the remote neighbor can determine, based on the second identifier carried in the encapsulated BIER packet, that the BIER packet needs to be sent to a CE that is in a corresponding VPN and that needs to receive the BIER packet, and the remote neighbor queries for the correspondence, to transmit the BIER packet.

The network scenario shown in FIG. 1 is used as an example. The first PE is located in the first network and the provider network, the provider network is connected to the first network and the second network, the first CE is located in the first network, and the second PE is located in the second network. For example, the first network and the second network belong to a same VPN or different VPNs, and the first network and the second network may use a same packet encapsulation type or use different packet encapsulation types. Packet encapsulation types of different sites in a same VPN may be, for example, BIER over multi-protocol label switching (MPLS)/BIER over Ethernet (BIER ETH)/ BIERv6 (bit index explicit replication IPv6 encapsulation), where IPv6 is the internet protocol version 6. The packet encapsulation type may be flexibly selected for use. Different sites may use a same packet encapsulation type. The same packet encapsulation type used by the different sites is homogeneous. If different sites use different packet encapsulation types, the different packet encapsulation types are heterogeneous. For example, in FIG. 1, the customer network 1 may run the BIERv6 protocol, and the customer network 2 may run the BIER MPLS protocol. In different sites in the customer network 2, some sites run BIER MPLS, and some sites may run BIER ETH. A policy and a manner of combining the BIER MPLS and the BIER ETH are determined by the customer network. In addition, packet encapsulation types in different VPNs may be the same or different. For example, the first encapsulation type includes BIER over IPv6 unicast, BIER over BIER multicast BIERv6, BIER over IPv6 multicast, BIER over internet protocol version 4 unicast, BIER over BIER, BIER over IPv4 multicast, or BIER over MPLS multicast, where over indicates superimposed encapsulation of two packet headers. For example, the BIER over BIER indicates that a BIER header is encapsulated with another BIER header.

The foregoing packet encapsulation type is not limited in this embodiment of this application, and may be limited based on an application scenario. In addition, a BIER VPN (namely, a VPN deployed in a BIER network) technical framework provided in this embodiment of this application does not limit a data encapsulation form used in a provider carrier network. Unicast or multicast may be used, or native IPv6 or non-native IPv6 may be used. In this way, applicability is strong. For example, the second encapsulation type includes BIER over IPv6 unicast, BIER over BIER multicast BIERv6, BIER over IPv6 multicast, BIER over IPv4 unicast, BIER over BIER, BIER over IPv4 multicast, or BIER over MPLS multicast. For example, when the provider network is a native IPv6 network, three packet encapsulation types such as the BIER over IPv6 unicast, the BIER over BIER multicast BIERv6, and the BIER over IPv6 multicast may be used. When the provider network is a non-native IPv6 network, the BIER over IPv4 unicast, the BIER over BIER, the BIER over IPv4 multicast, or the BIER over MPLS multicast may be used. For another example, when the provider network uses unicast to encapsulate and transmit data, two packet encapsulation types of the BIER over IPv6 unicast and the BIER over IPv4 unicast may be used. When the provider network uses a point-to-multipoint (P2MP) transmission manner, the BIER over BIER multicast BIERv6, the BIER over IPv6 multicast, the BIER over BIER, the BIER over IPv4 multicast, or the BIER over MPLS multicast may be used.

In this embodiment of this application, VPNs are established on PEs to distinguish between different customer networks, and a correspondence is established in one customer network by advertising BIER information, so that a BIER packet is transmitted between CEs of different sites, and this crosses a provider network. In this way, a provider device does not need to perceive a multicast flow status. This reduces a workload of the provider device. In addition, a BIER domain is directly established between CEs in a same VPN, and is not limited to being in the provider network. This greatly increases a quantity of customer networks that the provider network can access and improves network deployment and scalability.

Figure 3:
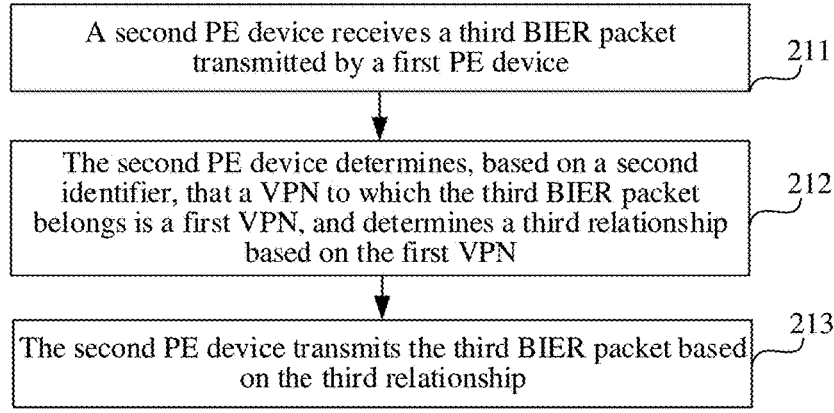
FIG. 3 is a flowchart of a packet transmission method according to an embodiment of this application.

With reference to FIG. 2, FIG. 3 is a flowchart of a packet transmission method according to an embodiment of this application. The method is applied to the second PE shown in FIG. 2. As shown in FIG. 3, on the second PE, the packet transmission method provided in this embodiment of this application includes the following several steps.

Step 211: The second PE receives a third BIER packet transmitted by a first PE.

It can be learned from the packet transmission method shown in FIG. 2 that the third BIER packet that is transmitted by the first PE and that is received by the second PE includes a second identifier, and the second identifier is used by the second PE to distinguish a VPN to which the third BIER packet belongs.

Step 212: The second PE determines, based on the second identifier, that the VPN to which the third BIER packet belongs is a first VPN, and determines a third relationship based on the first VPN.

The second PE determines, based on the second identifier carried in the third BIER packet, the first VPN to which the third BIER packet belongs. After determining the first VPN, the second PE determines the third relationship based on the first VPN. The third relationship is used by the second PE to transmit the BIER packet in a site accessed by the second PE. In other words, a device receiving the BIER packet sent by the second PE is a device in the site accessed by the second PE.

The third relationship includes a third forwarding bit mask, an identifier of the first VPN, and a packet encapsulation type field, the third forwarding bit mask is obtained based on a BFR ID of a third CE receiving the third BIER packet, and the identifier of the first VPN is used by the second PE to identify the first VPN. The third CE is a device in the site connected to the second PE, in other words, the third CE receives the third BIER packet via the second PE.

Step 213: The second PE transmits the third BIER packet based on the third relationship.

That the second PE transmits the third BIER packet based on the third relationship includes: The second PE encapsulates the third BIER packet based on a third encapsulation type indicated by the packet encapsulation type field in the third relationship, to obtain a fourth BIER packet, and transmits the fourth BIER packet to the third CE based on the third forwarding bit mask in the third relationship, where the third CE receives the third BIER packet via the second PE. For example, the third BIER packet is obtained after the first PE determines a second encapsulation type based on a second relationship, and encapsulates a first BIER packet based on the second encapsulation type, and the third BIER packet includes the second identifier. Therefore, before the second PE encapsulates the third BIER packet based on the third encapsulation type, the method includes but is not limited to: decapsulating the third BIER packet, to obtain the first BIER packet, and then encapsulating the third BIER packet based on the third encapsulation type, to obtain the fourth BIER packet.

The third encapsulation type may include any one of BIER over multi-protocol label switching (BIER MPLS), BIER over Ethernet (BIER ETH), and BIERv6. This is not limited in this embodiment of this application. For example, the third encapsulation type includes BIER over IPv6 unicast, BIER over BIER multicast BIERv6, BIER over IPv6 multicast, BIER over IPv4 unicast, BIER over BIER, BIER over IPv4 multicast, or BIER over multi-protocol label switching MPLS multicast.

The method shown in FIG. 3 is combined with the method shown in FIG. 2, so that a BIER packet can be transmitted between CEs of different sites, and this crosses a provider network. In this way, a provider device does not need to perceive a multicast flow status. This reduces a workload of the provider device, also greatly increases a quantity of customer networks that can be accessed by the provider network, and improves network deployment and scalability.

Figure 4:
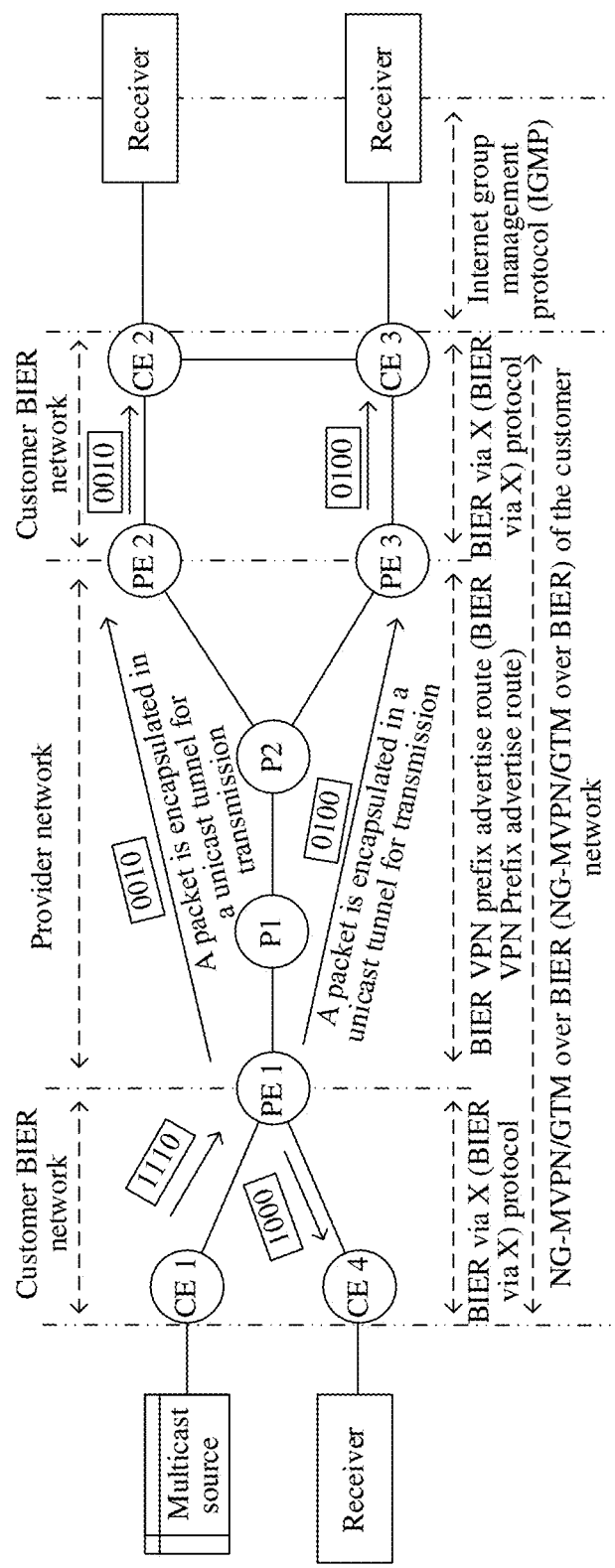
FIG. 4 is a schematic diagram of a BIER packet transmission path according to an embodiment of this application.

With reference to the packet transmission methods shown in FIG. 2 and FIG. 3, the following uses FIG. 4 as an example to describe in detail the packet transmission method provided in embodiments of this application. FIG. 4 is a schematic diagram of a packet transmission method according to an embodiment of this application.

First, a connection relationship of devices shown in FIG. 4 is described. As shown in FIG. 4, a network in which a PE 1, a PE 2, a PE 3, P1, and P2 are located is a provider network, a network in which a CE 1, a CE 2, a CE 3, and a CE 4 are located is a customer network, and the CE in the customer network accesses the provider network via the PE. As shown in FIG. 4, the PE 1 is connected to the CE 1 and the CE 4, and the CE 1 and the CE 4 access the provider network via the PE 1. The PE 2 is connected to the CE 2, and the CE 2 accesses the provider network via the PE 2. The PE 3 is connected to the CE 2 and the CE 3, the CE 2 accesses the provider network via the PE 3, and the CE 3 accesses the provider network via the PE 3.

It can be learned from a packet transmission path shown in FIG. 4 that the CE 1 is a source sender of a packet, and the CE 2, the CE 3, and the CE 4 all serve as receivers of the packet to receive the packet that is sent by the CE 1 and then forwarded by another device. In this background, a BIER technology is applied to the packet transmission path. Therefore, all packets transmitted on the transmission path are BIER packets, and all customer networks are customer BIER networks.

In this embodiment of this application, a VPN is configured based on the BIER packet transmission path shown in FIG. 4, and all the CEs in the transmission path are configured in a same VPN. In this way, when the BIER packet transmission path in this embodiment of this application is implemented, the transmission path may be isolated from a transmission path in another VPN. It should be noted that in this embodiment of this application, a network in which the PE 1 and the CE 1 and the CE 4 that are connected to the PE 1 are located is referred to as a first network, a network in which the PE 2 and the CE 2 connected to the PE 2 are located is referred to as a second network, and a network in which the PE 3 and the CE 3 connected to the PE 3 are located is also referred to as a second network. For the PE 1, the first network is a local site of the PE 1, and the second network is a remote site of the PE 1. With reference to FIG. 4, the packet transmission method provided in this embodiment of this application includes the following steps.

301: The PE 1 receives a first BIER packet sent by the CE 1.

Before the PE 1 receives the first BIER packet sent by the CE 1, the PE 1 configures VPNs for the first network and the second network. In this embodiment, a same VPN, namely, a first VPN, is configured for the first network and the second network. After the PE 1 configures the first VPN for the first network and the second network, the PE 1 binds, to the first VPN, an interface that is on the PE 1 and that is connected to the CE. As shown in FIG. 1, the connection interface between the PE 1 and the CE 1 on the PE 1 is bound to the VPN 1, and the connection interface between the PE 1 and the CE 4 on the PE 1 is bound to the VPN 1.

After the PE 1 binds, to the first VPN, the interface that is on the PE 1 and that is connected to the CE, the PE 1 receives, through the connection interface between the PE 1 and the CE 1, the first BIER packet sent by the CE 1.

302: The PE 1 determines, based on the received first BIER packet, the first VPN to which the CE 1 belongs.

It can be learned from step 301 that the PE 1 receives, through the connection interface between the PE 1 and the CE 1, the first BIER packet sent by the CE 1, and the connection interface between the PE 1 and the CE 1 is bound to the first VPN. Therefore, the PE 1 can identify that the CE 1 sending the first BIER packet belongs to the first VPN.

303: The PE 1 transmits the first BIER packet based on the first VPN.

In a possible implementation, that the PE 1 transmits the first BIER packet based on the first VPN includes: The PE 1 determines a correspondence based on the first VPN, and transmits the first BIER packet based on the first VPN and the correspondence.

The correspondence is used by the PE 1 to forward the first BIER packet. For example, the correspondence may be a forwarding entry. In this embodiment of this application, because locations of CEs receiving the first BIER packet in the network are different (to be specific, locations of the CE 2, the CE 3, and the CE 4 in the network are different), the PE 1 transmits the first BIER packet based on different correspondences. The following uses an example in which the correspondence includes a first relationship and a second relationship for description.

Refer to FIG. 5. Table 1 shows an information list that is formed by the PE 1 based on BIER information advertised between the PEs, and Table 2 shows a possible implementation of two correspondences stored on the PE 1. Key fields in the correspondence include: a local VPN identifier (namely, an identifier of the first VPN), a bit mask, and a remote VPN identifier (namely, a second identifier). The correspondences shown in Table 2 are obtained based on the information list shown in Table 1.

After determining the first VPN to which the CE 1 belongs, the PE 1 queries for, based on a local VPN identifier used by the PE 1 to identify the first VPN, the correspondence stored on the PE 1. As shown in Table 2 in FIG. 5, the correspondence in which the local VPN identifier is the first VPN is a query result of the PE 1.

The correspondence determined by the PE 1 based on the local VPN identifier includes the first relationship and the second relationship. The first relationship is described first. As shown in FIG. 5, the first relationship is used by the PE 1 to transmit the first BIER packet in the first network (namely, the local site). In other words, a CE receiving the first BIER packet is the CE 4. The first relationship includes a first forwarding bit mask "1000" and the local VPN identifier. It should be noted that, because the CE 4 receiving the packet is in the local site of the PE 1, in the first relationship, no remote VPN identifier is required, in other words, no second identifier exists. In addition, the first forwarding bit mask is generated by the PE 1 based on a BFR ID of the CE 4, and a specific process is to be described later. After determining the first relationship based on the first VPN, the PE 1 forwards the first BIER packet to the CE 4 through the interface between the PE 1 and the CE 4 based on the first VPN and the first forwarding bit mask "1000" in the first relationship.

The second relationship is described below. As shown in FIG. 5, the second relationship is used by the PE 1 to transmit the first BIER packet across the provider network. In other words, a CE receiving the first BIER packet is located in the second network (namely, the remote site). In other words, CEs receiving a BIER packet are the CE 2 and the CE 3. The second relationship includes a second forwarding bit mask, the local VPN identifier (namely, the identifier of the first VPN), and the remote VPN identifier (namely, the second identifier). From the PE 1 to the CE 2, the second forwarding bit mask is "0010", and the second forwarding bit mask is generated based on a BFR ID of the CE 2. From the PE 1 to the CE 3, the second forwarding bit mask is "0100", and the second forwarding bit mask is generated based on a BFR ID of the CE 3. It should be noted that the PE 1 cannot be directly connected to the CE 2, and needs to forward the packet to the CE 2 via the neighbor PE 2 of the CE 2. Therefore, the PE 1 needs to first forward the BIER packet to the PE 2. Similarly, from the PE 1 to the CE 3, the PE 1 needs to first forward the BIER packet to the PE 3. The remote VPN identifier, namely, the second identifier, is used by the remote PE 2 and the remote PE 3 to identify a VPN to which the BIER packet belongs. In an example embodiment of this application, the remote VPN identifier, namely, the second identifier, is a BIER service identifier. For detailed descriptions of the BIER service identifier, refer to FIG. 6.

After determining the second relationship, the PE 1 first encapsulates the remote VPN identifier into the first BIER packet, then determines the second forwarding bit mask based on the first VPN and the second relationship, and forwards an encapsulated BIER packet based on the second forwarding bit mask. As shown in FIG. 5, after determining the second relationship, the PE 1 obtains two first BIER packets through replication, encapsulates a BIER service identifier from the PE 1 to the PE 2 into one of the first BIER packets, and sends an encapsulated BIER packet to the PE 2 based on the second forwarding bit mask "0010" from the PE 1 to the PE 2. The PE 1 then encapsulates a BIER service identifier from the PE 1 to the PE 3 into the other first BIER packet obtain through replication, and sends an encapsulated BIER packet to the PE 3 based on the second forwarding bit mask "0100" from the PE 1 to the PE 3.

The following describes a process in which the PE 2 and the PE 3 correspondingly forward the received BIER packets to the CE 2 and the CE 3.

The PE 2 is used as an example. After receiving the encapsulated BIER packet sent by the PE 1, the PE 2 determines, based on the remote VPN identifier, namely, the second identifier, carried in the encapsulated BIER packet, a VPN to which the BIER packet belongs. The PE 2 further stores a correspondence used by the PE 2 to forward the BIER packet, where the correspondence includes a third relationship. After determining the VPN to which the BIER packet belongs, the PE 2 queries for the third relationship of the VPN on the PE 2, where the third relationship on the PE 2 includes a third forwarding bit mask and the identifier of the first VPN, the identifier of the first VPN is used by the PE 2 to identify the VPN, and the third forwarding bit mask is generated based on the BFR ID of the CE 2. The PE 2 transmits the received BIER packet to the CE 2 based on the third forwarding bit mask in the found third relationship. A process in which the PE 3 transmits the received BIER packet to the CE 3 is similar to the foregoing process in which the PE 2 transmits the received BIER packet to the CE 2, and details are not described herein again.

It should be noted that, in the foregoing descriptions of the packet transmission process, a process in which the PE 1, the PE 2, and the PE 3 each encapsulate the packet based on a packet encapsulation type indicated by the correspondence is omitted. The following uses the PE 1 as an example to describe how the PE 1 encapsulates the packet based on the encapsulation type in the packet transmission process.

In a packet transmission process from the PE 1 to the CE 4, it can be learned from the foregoing descriptions that after receiving, through the connection interface between the CE 1 and the PE 1, the first BIER packet sent by the CE 1, the PE 1 determines the first VPN based on the connection interface between the PE 1 and the CE 1, and determines the first relationship based on the identifier of the first VPN corresponding to the first VPN. The PE 1 determines a first encapsulation type based on a first packet encapsulation type field in the first relationship, and encapsulates the first BIER packet based on the first encapsulation type, to obtain a second BIER packet. For example, the PE 1 further forwards the second BIER packet to the CE 4 based on the first forwarding bit mask in the first relationship.

Optionally, the first encapsulation type is not limited in this embodiment of this application, and may be, for example, BIER over multi-protocol label switching (BIER MPLS), BIER over Ethernet (BIER ETH), or BIERv6. For example, the first encapsulation type may be BIER over IPv6 unicast, BIER over BIER multicast BIERv6, BIER over IPv6 multicast, BIER over IPv4 unicast, BIER over BIER, BIER over IPv4 multicast, or BIER over MPLS multicast.

A packet transmission process from the PE 1 to the PE 2 and the PE 3 is further described below. It can be learned from the foregoing descriptions that the PE 1 determines the second relationship based on the identifier of the first VPN corresponding to the first VPN. The PE 1 determines a second encapsulation type based on a second packet encapsulation type field in the second relationship, and encapsulates the first BIER packet based on the second encapsulation type, to obtain a third BIER packet. Further, the PE 1 forwards the third BIER packet to the PE 2 and the PE 3 based on the second forwarding bit mask in the second relationship. The third BIER packet sent by the PE 1 to the PE 2 is further encapsulated with the BIER service identifier, namely, the second identifier, from the PE 1 to the PE 2. The third BIER packet sent by the PE 1 to the PE 3 is further encapsulated with the BIER service identifier, namely, the second identifier, from the PE 1 to the PE 3.

Optionally, the second encapsulation type is not limited in this embodiment of this application, and may be, for example, BIER over IPv6 unicast, BIER over BIER multicast BIERv6, BIER over IPv6 multicast, BIER over IPv4 unicast, BIER over BIER, BIER over IPv4 multicast, or BIER over MPLS multicast.

The following describes that the PE 2 encapsulates the packet after receiving the third BIER packet. It can be learned from the foregoing descriptions that, after receiving the third BIER packet, the PE 2 identifies, based on the BIER service identifier (namely, the second identifier) carried in the third BIER packet, a VPN to which the third BIER packet belongs. Further, the PE 2 queries for the third relationship on the PE 2 in the VPN. The PE 2 determines a third encapsulation type based on a packet encapsulation type field in the third relationship, and encapsulates the third BIER packet based on the third encapsulation type, to obtain a fourth BIER packet. Then, the PE 2 forwards the fourth BIER packet to the CE 2 based on the third forwarding bit mask in the third relationship.

Optionally, the third encapsulation type is not limited in this embodiment of this application, and may be, for example, BIER over multi-protocol label switching (BIER MPLS), BIER over Ethernet (BIER ETH), or BIERv6. For example, the third encapsulation type may be BIER over IPv6 unicast, BIER over BIER multicast BIERv6, BIER over IPv6 multicast, BIER over IPv4 unicast, BIER over BIER, BIER over IPv4 multicast, or BIER over MPLS multicast. It should be noted that, in this embodiment of this application, the first encapsulation type and the third encapsulation type may be the same or different. This is not limited in this embodiment of this application.

It should be noted that, in FIG. 4, the CE 1 is connected to a multicast source, the CE 2, the CE 3, and the CE 4 each are connected to a receiver, and a BIER VPN prefix advertise route deployed between the PE 1, the PE 2, and the PE 3 is BIER information (which is to be described later in an embodiment shown in FIG. 21) provided in this embodiment of this application. A BIER via X protocol, namely, a first signaling type provided in this embodiment of this application, is deployed between a PE and a CE of a site to which the PE belongs. The internet group management protocol (IGMP) is deployed between the CE and the receiver. Packets sent from the PE 1 to the PE 2 and the PE 3 each are encapsulated in a unicast tunnel for transmission.

FIG. 6 is a schematic diagram of a manner of carrying a BIER service identifier, namely, a second identifier, according to an embodiment of this application. The BIER service identifier is carried in a BIER service identifier attribute, where an attribute structure includes at least a BIER service identifier (BS-id) field, and BS-id may include an IPv6 address used to identify a VPN. For example, a 128-bit IPv6 address identifies BS-id. To support a plurality of VPNs on one PE, a plurality of IPv6 addresses need to be configured, where the plurality of IPv6 addresses may be allocated in one address block. Alternatively, BS-id may be an MPLS label used to distinguish a VPN. In this case, to support a plurality of VPNs on one PE, a plurality of MPLS labels need to be allocated, where the plurality of MPLS labels may be allocated in MPLS label space.

A type indicates a newly added BIER service attribute type, and a length indicates a length of the newly added BIER service attribute type. A type length value type (tlv type) identifies a BIER service type, for example, BIER IPv6, BIER MPLS, or BIER ETH, where the length indicates a length of the BIER service type, and reserved indicates a reserved field. A sub-type length value type (sub-tlv type) identifies a BS-id type. When a provider is a native IPv6 network, the BS-id type is an IPv6 address type. When a provider is an IPv4 network, the BS-id type is an MPLS label type. A sub-type length value length (sub-tlv length) indicates a length of the BS-id type. If the sub-tlv type is an IPv6 type, the BS-id field is a 16-byte IPv6 address. If the sub-tlv type is an MPLS label type, the BS-id field is 4-byte content, and a twentieth bit is an MPLS label.

Figure 7:
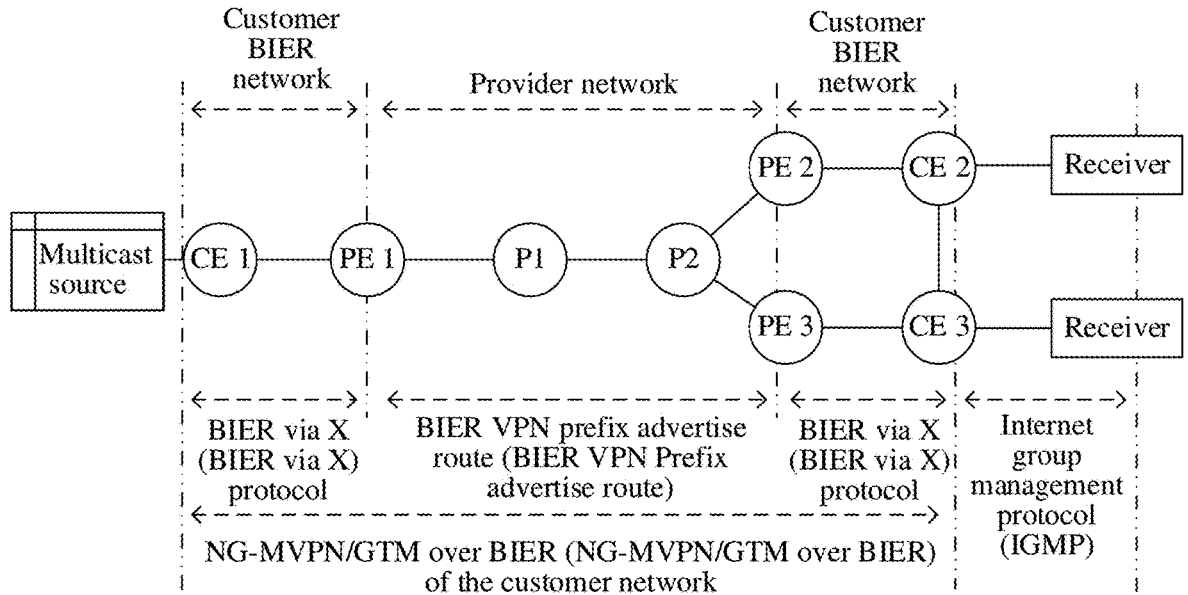
FIG. 7 is a schematic diagram of an implementation scenario of packet transmission according to an embodiment of this application.

The following several scenarios are used as examples below to describe the packet transmission method provided in embodiments of this application. A BIER packet transmission path shown in FIG. 7 is used as an example in each of the following several scenarios. A customer BIER network in which a PE 1 and a CE 1 are located is referred to as a first network, and a customer BIER network in which a PE 2, a CE 2, a PE 3, and a CE 3 is located is referred to as a second network. Because user equipment receiving a BIER packet sent by the CE 1 does not exist in a local site of the PE 1, the PE 1 forwards, based on a second relationship in a correspondence, the BIER packet sent by the CE 1. In addition, in a network scenario shown in FIG. 7, a receiver PE of a public network BIER data flow (namely, a packet) determines, based on a second identifier in the data flow, a VPN to which the BIER data flow belongs. When the public network data flow is in native IPv6 (native IPv6) encapsulation, the second identifier is carried in an IPv6 destination address. When the public network data flow is in non-native IPv6 (native IPv6) encapsulation, the second identifier is carried in a VPN label. The receiver PE (the PE 2 or the PE 3) removes an IPv6 header (native IPv6 encapsulation) or an MPLS header (non-native IPv6 encapsulation), queries for a correspondence in a VPN determined based on a second identifier of an inner BIER header, and continues to replicate and forward the BIER data flow to the customer network. It should be noted that the PE (the PE 2 or the PE 3) receiving the BIER packet forwards the BIER packet to a corresponding CE (the CE 2 or the CE 3). The PE (the PE 2 or the PE 3) receiving the BIER packet forwards the BIER packet based on a first relationship in the correspondence.

It should be noted that, in FIG. 7, the CE 1 is connected to a multicast source, the CE 2 and the CE 3 each are connected to a receiver, and a BIER VPN prefix advertise route deployed between the PE 1, the PE 2, and the PE 3 is BIER information (which is to be described later in an embodiment shown in FIG. 20) provided in this embodiment of this application. A BIER via X protocol, namely, a first signaling type provided in this embodiment of this application, is deployed between a PE and a CE in a connected site. The internet group management protocol (IGMP) is deployed between the CE and the receiver. FIG. 8, FIG. 10, FIG. 12, FIG. 14, FIG. 16, and FIG. 18 each have an implementation environment similar to that in FIG. 7. For a same part, details are not described again in the following embodiments.

For example, based on BIER encapsulation types of the customer network: BIER MPLS, BIER IPv6, and BIER ETH, three embodiments are used for description. The following scenario embodiments each are described based on a case in which BIER encapsulation of different sites in a BIER VPN is homogeneous. A heterogeneous case depends on a heterogeneous combination processing policy used by the customer network for a native BIER network. Details are not described in this embodiment of this application. In addition, BIER via X in the following scenario embodiments indicates a signaling type advertised between the PE and the CE. In the following scenario embodiments, X is described by using the intermediate system to intermediate system (ISIS) protocol as an example. In addition, a protocol running in the first network or the second network mentioned below indicates a BIER packet encapsulation type in the first network or the second network.

Figure 8:
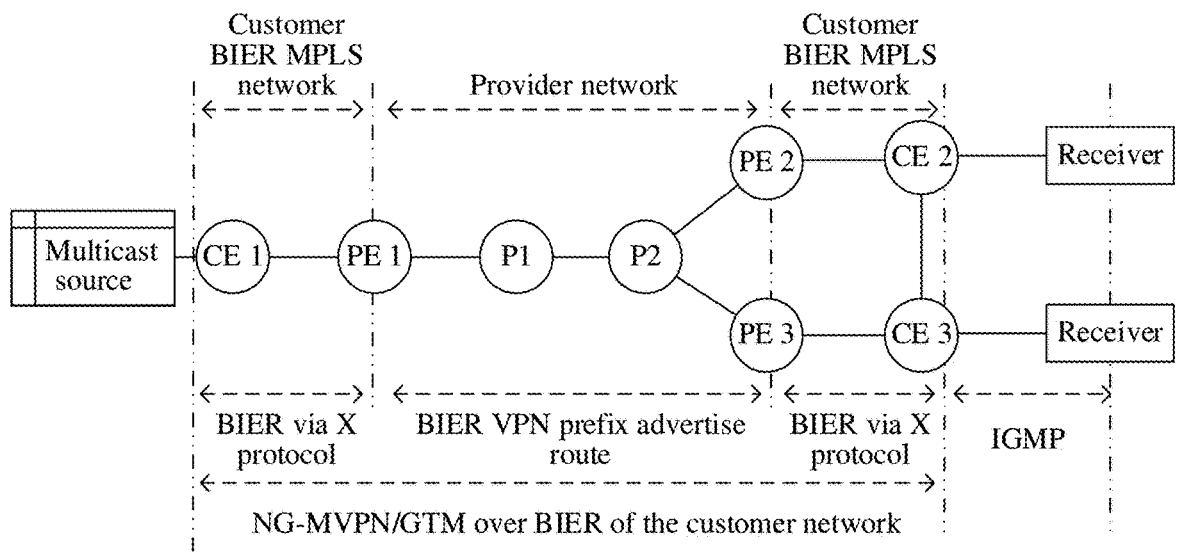
FIG. 8 is a schematic diagram of an implementation scenario of packet transmission according to an embodiment of this application.

Scenario 1: As shown in FIG. 8, a first network and a second network run a BIER MPLS protocol, and a BIER packet encapsulation type in a provider network is unicast IPv6 encapsulation, for example, a BIER MPLS over IPv6 tunnel. In this embodiment, BIER MPLS information is carried in an IPv4 BFR prefix. A PE 1 advertises the information to a PE 2/PE 3 and includes, in the information, route distinguisher (RD) and/or route target (RT) information used to distinguish a VPN. To be specific, the PE 1 advertises BIER MPLS information of a sub-domain 0 of a customer 1 (corresponding to a CE 1/CE 2/CE 3), and includes an RD and/or an RT in the information. The PE 2 and the PE 3 establish a BIER MPLS routing table and forwarding entry, namely, a correspondence of the customer 1, of the sub-domain 0 of the customer 1. Similarly, the PE 1 may advertise BIER MPLS information of a sub-domain 0 of a customer 2 (corresponding to a CE 1b/CE 2b/CE 3b), and include an RD and/or an RT in the information. The PE 2 and the PE 3 establish a BIER MPLS routing table and forwarding entry, namely, a correspondence of the customer 2, of the sub-domain 0 of the customer 2. Before packet transmission is performed, the following configuration is performed on the PE 1, the PE 2, and the PE 3.

1. Perform the following configuration on the PE 1:
Configure a VPN instance;
Ip vpn-instance bier_vpn
Ipv4-family
Route-distinguisher 1:1
Vpn-target 1:1 export-extcommunity
Vpn-target 1:1 import-extcommunity
Bind, to the VPN instance, an interface connected to the CE;
Interface LoopBack 0
Ip binding vpn-instance bier_vpn
Ip address 2.1.1.1 255.255.255.255
Interface PE1_to_CE1
Ip binding vpn-instance bier_vpn
Configure an ISIS instance and bind the instance to a vpn;
Isis 1 vpn-instance bier_vpn
Bier enable
Configure a BIER service identifier address pool;
Bier service-id addr-pool pool1 11::96
Advertise the address pool in the ISIS instance on a public network;
Isis 0
Advertise bier service-id addr-pool pool1
Configure a BIER VPN instance, specify a service ID, and configure a sub-domain;
Bier vpn-instance bier_vpn
Service-id pool1 11::1 ad 1
Sub-domain 0
Bfr-prefix interface LoopBack 0
Encapsulation-type mpls bsl 64 max-si 255
Protocol Isis
Protocol bgp
Enable a BIER VPN BGP address family;
Bgp 100
Ipv4-family bier-vpn
Peer 2::2 enable
Peer 3::3 enable
2. Perform the following configuration on the PE 2:
Configure a VPN instance;
Ip vpn-instance bier_vpn
Ipv4-family
Route-distinguisher 1:1
Vpn-target 1:1 export-extcommunity
Vpn-target 1:1 import-extcommunity
Bind, to the VPN instance, an interface connected to the CE;
Ip binding vpn-instance bier_vpn
Ip address 2.1.1.2 255.255.255.255
Interface PE2_to_CE2
Ip binding vpn-instance bier_vpn
Configure an ISIS instance and bind the instance to a vpn;
Isis 1 vpn-instance bier_vpn
Bier enable
Configure a BIER service identifier address pool;
Bier service-id addr-pool pool1 22::96
Advertise the address pool in the ISIS instance on a public network;
Isis 0
Advertise bier service-id addr-pool pool1
Configure a BIER VPN instance, specify a service ID, and configure a sub-domain;
Bier vpn-instance bier_vpn
Service-id pool1 22::1 ad 1
Sub-domain 0
Bfr-prefix interface LoopBack 0

Encapsulation-type mpls bsl 64 max-si 255
Protocol Isis
Protocol bgp
Enable a BIER VPN BGP address family;
Bgp 100
Ipv4-family bier-vpn
Peer 1::1 enable
Peer 3::3 enable
3. Perform the following configuration on the PE 3:
Configure a VPN instance;
Ip vpn-instance bier_vpn
Ipv4-family
Route-distinguisher 1:1
Vpn-target 1:1 export-extcommunity
Vpn-target 1:1 import-extcommunity
Bind, to the VPN instance, an interface connected to the CE;
Interface LoopBack 0
Ip binding vpn-instance bier_vpn
Ip address 2.1.1.3 255.255.255.255
Interface PE3_to_CE3
Ip binding vpn-instance bier_vpn
Configure an ISIS instance and bind the instance to a vpn;
Isis 1 vpn-instance bier_vpn
Bier enable
Configure a BIER service identifier address pool;
Bier service-id addr-pool pool1 33::96
Advertise the address pool in the ISIS instance on a public network;
Isis 0
Advertise bier service-id addr-pool pool1
Configure a BIER VPN instance, specify a service ID, and configure a sub-domain;
Bier vpn-instance bier_vpn
Service-id pool1 33::1 acl 1
Sub-domain 0
Bfr-prefix interface LoopBack 0
Encapsulation-type mpls bsl 64 max-si 255
Protocol Isis
Protocol bgp
Enable a BIER VPN BGP address family;
Bgp 100
   Ipv4-family bier-vpn
Peer 1::1 enable
Peer 2::2 enable Based on the foregoing configuration, that the PE 1 performs the method is used as an example. The packet transmission method includes the following steps.

Step 401: The PE 1 receives a first BIER packet sent by the CE 1.

For example, based on the foregoing configuration, before receiving the BIER packet sent by the CE 1, the PE 1 configures VPNs for the first network and the second network, and configures the first network and the second network in a same VPN. After configuring the VPN for the first network and the second network, the PE 1 binds an interface between the PE 1 and the CE 1 to a VPN 1. After the PE 1 configures and binds the VPN, the PE 1 receives, through the interface between the PE 1 and the CE 1, the first BIER packet sent by the CE 1.

Step 402: The PE 1 determines a VPN to which the CE 1 belongs.

The PE 1 determines, based on the VPN bound to the interface, the VPN to which the CE 1 sending the BIER packet belongs.

Step 403: The PE 1 transmits the first BIER packet based on the VPN to which the CE 1 belongs.

In the scenario shown in FIG. 8, that the PE 1 transmits the first BIER packet based on the VPN to which the CE 1 belongs includes: The PE 1 determines a correspondence based on the VPN to which the CE 1 belongs, and transmits the first BIER packet based on the correspondence and the VPN to which the CE 1 belongs.

The transmitting the first BIER packet based on the correspondence and the VPN to which the CE 1 belongs includes: transmitting the first BIER packet based on a second relationship in the correspondence. The correspondence that corresponds to the VPN to which the CE 1 belongs and that is on the PE 1 includes a second forwarding bit mask, a second identifier, and a packet encapsulation type field. The second forwarding bit mask indicates the CE 2 and the CE 3 that receive the BIER packet. The second identifier is used by the PE 2 and the PE 3 to distinguish a VPN to which the BIER packet belongs. The PE 1 encapsulates the first BIER packet based on a second encapsulation type indicated by the packet encapsulation type field in the second relationship, to obtain a third BIER packet, where the third BIER packet includes the second identifier. The PE 1 transmits the third BIER packet to the PE 2 and the PE 3 based on the second forwarding bit mask in the second relationship.

Figure 9:
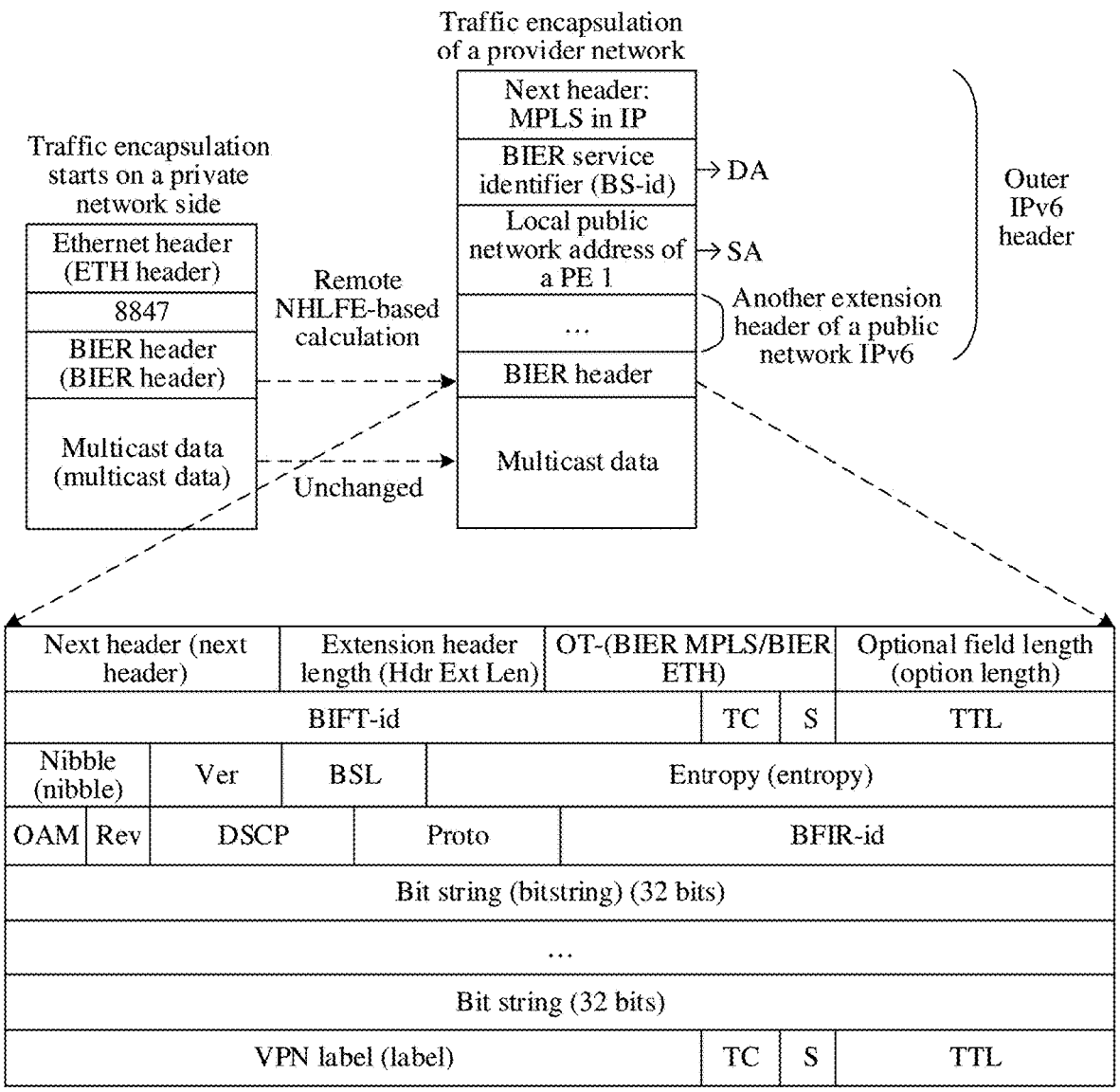
FIG. 9 is a schematic diagram of a BIER packet encapsulation manner in a provider network according to an embodiment of this application.

For example, the second relationship is a forwarding entry. A manner of transmitting the BIER packet by the PE 1 based on the forwarding entry includes: The PE 1 determines, based on the forwarding entry, that the packet encapsulation type of the provider network is BIER over IPv6 unicast; encapsulates the BIER packet based on the packet encapsulation type, to obtain an encapsulated BIER packet, where the encapsulated BIER packet includes the second identifier; and transmits the encapsulated BIER packet based on the forwarding entry. FIG. 9 shows a mapping relationship between private network BIER flow encapsulation and public network encapsulation on a PE 1 for traffic sent by a multicast source in Scenario 1. A private network is the first network in FIG. 8, and a public network is a provider network. A result of encapsulating a BIER packet by the PE 1 based on a packet encapsulation type of the provider network is shown in FIG. 9. BS-id indicates a second identifier, and BS-id is stored in a destination address (DA) field of an IPv6 packet header. For encapsulation of data sent from the PE 1 to a PE 2, a BS-id value is filled with 22::1. For encapsulation of data sent from the PE 1 to a PE 3, a BS-id value is filled with 33::1. An encapsulation IPv6 source address (SA) is filled with a local public network IPv6 address of the PE 1 device. In addition, calculation is performed on a BIER header based on a remote next hop label forwarding entry (NHLFE) to generate a new BIER header, and multicast data remains unchanged.

In the new BIER header, next header indicates a next header, Hdr Ext Len indicates an extension header length, an option (OT) field indicates a type (for example, BIER MPLS or BIER ETH) of the BIER packet in the first network, and option length indicates a length of the option field; BIFT-id (bit index forwarding table identifier) identifies a forwarding table, and in a BIER MPLS encapsulation manner, BIFT-id is an MPLS label, TC indicates a traffic type, S indicates a label stack bottom identifier, and TTL (time-to-live) indicates time to live; nibble is a fixed value, and is used to distinguish between BIER encapsulation and an equal cost multi-path (ECMP) function of MPLS, Ver (version) indicates a version number, BSL (bitstring len) indicates a length of a bit string, and entropy indicates entropy and supports ECMP; OAM (operations administration and maintenance) may be omitted, Rev (reversed) indicates a reserved field, differentiated service codepoint (DSCP) is not used in MPLS encapsulation and is used in non-MPLS encapsulation, proto indicates a type of a packet load, BFIR-id indicates a BFR ID value of a first BIER router at which a multicast data packet enters a BIER network, a bit string indicates a group of BIER routers, and VPN label indicates a VPN label, which is optional.

Figure 10:
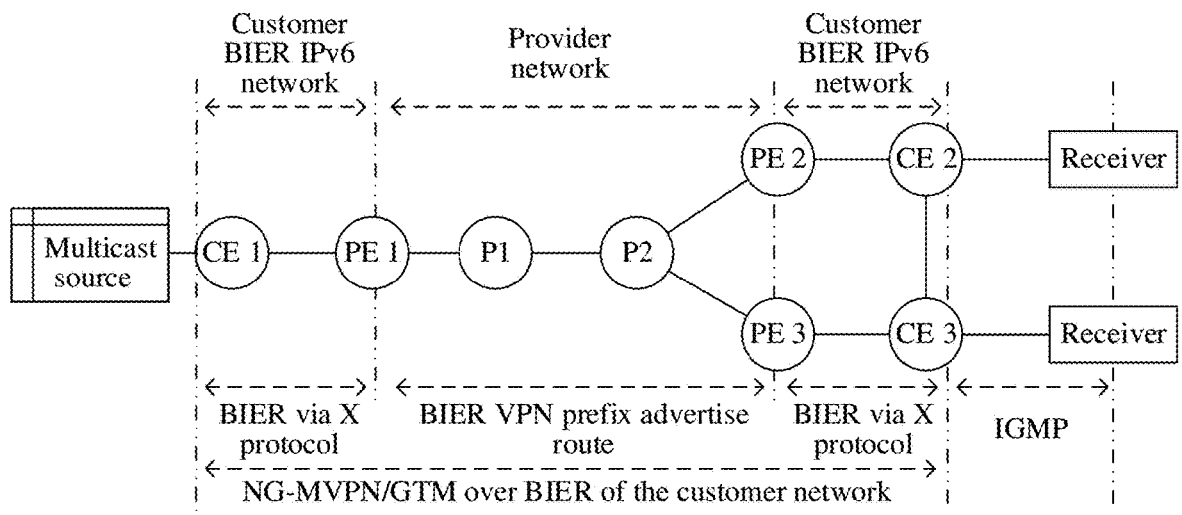
FIG. 10 is a schematic diagram of an implementation scenario of packet transmission according to an embodiment of this application.

Scenario 2: As shown in FIG. 10, a first network and a second network run a BIER IPv6 protocol, and a BIER packet encapsulation type in a provider network is unicast IPv6 encapsulation. For example, a packet is encapsulated in a form of a BIER MPLS over IPv6 tunnel. Before packet transmission is performed, the following configuration is performed on a PE 1, a PE 2, and a PE 3.

Figure 11:
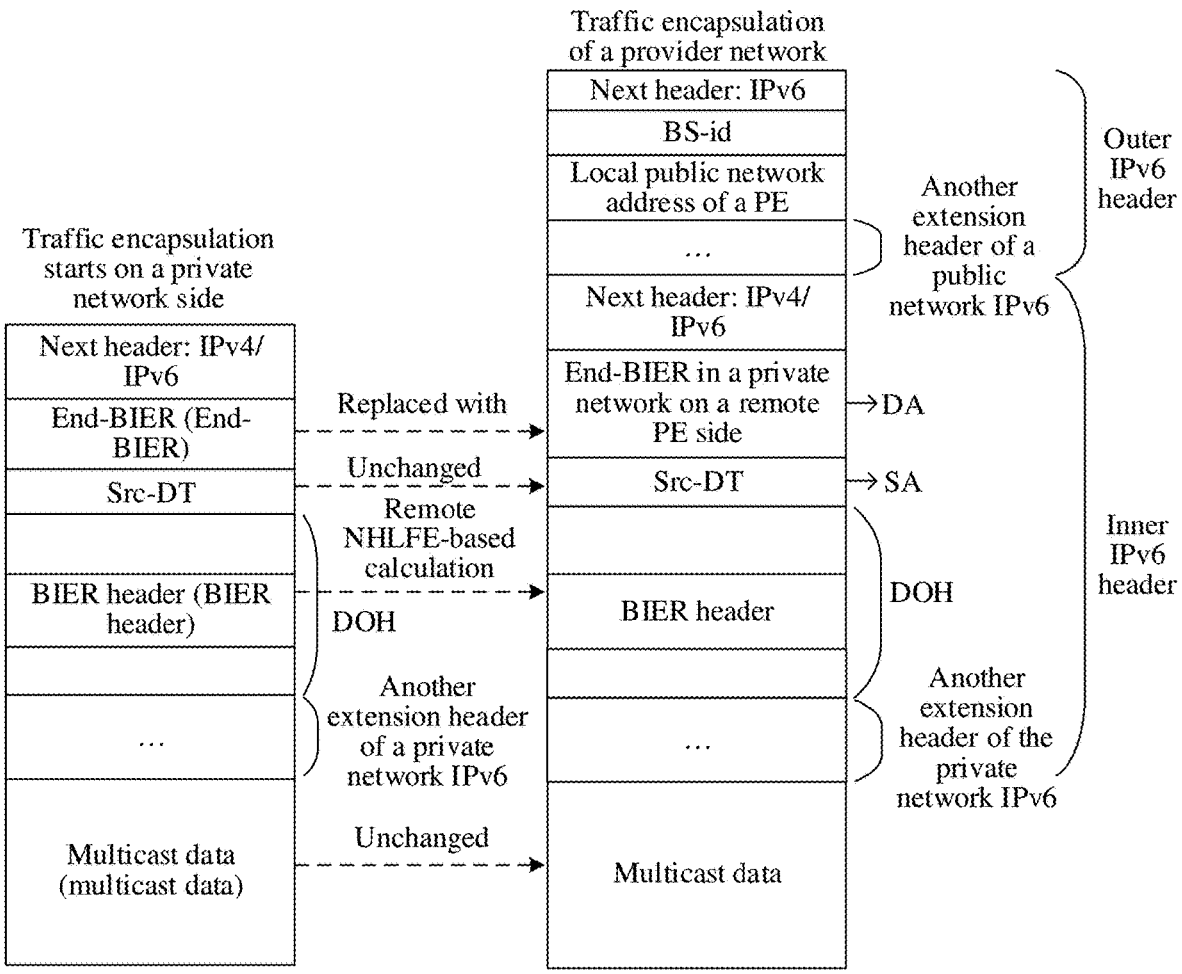
FIG. 11 is a schematic diagram of a BIER packet encapsulation manner in a provider network according to an embodiment of this application.

1. Perform the following configuration on the PE 1:
Configure a VPN instance;
Ip vpn-instance bier_vpn
   Ipv6-family
     Route-distinguisher 1:1
     Vpn-target 1:1 export-extcommunity
     Vpn-target 1:1 import-extcommunity
Bind, to the VPN instance, an interface connected to a CE;
Interface LoopBack 0
   Ipv6 enable
   Ip binding vpn-instance bier_vpn
   Ipv6 address 2::1:1 128
Interface PE1_to_CE1
   Ip binding vpn-instance bier_vpn
Configure an ISIS instance and bind the instance to a vpn;
Isis 1 vpn-instance bier_vpn
   Bier enable
Configure a BIER service identifier address pool;
Bier service-id addr-pool pool1 11::96
Advertise the address pool in the ISIS instance on a public network;
Isis 0
Advertise bier service-id addr-pool pool1
Configure a BIER VPN instance, specify a service ID, and configure a sub-domain;
Bier vpn-instance bier_vpn
   Service-id pool1 11::1 acl 1
   Sub-domain 0 ipv6
     Bfr-prefix interface LoopBack 0
     Encapsulation-type ipv6 bsl 64 max-si 255
     Protocol Isis
     Protocol bgp
Enable a BIER VPN BGP address family;
Bgp 100
   Ipv6-family bier-vpn
     Peer 2::2 enable
     Peer 3::3 enable 2. Perform the following configuration on the PE 2:
Configure a VPN instance;
Ip vpn-instance bier_vpn
   Ipv6-family
     Route-distinguisher 1:1
     Vpn-target 1:1 export-extcommunity
     Vpn-target 1:1 import-extcommunity
Bind, to the VPN instance, an interface connected to a CE;
Interface LoopBack 0
   Ipv6 enable
   Ip binding vpn-instance bier_vpn
   Ip address 2::1:2 128
Interface PE2_to_CE2
   Ip binding vpn-instance bier_vpn
Configure an ISIS instance and bind the instance to a vpn;
Isis 1 vpn-instance bier_vpn
   Bier enable
Configure a BIER service identifier address pool;
Bier service-id addr-pool pool1 22::96
Advertise the address pool in the ISIS instance on a public network;
Isis 0
Advertise bier service-id addr-pool pool1
Configure a BIER VPN instance, specify a service ID, and configure a sub-domain;
Bier vpn-instance bier_vpn
   Service-id pool1 22::1 ad 1
   Sub-domain 0 ipv6
     Bfr-prefix interface LoopBack 0
     Encapsulation-type ipv6 bsl 64 max-si 255
     Protocol Isis
     Protocol bgp
Enable a BIER VPN BGP address family;
Bgp 100
   Ipv6-family bier-vpn
     Peer 1::1 enable
     Peer 3::3 enable 3. Perform the following configuration on the PE 3:
Configure a VPN instance;
Ip vpn-instance bier_vpn
   Ipv6-family
     Route-distinguisher 1:1
     Vpn-target 1:1 export-extcommunity
     Vpn-target 1:1 import-extcommunity
Bind, to the VPN instance, an interface connected to a CE;
Interface LoopBack 0
   Ipv6 enable
   Ip binding vpn-instance bier_vpn
   Ip address 2::1:3 128
Interface PE3_to_CE3
   Ip binding vpn-instance bier_vpn
Configure an ISIS instance and bind the instance to a vpn;
Isis 1 vpn-instance bier_vpn
   Bier enable
Configure a BIER service identifier address pool;
Bier service-id addr-pool pool1 33::96
Advertise the address pool in the ISIS instance on a public network;
Isis 0
   Advertise bier service-id addr-pool pool1
Configure a BIER VPN instance, specify a service ID, and configure a sub-domain;
Bier vpn-instance bier_vpn
   Service-id pool1 33::1 ad 1
Sub-domain 0 ipv6
   Bfr-prefix interface LoopBack 0
   Encapsulation-type ipv6 bsl 64 max-si 255
   Protocol Isis
   Protocol bgp
Enable a BIER VPN BGP address family;
Bgp 100
   Ipv6-family bier-vpn
     Peer 1::1 enable
     Peer 2::2 enable The PE 1 is used as an example. Steps performed by the PE 1 are similar to those performed by the PE 1 in the foregoing Scenario 1, and details are not described in this scenario. FIG. 11 shows a mapping relationship between private network BIER flow encapsulation and public network encapsulation on a PE 1 for traffic sent by a multicast source in Scenario 2. A private network is the first network in FIG. 10, and a public network is a provider network. A result of encapsulating a BIER packet by the PE 1 based on a packet encapsulation type of the provider network is shown in FIG. 1*i*. BS-id indicates an identifier of a VPN, and BS-id is stored in an outer IPv6 packet header. For encapsulation of data sent from the PE 1 to a PE 2, a BS-id value is filled with 22::1. For encapsulation of data sent from the PE 1 to the PE 2, a BS-id value is filled with 33::1. An encapsulation IPv6 SA address is filled with a local public network IPv6 address of the PE 1 device. In addition, end-BIER (End-BIER) is replaced with private network End-BIER on a remote PE side, a source address (Src-DT) remains unchanged. A new BIER header is generated by performing NHLFE-based calculation on a BIER header and is encapsulated in a destination option header (DOH), and multicast data remains unchanged.

Figure 12:
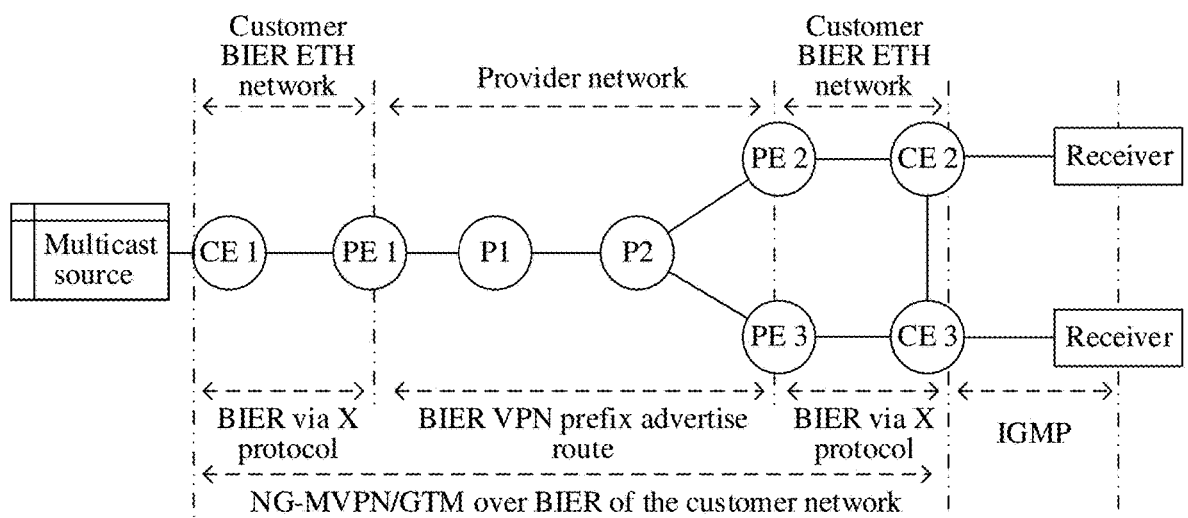
FIG. 12 is a schematic diagram of an implementation scenario of packet transmission according to an embodiment of this application.

Scenario 3: Refer to FIG. 12. A first network and a second network run a BIER Ethernet (ETH) protocol, and a BIER packet encapsulation type in a provider network is unicast IPv6 encapsulation. For example, a packet is encapsulated in a form of a BIER MPLS over IPv6 tunnel. A PE 1 is used as an example. Steps performed by the PE 1 are similar to those performed by the PE 1 in the foregoing Scenario 1, and details are not described in this scenario. Before packet transmission is performed, the following configuration is performed on the PE 1, a PE 2, and a PE 3.

1. Perform the following configuration on the PE 1:
    #Configure a VPN instance;
Ip vpn-instance bier_vpn
    Ipv4-family
       Route-distinguisher 1:1
       Vpn-target 1:1 export-extcommunity
       Vpn-target 1:1 import-extcommunity
Bind, to the VPN instance, an interface connected to a CE;
Interface LoopBack 0
    Ip binding vpn-instance bier_vpn
    Ip address 2.1.1.1 255.255.255.255
Interface PE1_to_CE1
    Ip binding vpn-instance bier_vpn
Configure an ISIS instance and bind the instance to a vpn;
Isis 1 vpn-instance bier_vpn
    Bier enable
Configure a BIER service identifier address pool;
Bier service-id addr-pool pool1 11::96
Advertise the address pool in the ISIS instance on a public network;
Isis 0
    Advertise bier service-id addr-pool pool1
Configure a BIER VPN instance, specify a service ID, and configure a sub-domain;
Bier vpn-instance bier_vpn
    Service-id pool1 11::1 acl 1
    Sub-domain 0
       Bfr-prefix interface LoopBack 0
       Encapsulation-type ethernet bsl 64 max-si 255
       Protocol Isis
       Protocol bgp
Enable a BIER VPN BGP address family;
Bgp 100
    Ipv4-family bier-vpn
       Peer 2::2 enable
       Peer 3::3 enable
2. Perform the following configuration on the PE 2:
Configure a VPN instance;
Ip vpn-instance bier_vpn
    Ipv4-family
       Route-distinguisher 1:1
       Vpn-target 1:1 export-extcommunity
       Vpn-target 1:1 import-extcommunity
Bind, to the VPN instance, an interface connected to a CE;
Interface LoopBack 0
    Ip binding vpn-instance bier_vpn
    Ip address 2.1.1.2 255.255.255.255
Interface PE2_to_CE2
    Ip binding vpn-instance bier_vpn
Configure an ISIS instance and bind the instance to a vpn;
Isis 1 vpn-instance bier_vpn
Bier enable
Configure a BIER service identifier address pool;
Bier service-id addr-pool pool1 22::96
Advertise the address pool in the ISIS instance on a public network;
Isis 0
    Advertise bier service-id addr-pool pool1
Configure a BIER VPN instance, specify a service ID, and configure a sub-domain;
Bier vpn-instance bier_vpn
    Service-id pool1 22::1 ad 1
    Sub-domain 0
       Bfr-prefix interface LoopBack 0
       Encapsulation-type ethernet bsl 64 max-si 255
       Protocol Isis
       Protocol bgp
Enable a BIER VPN BGP address family;
Bgp 100
    Ipv4-family bier-vpn
       Peer 1::1 enable
       Peer 3::3 enable
3. Perform the following configuration on the PE 3:
Configure a VPN instance;
Ip vpn-instance bier_vpn
Ipv4-family
    Route-distinguisher 1:1
    Vpn-target 1:1 export-extcommunity
    Vpn-target 1:1 import-extcommunity
Bind, to the VPN instance, an interface connected to a CE;
Interface LoopBack 0
    Ip binding vpn-instance bier_vpn
    Ip address 2.1.1.3 255.255.255.255
Interface PE3_to_CE3
    Ip binding vpn-instance bier_vpn
Configure an ISIS instance and bind the instance to a vpn;
Isis 1 vpn-instance bier_vpn
    Bier enable
Configure a BIER service identifier address pool;
Bier service-id addr-pool pool1 33::96
Advertise the address pool in the ISIS instance on a public network;

```
Isis 0
    Advertise bier service-id addr-pool pool1
#Configure a BIER VPN instance, specify a service ID,
    and configure a sub-domain;
Bier vpn-instance bier_vpn
    Service-id pool1 33::1 ad 1
    Sub-domain 0
        Bfr-prefix interface LoopBack 0
        Encapsulation-type ethernet bsl 64 max-si 255
        Protocol Isis
        Protocol bgp
Enable a BIER VPN BGP address family;
Bgp 100
    Ipv4-family bier-vpn
        Peer 1::1 enable
        Peer 2::2 enable
```

Figure 13:
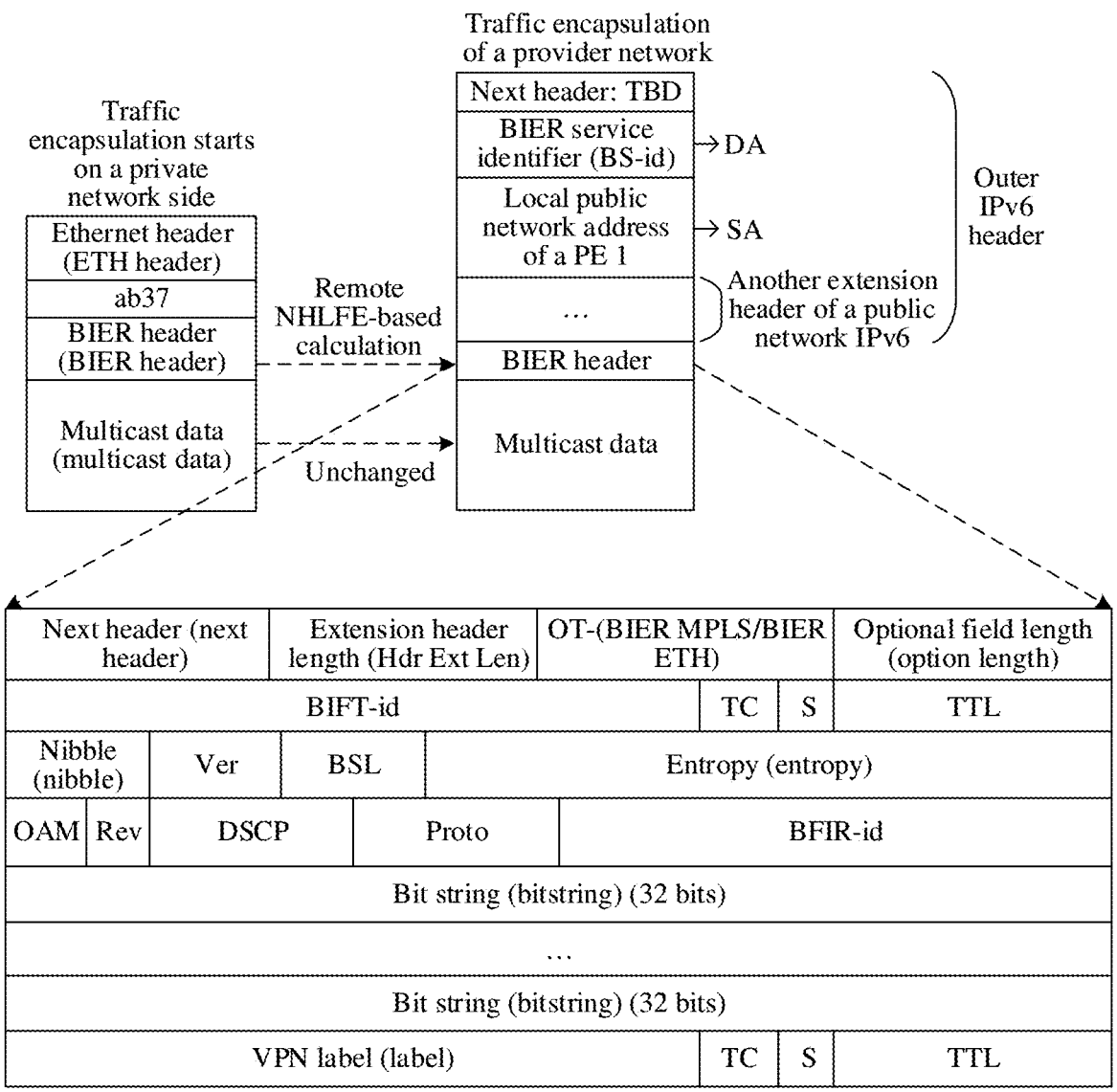
FIG. 13 is a schematic diagram of a BIER packet encapsulation manner in a provider network according to an embodiment of this application.

FIG. 13 shows a result of encapsulating a BIER packet by a PE 1 based on a packet encapsulation type of a provider network in Scenario 3. A next header type value is to be determined (TBD). BS-id indicates an identifier of a VPN, and BS-id is stored in a destination address field of an IPv6 packet header. For encapsulation of data sent from the PE 1 to a PE 2, a BS-id value is filled with 22::1. For encapsulation of data sent from the PE 1 to the PE 2, a BS-id value is filled with 33::1. An encapsulation IPv6 SA address is filled with a local public network IPv6 address of the PE 1 device. In addition, a new BIER header is generated by performing remote NHLFE-based calculation on a BIER header, and multicast data remains unchanged.

In the new BIER header, next header indicates a next header, Hdr Ext Len indicates an extension header length, an option (OT) field indicates a type (for example, BIER MPLS or BIER ETH) of the BIER packet in a first network, and option length indicates a length of the option field; BIFT-id identifies a forwarding table, and in a BIER MPLS encapsulation manner, BIFT-id is an MPLS label, TC indicates a traffic type, S indicates a label stack bottom identifier, and TTL indicates time to live; nibble is a fixed value, and is used to distinguish between BIER encapsulation and an ECMP function of MPLS, Ver indicates a version number, BSL indicates a length of a bit string, and entropy indicates entropy and supports ECMP; OAM may be omitted, Rev indicates a reserved field, DSCP is not used in MPLS encapsulation and is used in non-MPLS encapsulation, proto indicates a type of a packet load, BFIR-id indicates a BFR ID value of a first BIER router at which a multicast data packet enters a BIER network, a bit string indicates a group of BIER routers, and VPN label indicates a VPN label, which is optional.

Figure 14:
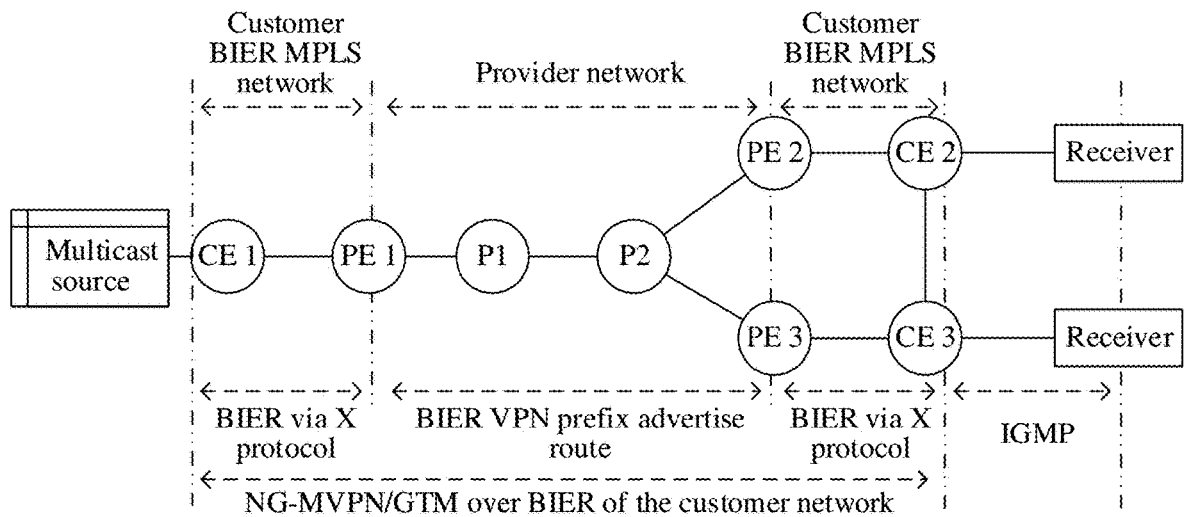
FIG. 14 is a schematic diagram of an implementation scenario of packet transmission according to an embodiment of this application.

Scenario 4: Refer to FIG. 14. A first network and a second network run a BIER MPLS protocol, and a BIER packet encapsulation type in a provider network is point to point multi-protocol label-label switch path encapsulation (BIER MPLS over P2P MPLS LSP). Before packet transmission is performed, the following configuration is performed on a PE 1, a PE 2, and a PE 3.

1. Perform the following configuration on the PE 1:
```
#Configure a VPN instance;
Ip vpn-instance bier_vpn
    Ipv4-family
        Route-distinguisher 1:1
        Vpn-target 1:1 export-extcommunity
        Vpn-target 1:1 import-extcommunity
#Bind, to the VPN instance, an interface connected to a
    CE;
Interface LoopBack 0
    Ip binding vpn-instance bier_vpn
    Ip address 2.1.1.1 255.255.255.255
Interface PE1_to_CE1
    Ip binding vpn-instance bier_vpn
#Configure an ISIS instance and bind the instance to a
    vpn;
Isis 1 vpn-instance bier_vpn
    Bier enable
#Configure a BIER VPN instance, specify a service ID,
    and configure a sub-domain;
Bier vpn-instance bier_vpn
    Service-id apply mpls label
    Sub-domain 0
        Bfr-prefix interface LoopBack 0
        Encapsulation-type mpls bsl 64 max-si 255
        Protocol Isis
        Protocol bgp
Enable a BIER VPN BGP address family;
Bgp 100
    Ipv4-family bier-vpn
        Peer 2.2.2.22 enable
        Peer 3.3.3.33 enable
```
2. Perform the following configuration on the PE 2:
```
#Configure a VPN instance;
Ip vpn-instance bier_vpn
    Ipv4-family
        Route-distinguisher 1:1
        Vpn-target 1:1 export-extcommunity
        Vpn-target 1:1 import-extcommunity
#Bind, to the VPN instance, an interface connected to a
    CE;
Interface LoopBack 0
    Ip binding vpn-instance bier_vpn
    Ip address 2.1.1.2 255.255.255.255
Interface PE2_to_CE2
    Ip binding vpn-instance bier_vpn
#Configure an ISIS instance and bind the instance to a
    vpn;
Isis 1 vpn-instance bier_vpn
    Bier enable
#Configure a BIER VPN instance, specify a service ID,
    and configure a sub-domain;
Bier vpn-instance bier_vpn
    Service-id apply mpls label
    Sub-domain 0
        Bfr-prefix interface LoopBack 0
        Encapsulation-type mpls bsl 64 max-si 255
        Protocol Isis
        Protocol bgp
Enable a BIER VPN BGP address family;
Bgp 100
    Ipv4-family bier-vpn
        Peer 1.1.1.11 enable
        Peer 3.3.3.33 enable
```
3. Perform the following configuration on the PE 3:
```
#Configure a VPN instance;
Ip vpn-instance bier_vpn
    Ipv4-family
        Route-distinguisher 1:1
        Vpn-target 1:1 export-extcommunity
        Vpn-target 1:1 import-extcommunity
#Bind, to the VPN instance, an interface connected to a
    CE;
Interface LoopBack 0
    Ip binding vpn-instance bier_vpn
    Ip address 2.1.1.3 255.255.255.255
```

Figure 15:
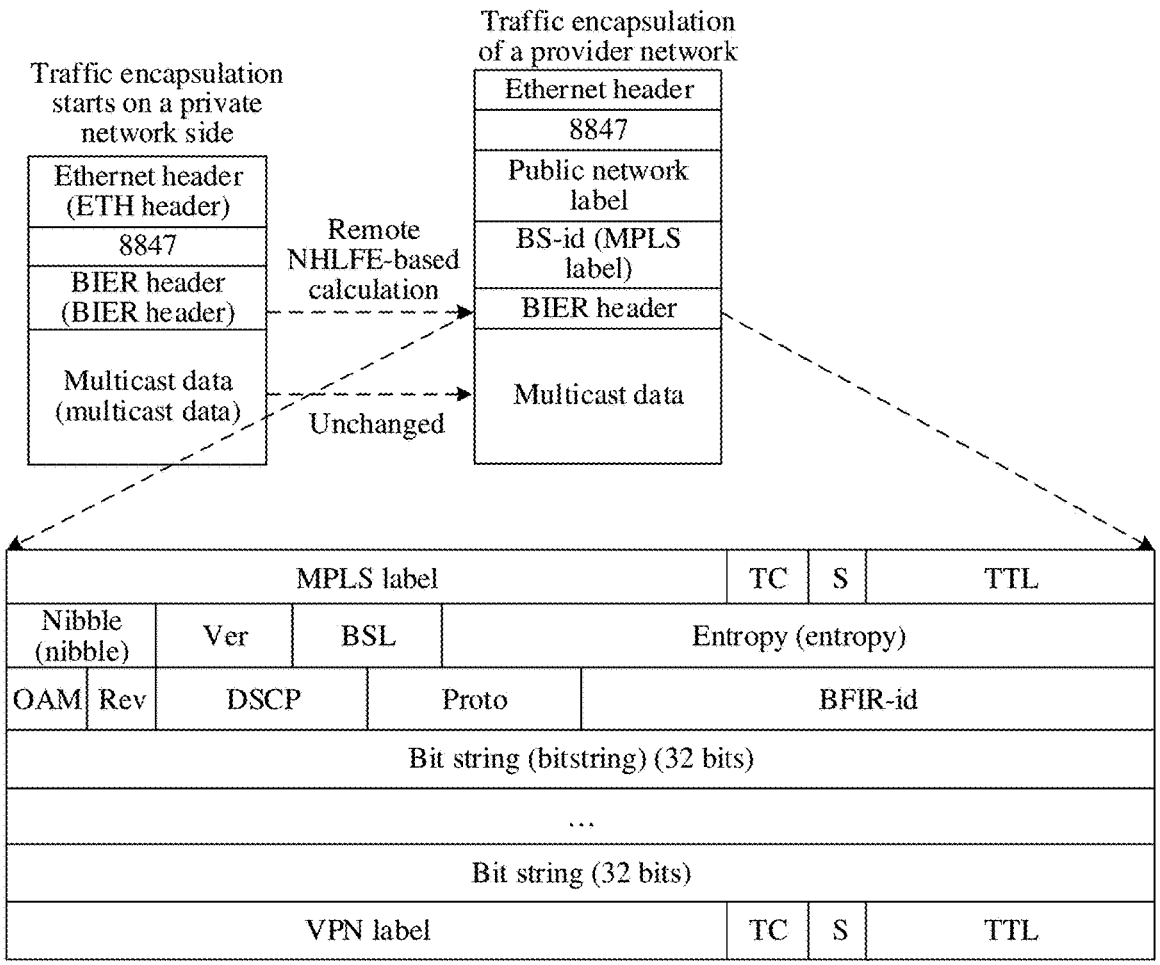
FIG. 15 is a schematic diagram of a BIER packet encapsulation manner in a provider network according to an embodiment of this application.

Interface PE3_to_CE3
    Ip binding vpn-instance bier_vpn
Configure an ISIS instance and bind the instance to a vpn;
Isis 1 vpn-instance bier_vpn
    Bier enable
Configure a BIER VPN instance, specify a service ID, and configure a sub-domain;
Bier vpn-instance bier_vpn
    Service-id apply mpls label
    Sub-domain 0
        Bfr-prefix interface LoopBack 0
        Encapsulation-type mpls bsl 64 max-si 255
        Protocol Isis
        Protocol bgp
Enable a BIER VPN BGP address family;
Bgp 100
    Ipv4-family bier-vpn
        Peer 1.1.1.11 enable
        Peer 2.2.2.22 enable The PE 1 is used as an example. Steps performed by the PE 1 are similar to those performed by the PE 1 in the foregoing Scenario 1, and details are not described in this scenario. FIG. 15 shows a result of encapsulating a BIER packet by a PE 1 based on a packet encapsulation type of a provider network in Scenario 4. BS-id indicates an identifier of a VPN, and BS-id is stored in an MPLS label of an Ethernet packet header. For encapsulation of data sent from the PE 1 to a PE 2, a BS-id value is filled with 2001. For encapsulation of data sent from the PE 1 to the PE 2, a BS-id value is filled with 3001. The PE 2 is used as an example. After receiving a data flow, the PE 2 determines, based on the label 2001, a BIER VPN to which the data flow belongs, and determines, based on the label 2001, a subsequent forwarding behavior: querying a BIER MPLS BIFT table in the BIER VPN based on a BIER header following the label 2001, and encapsulating a BIER MPLS header into a BIER flow sent to a CE side. In addition, a new BIER header is generated by performing remote NHLFE-based calculation on a BIER header, and multicast data remains unchanged.

In the new BIER header, MPLS label indicates an MPLS label, TC indicates a traffic type, S indicates a label stack bottom identifier, and TTL indicates time to live; nibble is a fixed value, and is used to distinguish between BIER encapsulation and an equal cost multipath (ECMP) function of MPLS, ver indicates a version number, BSL indicates a length of a bit string, and entropy indicates entropy and supports ECMP; OAM may be omitted, Rev indicates a reserved field, DSCP is not used in MPLS encapsulation and is used in non-MPLS encapsulation, proto indicates a type of a packet load, BFIR-id indicates a BFR ID value of a first BIER router at which a multicast data packet enters a BIER network, a bit string indicates a group of BIER routers, and VPN label indicates a VPN label, which is optional.

Figure 16:
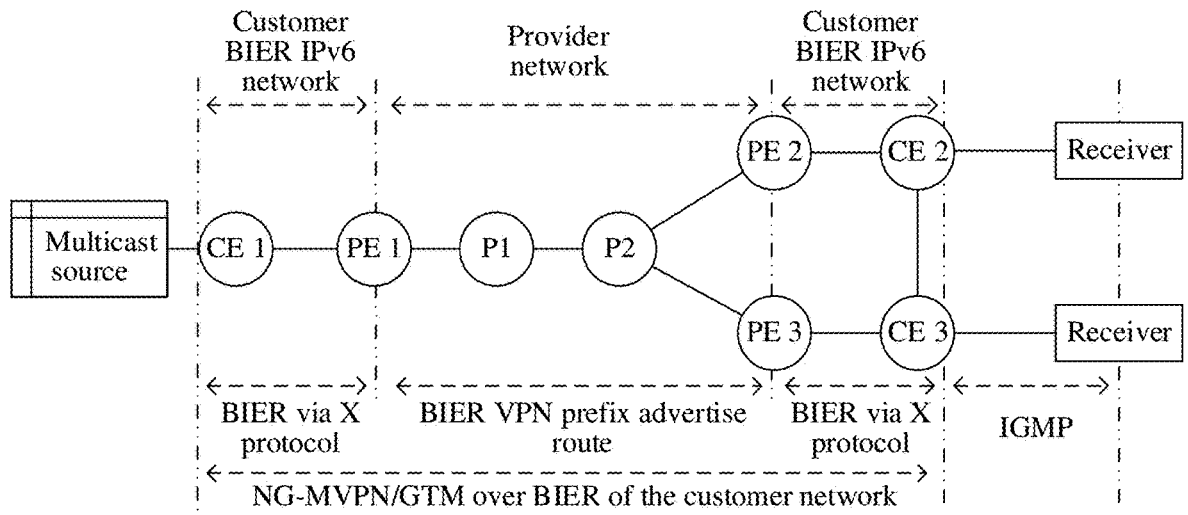
FIG. 16 is a schematic diagram of an implementation scenario of packet transmission according to an embodiment of this application.

Scenario 5: Refer to FIG. 16. A first network and a second network run a BIER IPv6 protocol, and a BIER packet encapsulation type in a provider network is point to point multi-protocol label-label switch path encapsulation (BIER MPLS over P2P MPLS LSP). Before packet transmission is performed, the following configuration is performed on a PE 1, a PE 2, and a PE 3.

1. Perform the following configuration on the PE 1:
Configure a VPN instance;
Ip vpn-instance bier_vpn
    Ipv6-family
        Route-distinguisher 1:1
        Vpn-target 1:1 export-extcommunity
        Vpn-target 1:1 import-extcommunity
Bind, to the VPN instance, an interface connected to a CE;
Interface LoopBack 0
    Ipv6 enable
    Ip binding vpn-instance bier_vpn
    Ipv6 address 2::1:1 128
Interface PE1_to_CE1
    Ip binding vpn-instance bier_vpn
Configure an ISIS instance and bind the instance to a vpn;
Isis 1 vpn-instance bier_vpn
    Bier enable
Configure a BIER VPN instance, specify a service ID, and configure a sub-domain;
Bier vpn-instance bier_vpn
    Service-id apply mpls label
    Sub-domain 0 ipv6
        Bfr-prefix interface LoopBack 0
        Encapsulation-type ipv6 bsl 64 max-si 255
        Protocol Isis
        Protocol bgp
Enable a BIER VPN BGP address family;
Bgp 100
    Ipv6-family bier-vpn
        Peer 2.2.2.22 enable
        Peer 3.3.3.33 enable 2. Perform the following configuration on the PE 2:
Configure a VPN instance;
Ip vpn-instance bier_vpn
    Ipv6-family
        Route-distinguisher 1:1
        Vpn-target 1:1 export-extcommunity
        Vpn-target 1:1 import-extcommunity
Bind, to the VPN instance, an interface connected to a CE;
Interface LoopBack 0
    Ipv6 enable
    Ip binding vpn-instance bier_vpn
    Ip address 2::1:2 128
Interface PE2_to_CE2
    Ip binding vpn-instance bier_vpn
Configure an ISIS instance and bind the instance to a vpn;
Isis 1 vpn-instance bier_vpn
    Bier enable
Configure a BIER VPN instance, specify a service ID, and configure a sub-domain;
Bier vpn-instance bier_vpn
    Service-id apply mpls label
    Sub-domain 0 ipv6
        Bfr-prefix interface LoopBack 0
        Encapsulation-type ipv6 bsl 64 max-si 255
        Protocol Isis
        Protocol bgp
Enable a BIER VPN BGP address family;
Bgp 100
    Ipv6-family bier-vpn
        Peer 1.1.1.11 enable
        Peer 3.3.3.33 enable 3. Perform the following configuration on the PE 3:
Configure a VPN instance;
Ip vpn-instance bier_vpn
    Ipv6-family
        Route-distinguisher 1:1
        Vpn-target 1:1 export-extcommunity
        Vpn-target 1:1 import-extcommunity

```
#Bind, to the VPN instance, an interface connected to a
    CE;
Interface LoopBack 0
  Ipv6 enable
  Ip binding vpn-instance bier_vpn
  Ip address 2::1:3 128
Interface PE3_to_CE3
  Ip binding vpn-instance bier_vpn
#Configure an ISIS instance and bind the instance to a
    vpn;
Isis 1 vpn-instance bier_vpn
  Bier enable
#Configure a BIER VPN instance, specify a service ID,
    and configure a sub-domain;
Bier vpn-instance bier_vpn
  Service-id apply mpls label
  Sub-domain 0 ipv6
    Bfr-prefix interface LoopBack 0
    Encapsulation-type ipv6 bsl 64 max-si 255
    Protocol Isis
    Protocol bgp
Enable a BIER VPN BGP address family;
Bgp 100
  Ipv6-family bier-vpn
    Peer 1.1.1.11 enable
    Peer 2.2.2.22 enable
```

Figure 17:
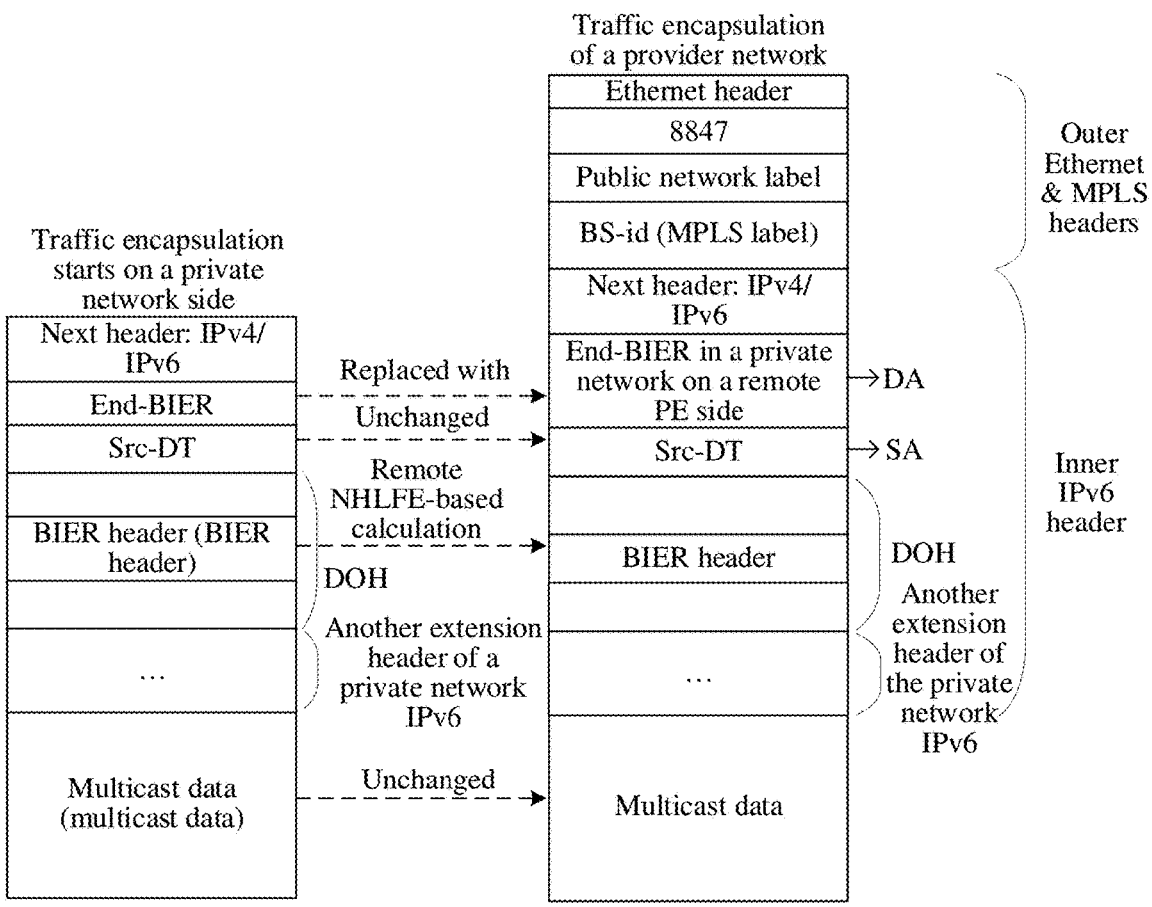
FIG. 17 is a schematic diagram of a BIER packet encapsulation manner in a provider network according to an embodiment of this application.

The PE 1 is used as an example. Steps performed by the PE 1 are similar to those performed by the PE 1 in the foregoing Scenario 1, and details are not described in this scenario. FIG. 17 shows a result of encapsulating a BIER packet by a PE 1 based on a packet encapsulation type of a provider network in Scenario 5. BS-id indicates an identifier of a VPN, and BS-id is stored in an MPLS label of an IPv6 packet header. For encapsulation of data sent from the PE 1 to a PE 2, a BS-id value is filled with 2001. For encapsulation of data sent from the PE 1 to the PE 2, a BS-id value is filled with 3001. The PE 2 is used as an example. After receiving a data flow, the PE 2 determines, based on the label 2001, a BIER VPN to which traffic belongs; after removing an MPLS label, queries a BIERv6 BIFT table in the BIER VPN based on a destination address and a DOH of an inner IPv6 header, and encapsulates a BIERv6 header into a BIER flow sent to a CE side. In addition, end-BIER (End-BIER) is replaced with private network End-BIER on a remote PE side, and Src-DT remains unchanged. A new BIER header is generated by performing NHLFE-based calculation on a BIER header, and multicast data remains unchanged.

Figure 18:
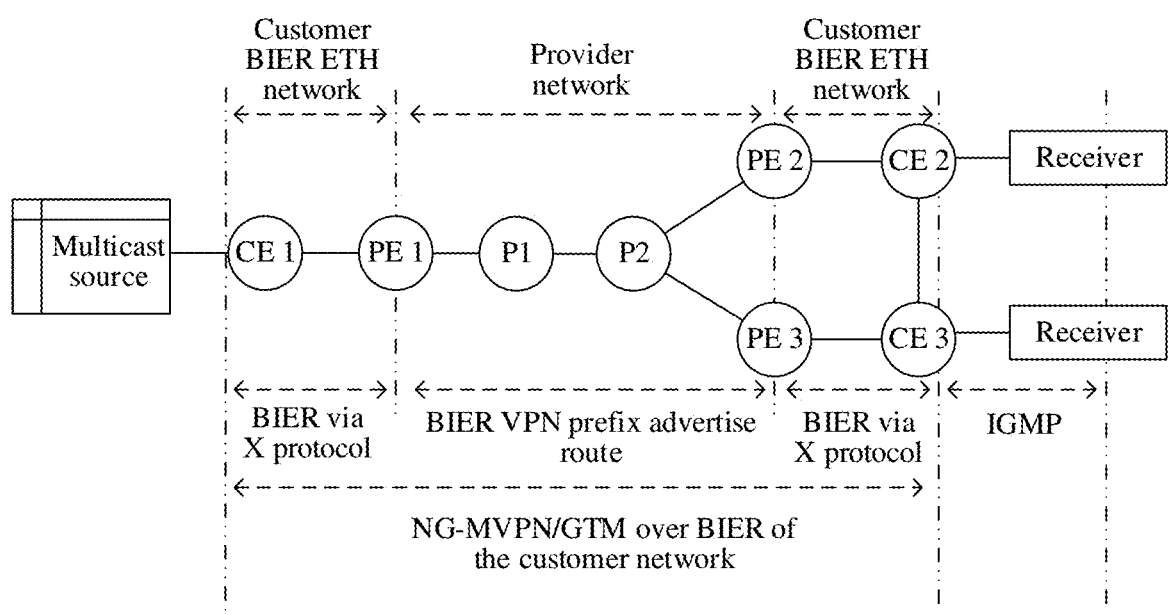
FIG. 18 is a schematic diagram of an implementation scenario of packet transmission according to an embodiment of this application.

Scenario 6: Refer to FIG. 18. A first network and a second network run a BIER Ethernet protocol, and a BIER packet encapsulation type in a provider network is point to point multi-protocol label-label switch path encapsulation (BIER MPLS over P2P MPLS LSP). Before packet transmission is performed, the following configuration is performed on a PE 1, a PE 2, and a PE 3.

1. Perform the following configuration on the PE 1:
```
#Configure a VPN instance;
Ip vpn-instance bier_vpn
  Ipv4-family
    Route-distinguisher 1:1
    Vpn-target 1:1 export-extcommunity
    Vpn-target 1:1 import-extcommunity
#Bind, to the VPN instance, an interface connected to a
    CE;
Interface LoopBack 0
  Ip binding vpn-instance bier_vpn
  Ip address 2.1.1.1 255.255.255.255
Interface PE1_to_CE1
  Ip binding vpn-instance bier_vpn
#Configure an ISIS instance and bind the instance to a
    vpn;
Isis 1 vpn-instance bier_vpn
  Bier enable
#Configure a BIER VPN instance, specify a service ID,
    and configure a sub-domain;
Bier vpn-instance bier_vpn
  Service-id apply mpls label
  Sub-domain 0
    Bfr-prefix interface LoopBack 0
    Encapsulation-type ethernet bsl 64 max-si 255
    Protocol Isis
    Protocol bgp
Enable a BIER VPN BGP address family;
Bgp 100
  Ipv4-family bier-vpn
    Peer 2.2.2.22 enable
    Peer 3.3.3.33 enable
```
2. Perform the following configuration on the PE 2:
```
#Configure a VPN instance;
Ip vpn-instance bier_vpn
  Ipv4-family
    Route-distinguisher 1:1
    Vpn-target 1:1 export-extcommunity
    Vpn-target 1:1 import-extcommunity
#Bind, to the VPN instance, an interface connected to a
    CE;
Interface LoopBack 0
  Ip binding vpn-instance bier_vpn
  Ip address 2.1.1.2 255.255.255.255
Interface PE2_to_CE2
  Ip binding vpn-instance bier_vpn
#Configure an ISIS instance and bind the instance to a
    vpn;
Isis 1 vpn-instance bier_vpn
  Bier enable
#Configure a BIER VPN instance, specify a service ID,
    and configure a sub-domain;
Bier vpn-instance bier_vpn
  Service-id apply mpls label
  Sub-domain 0
    Bfr-prefix interface LoopBack 0
    Encapsulation-type ethernet bsl 64 max-si 255
    Protocol Isis
    Protocol bgp
Enable a BIER VPN BGP address family;
Bgp 100
  Ipv4-family bier-vpn
    Peer 1.1.1.11 enable
    Peer 3.3.3.33 enable
```
3. Perform the following configuration on the PE 3:
```
#Configure a VPN instance;
Ip vpn-instance bier_vpn
  Ipv4-family
    Route-distinguisher 1:1
    Vpn-target 1:1 export-extcommunity
    Vpn-target 1:1 import-extcommunity
#Bind, to the VPN instance, an interface connected to a
    CE;
Interface LoopBack 0
  Ip binding vpn-instance bier_vpn
  Ip address 2.1.1.3 255.255.255.255
Interface PE3_to_CE3
  Ip binding vpn-instance bier_vpn
#Configure an ISIS instance and bind the instance to a
    vpn;
```

```
Isis 1 vpn-instance bier_vpn
    Bier enable
#Configure a BIER VPN instance, specify a service ID,
    and configure a sub-domain;
Bier vpn-instance bier_vpn
    Service-id apply mpls label
    Sub-domain 0
        Bfr-prefix interface LoopBack 0
        Encapsulation-type ethernet bsl 64 max-si 255
        Protocol Isis
        Protocol bgp
Enable a BIER VPN BGP address family;
Bgp 100
    Ipv4-family bier-vpn
        Peer 1.1.1.11 enable
        Peer 2.2.2.22 enable
```

Figure 19:
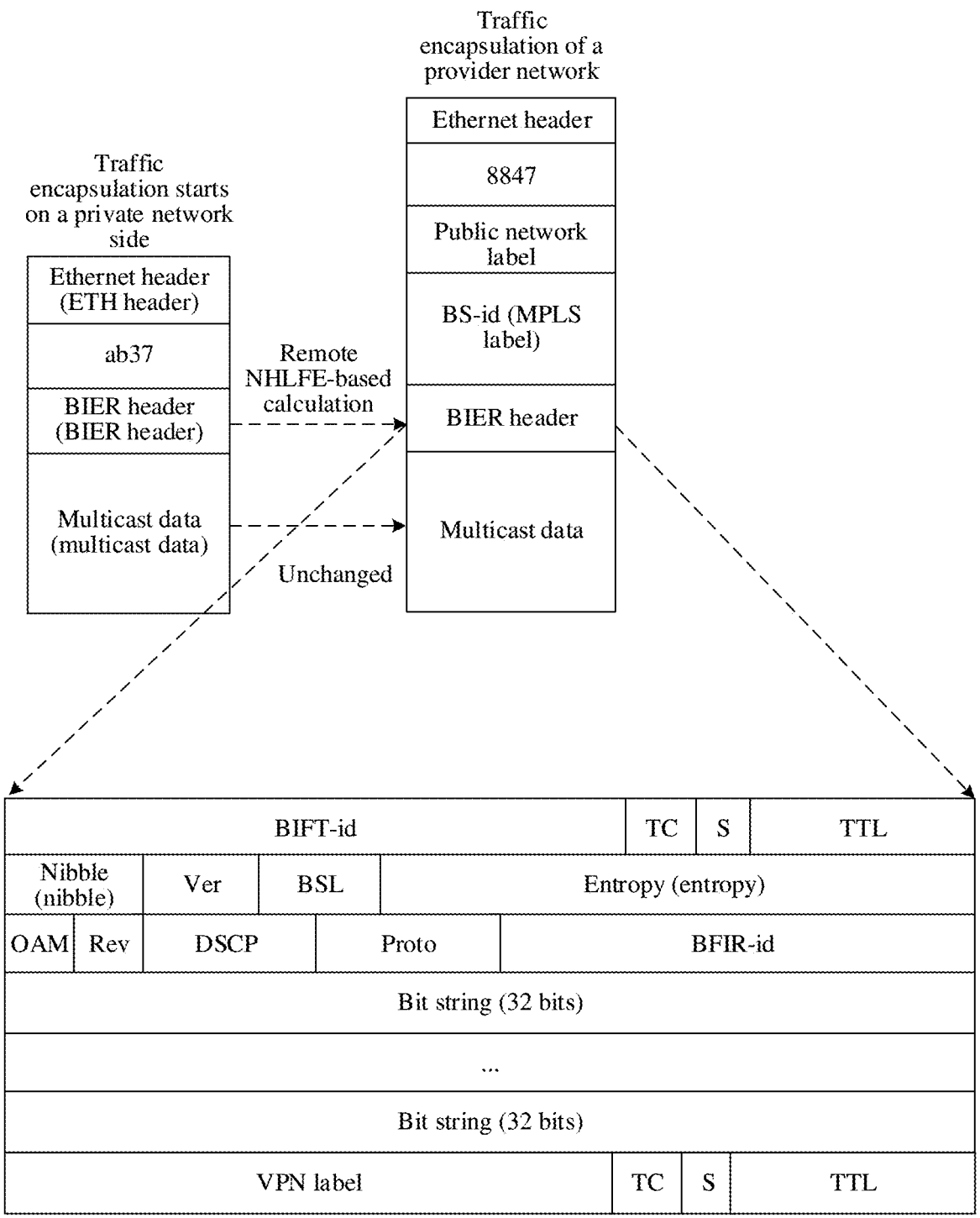
FIG. 19 is a schematic diagram of a BIER packet encapsulation manner in a provider network according to an embodiment of this application.

The PE 1 is used as an example. Steps performed by the PE 1 are similar to those performed by the PE 1 in the foregoing Scenario 1, and details are not described in this scenario. FIG. 19 shows a result of encapsulating a BIER packet by a PE 1 based on a packet encapsulation type of a provider network in Scenario 6. BS-id indicates an identifier of a VPN, and BS-id is stored in an MPLS label of an IPv6 packet header. For encapsulation of data sent from the PE 1 to a PE 2, a BS-id value is filled with 2001. For encapsulation of data sent from the PE 1 to the PE 2, a BS-id value is filled with 3001. Ethernet code is adjusted from ab37 to 8847 during sending. The PE 2 is used as an example. After receiving a data flow, the PE 2 determines, based on the label 2001, a BIER VPN to which traffic belongs, and determines, based on the label 2001, a subsequent forwarding behavior: querying a BIER ETH BIFT table in the BIER VPN based on a BIER header following the label 2001, and encapsulating a BIER ETH header into a BIER flow sent to a CE side (where the Ethernet header is adjusted from 8847 back to ab37). In addition, a new BIER header is generated by performing NHLFE-based calculation on a BIER header, and multicast data remains unchanged.

In the new BIER header, BIFT-id identifies a forwarding table, TC indicates a traffic type, S indicates a label stack bottom identifier, and TTL indicates time to live; nibble is a fixed value, and is used to distinguish between BIER encapsulation and an equal cost multipath (ECMP) function of MPLS, Ver indicates a version number, BSL indicates a length of a bit string, and entropy indicates entropy and supports ECMP; OAM may be omitted, Rev indicates a reserved field, DSCP is not used in MPLS encapsulation and is used in non-MPLS encapsulation, proto indicates a type of a packet load, BFIR-id indicates a BFR ID value of a first BIER router at which a multicast data packet enters a BIER network, a bit string indicates a group of BIER routers, and VPN label indicates a VPN label, which is optional.

Figure 20:
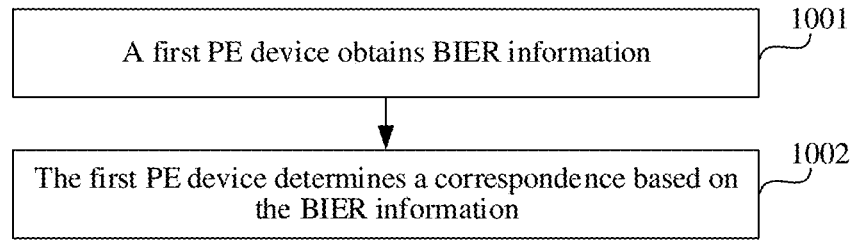
FIG. 20 is a flowchart of a correspondence obtaining method according to an embodiment of this application.

The following describes a correspondence obtaining method. With reference to the scenario shown in FIG. 4, as shown in FIG. 20, an example in which a first PE performs the correspondence obtaining method is used for description. The method includes but is not limited to the following step 1001 and step 1002.

Step 1001: The first PE obtains BIER information.

In this embodiment, the BIER information includes at least one of first BIER information and second BIER information. The first BIER information includes learned BIER information of a second CE. The second BIER information includes BIER information of a second PE and BIER information of a third CE that are sent by the second PE. The second CE and the third CE are devices in a first VPN, the second CE is a device in a site connected to the first PE, and the third CE is a device in a site connected to the second PE.

The BIER information of the second CE includes a BFR ID. Optionally, the BIER information of the second CE further includes a BFR prefix. The BIER information of the second PE includes a second identifier. The BIER information of the second PE may further include at least one of a route distinguisher RD and a route target RT, and the RD and the RT identify a VPN. Optionally, the BIER information of the second PE further includes a BFR prefix. The BIER information of the third CE includes a BFR ID of the third CE. Optionally, the BIER information of the third CE further includes a BFR prefix.

Step 1002: The first PE determines a correspondence based on the BIER information.

The correspondence is used by the first PE to transmit a BIER packet. Optionally, the correspondence includes at least one of a first relationship and a second relationship. The first relationship includes a first forwarding bit mask and an identifier of the first VPN, the first forwarding bit mask is obtained based on the BFR ID of the second CE, and the identifier of the first VPN is used by the first PE to identify the first VPN to which the second CE belongs.

The second relationship includes a second forwarding bit mask, the identifier of the first VPN, and the second identifier, the second forwarding bit mask is obtained based on the BFR ID of the third CE, and the second identifier is used by the second PE to identify a VPN to which the BIER packet belongs.

In a possible implementation, that the first PE determines a correspondence based on the BIER information includes: The first PE determines the first forwarding bit mask based on the BFR ID of the second CE, determines the identifier of the first VPN based on a VPN bound to a connection interface between the first PE and the second CE, and determines the first relationship based on the first forwarding bit mask and the identifier of the first VPN.

Optionally, that the first PE determines a correspondence based on the BIER information includes: The first PE determines the second forwarding bit mask based on the BFR ID of the third CE, determines the identifier of the first VPN based on the RD or the RT, determines, based on the BIER information of the second PE, that the second PE is a remote neighbor of the first PE, determines the second identifier based on the BIER information of the remote neighbor, and determines the second relationship based on the second forwarding bit mask, the identifier of the first VPN, and the second identifier.

A manner of determining the remote neighbor based on the BIER information of the second PE is not limited in this embodiment of this application. For example, the BIER information of the second PE further includes an originating router internet protocol (IP) address of the second PE. The determining, based on the BIER information of the second PE, that the second PE is a remote neighbor of the first PE includes: determining, as the remote neighbor of the first PE based on the originating router IP address in the BIER information of the second PE, the second PE to which BIER information carrying a same originating router IP address as the third CE belongs.

For the second relationship from the first PE to the second PE, a key of the second relationship includes a sub-domain identifier, a bit string length BSL, a BFR prefix of the remote neighbor, and an identifier of a VPN. The bit string length is used to limit a length of one bit string in a forwarding entry, namely, the second relationship, and the bit string indicates a group of devices that support BIER packet transmission on a BIER packet transmission path. The sub-domain identifier identifies a sub-domain of a network for BIER packet transmission. In this embodiment, the network for BIER packet transmission is referred to as a BIER domain. To improve extensibility of a BIER network, the BIER domain is divided into several sub-domains, and sub-domain identifiers are allocated. In other words, the sub-domain identifier is used to locate a BIER domain to which user equipment receiving the BIER packet belongs. It should be noted that, in this embodiment, sub-domain identifiers in different VPNs each are independently obtained through division and are not affected by another VPN.

In a possible implementation, after the first PE obtains the BIER information, the method further includes: generating a link state database based on the BIER information of the third CE; and advertising the link state database to a first CE.

The generating a link state database based on the BIER information of the third CE includes: The first PE generates the link state database based on the BFR ID of the third CE being valid.

Optionally, the advertising the link state database to a first CE includes: sending first signaling to the first CE, where the first signaling carries the link state database, and the first signaling includes BIER via border gateway protocol (BGP) signaling, BIER via intermediate system to intermediate system (ISIS) signaling, or BIER via open shortest path first (OSPF) signaling.

In a possible implementation, that the first PE obtains BIER information includes: The first PE receives second signaling sent by the second PE, where the second signaling carries the second BIER information, and the second signaling includes BIER via BGP signaling, BIER via ISIS signaling, or BIER via OSPF signaling. It should be noted that various types of signaling in this embodiment of this application are packets corresponding to various types of signaling. For example, the BGP signaling is a BGP packet, the ISIS signaling is an ISIS packet, and the OSPF signaling is an OSPF packet.

Optionally, when the second signaling includes the BIER via BGP signaling, the second identifier is carried in a BIER service identifier attribute in the BIER via BGP signaling, the BFR ID of the third CE is carried in a BIER service encapsulation attribute in the BIER via BGP signaling, and the RT is carried in an extended community attribute in the BIER via BGP signaling.

The following still uses FIG. 4 as an example to describe a correspondence obtaining process with reference to the method shown in FIG. 20. First, the PE 1 is used as an example to describe how the PE 1 obtains a correspondence on the PE 1.

311: The PE 1 obtains BIER information.

In the embodiment shown in FIG. 4, the BIER information obtained by the PE 1 includes BIER information (which is also referred to as first BIER information) of the CE 4 and the CE 1, BIER information (which is also referred to as second BIER information) of the PE 2 and the CE 2, and BIER information (which is also collectively referred to as second BIER information) of the PE 3 and the CE 3.

The BIER information of the CE 1 is learned by the PE 1 from the CE 1. The BIER information of the CE 4 is learned by the PE 1 from the CE 4. The BIER information of the CE 2 is sent to the PE 1 by the PE 2 and the PE 3 that are connected to the CE 2, and the PE 1 selects, according to an optimal selection policy (for example, a BGP path optimal selection policy), the BIER information of the CE 2 sent by the PE 2. The BIER information of the CE 3 is sent to the PE 1 by the PE 3 connected to the CE 3.

The BIER information of the CE 1 includes a BFR ID of the CE 1. Optionally, the BIER information of the CE 1 further includes a BFR prefix. The BFR prefix of the CE 1 indicates a location of the CE 1 in the network, and the BFR ID of the CE 1 identifies the CE 1. For functions of the BFR prefix and the BFR ID mentioned in the following descriptions, refer to the descriptions herein, and details are not described below again.

The BIER information of the CE 4 includes a BFR ID of the CE 4. Optionally, the BIER information of the CE 4 further includes a BFR prefix of the CE 4.

The BIER information of the PE 2 includes a second identifier (namely, the remote VPN identifier in FIG. 5), the second identifier is an identifier that is configured by the PE 2 and that is used to distinguish, on the PE 2, a VPN to which a packet belongs, and the BIER information of the PE 2 further includes at least one of an RD and an RT. The RD and the RT identify the VPN. Optionally, the BIER information of the PE 2 further includes a BFR prefix of the PE 2. The RD/RT indicates a VPN that has been configured on the PE 2, and is used to enable the PE 1 to learn which VPNs exist on the PE 2. The second identifier is an identifier that is configured by the PE 2 and that the PE 1 needs to encapsulate into a BIER packet in the future, and the identifier is used by the PE 2 to distinguish a VPN to which the BIER packet belongs. Optionally, only one configuration manner of the second identifier is described herein. To be specific, the second identifier is configured by the PE 2. In some other embodiments, the second identifier may alternatively be configured by the PE 1, and advertised to the PE 2 through flooding.

The BIER information of the CE 2 includes a BFR ID of the CE 2. Optionally, the BIER information of the CE 2 further includes a BFR prefix of the CE 2.

The BIER information of the PE 3 includes a second identifier (namely, the remote VPN identifier in FIG. 5), and further includes at least one of an RD and an RT. Optionally, the BIER information of the PE 3 further includes a BFR prefix of the PE 3. Functions and configuration methods of the second identifier and the RD/RT that are included in the BIER information of the PE 3 are consistent with those described above, and details are not described herein again.

The BIER information of the CE 3 includes a BFR ID of the CE 3. Optionally, the BIER information of the CE 3 further includes a BFR prefix of the CE 3.

It should be noted that, as described above, the BIER information of the CE 2 is sent to the PE 1 by the PE 2 and the PE 3 that are connected to the CE 2, and the BIER information of the CE 3 is sent to the PE 1 by the PE 3 connected to the CE 3. Therefore, before the PE 1 obtains the BIER information of the CE 2 and the CE 3, the CE 2 needs to send the BIER information of the CE 2 to the PE 2 and the PE 3, and the CE 3 needs to send the BIER information of the CE 3 to the PE 3. Because in addition to the CE, some intermediate user equipment (namely, non-edge user equipment) may further exist in the second network in which the PE 2 is located and the second network in which the PE 3 is located, the intermediate user equipment may also advertise BIER information of the intermediate user equipment to the PE 2 and the PE 3. In a BIER technology, a BFR ID is usually not configured for a non-edge device. In other words, the BIER information of the intermediate customer device does not carry a valid BFR ID. To reduce a quantity of pieces of BIER information to be sent, the PE 2 and the PE 3 may not send, to the PE 1, the type of BIER information that does not carry a valid BFR ID.

It should be further noted that the BIER information sent by the CE 1 and the CE 4 is received by the PE 1 by using first signaling between the PE 1 and the CE 1 and between the PE 1 and the CE 4, where the first signaling carries the BIER information of the CE 1 and the BIER information of the CE 4. Similarly, the BIER information of the CE 2 is also received by the PE 2 by using first signaling between the PE 2 and the CE 2, and the BIER information of the CE 3 is also received by the PE 3 by using first signaling between the PE 3 and the CE 3. The first signaling includes BIER via BGP signaling, BIER via ISIS signaling, or BIER via OSPF signaling.

The BIER information sent by the PE 2 and the PE 3 is received by the PE 1 by using second signaling between the PE 1 and the PE 2 and between the PE 1 and the PE 3, where the second signaling carries the BIER information of the PE 2, the BIER information of the PE 3, the BIER information of the CE 2, and the BIER information of the CE 3. The second signaling includes BIER via BGP signaling, BIER via ISIS signaling, or BIER via OSPF signaling.

312: The PE 1 determines a correspondence based on the BIER information.

The correspondence includes at least one of a first relationship and a second relationship. First, a process in which the PE 1 determines the first relationship is described. It can be learned from FIG. 4 that the first relationship on the PE 1 is a correspondence from the PE 1 to the CE 4. The PE 1 generates a corresponding first forwarding bit mask "1000" based on the BFR ID "4" in the BIER information of the CE 4, determines, based on the BIER information of the CE 4 sent by the CE 4, that the CE 4 is a local directly connected device and no second identifier exists, and generates an identifier of a corresponding first VPN based on a VPN configured for a connection interface between the PE 1 and the CE 4. As shown in FIG. 5, the PE 1 obtains the first relationship from the PE 1 to the CE 4 based on the generated first forwarding bit mask "1000" and the generated identifier of the first VPN.

A process in which the PE 1 determines the second relationship is then described. It can be learned from FIG. 4 that the second relationship on the PE 1 includes a correspondence from the PE 1 to the PE 2 and a correspondence from the PE 1 to the PE 3. An example in which the PE 1 determines the second relationship from the PE 1 to the PE 2 is used for description below. The PE 1 generates a corresponding second forwarding bit mask "0010" based on the BFR ID "2" in the BIER information of the CE 2; determines, based on the BIER information of the CE 2 and the BIER information of the PE 2 that are sent by the PE 2, that the CE 2 is a remote device, where for the PE 1 to the CE 2, a remote neighbor of the PE 1 is the PE 2; generates an identifier of a corresponding first VPN based on the RD/RT in the BIER information of the PE 2; and adds the second identifier in the BIER information of the PE 2 to the second relationship. As shown in FIG. 5, the PE 1 obtains the second relationship from the PE 1 to the PE 2 based on the second forwarding bit mask "0010", the identifier of the first VPN, and the second identifier.

It should be noted that for a process in which the PE 1 determines the second relationship from the PE 1 to the PE 3, refer to a process in which the PE 1 determines the second relationship from the PE 1 to the PE 2. Details are not described in this embodiment of this application. In addition, how the PE 1 determines that the remote neighbor of the PE 1 is the PE 2 is described herein. The BIER information of the PE 2 and the BIER information of the CE 2 that are sent by the PE 2 to the PE 1 each carry an originating router IP address, and the BIER information of the PE 2 carries an originating router IP address of the PE 2. However, in the BIER information of the CE 2 sent by the PE 2 to the PE 1, the PE 2 adds the originating router IP address of the PE 2 to the BIER information of the CE 2, so that the BIER information of the PE 2 and the BIER information of the CE 2 carry the same originating router IP address. Therefore, the PE 1 finds the PE 2 corresponding to the BIER information whose originating router IP address is the same as that in the BIER information of the CE 2, and uses the PE 2 as the remote neighbor of the PE 1.

It should be further noted that, after the PE 1 obtains the BIER information of the CE 2 sent by the PE 2 and the BIER information of the CE 3 sent by the PE 3, the PE 1 further generates a link state database based on the BIER information of the CE 2 and the BIER information of the CE 3, and sends the first signaling to the CE 1 by including the link state database in the first signaling, so that the CE 1 can generate a correspondence on the CE 1 based on the link state database.

Figure 21:
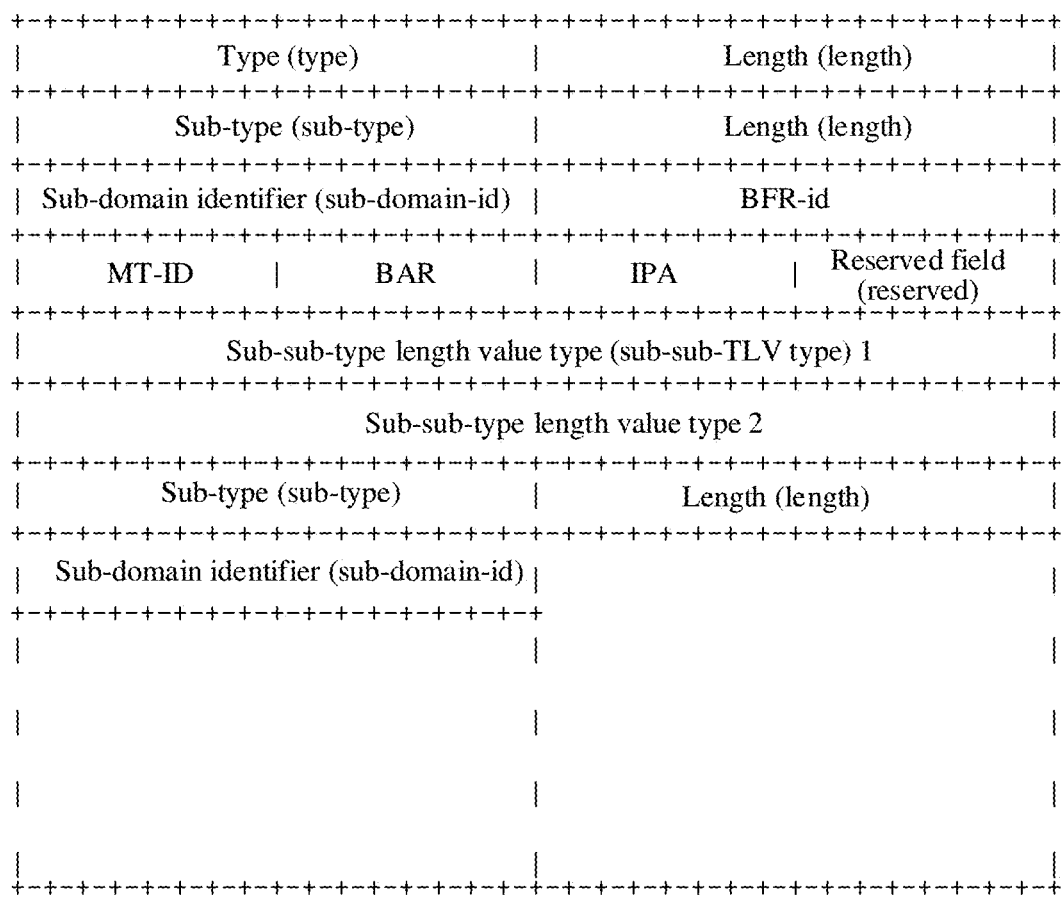
FIG. 21 is a schematic diagram of a manner of carrying a BIER service encapsulation attribute according to an embodiment of this application.

FIG. 21 is a schematic diagram of a manner of carrying sub-domain information according to an embodiment of this application. In this embodiment, the sub-domain information is carried in an extended attribute of border gateway protocol (BGP) signaling, and the extended attribute is referred to as a BIER service encapsulation attribute. The BIER service encapsulation attribute may include one or more pieces of sub-domain information, which is carried in a sub-type length value (sub-tlv) field. FIG. 21 shows specific content of the sub-type length value (sub-tlv) field. In the field, sub-tlv of each sub-domain may carry one bit-forwarding router identifier (BFR ID). Optionally, when sub-tlv of the sub-domain does not carry the BFR ID, a value of a BFR ID field is a preset reference value. For example, when the sub-domain does not carry the BFR ID, a corresponding field filled with a BFR ID value is set to 0. A type indicates a newly added BIER service attribute type, and sub-type indicates a sub-tlv type in a BIER sub-domain. The BIER service encapsulation attribute may further include zero or more sub-sub-tlv fields. For the sub-sub-tlv field, refer to FIG. 22. In addition, in FIG. 21, a BAR indicates a BIER algorithm, an IPA indicates an interior gateway protocol (IGP) improved algorithm, and a multi-topology identifier (MT ID) indicates identifiers of a plurality of topologies.

FIG. 22 is a schematic diagram of a sub-sub-tlv field, namely, the sub-sub-tlv field provided in FIG. 21, according to an embodiment of this application. As shown in FIG. 22, the sub-sub-type field indicates encapsulation types of a corresponding sub-domain and a bit string length (BSL or BS Len). In addition, in FIG. 22, a maximum SI indicates a maximum sub-domain identifier, and BIFT-id indicates a forwarding table identifier.

FIG. 23 is a schematic diagram of another sub-sub-tlv field, namely, another sub-sub-tlv field that may be provided in FIG. 21, according to an embodiment of this application. As shown in FIG. 23, when a customer network uses BIER IPv6, an attribute further includes BIER IPv6 policy address sub-sub-tlv, where an IPv6 address field is a BIER IPv6 policy address.

FIG. 24 shows some fields included in second signaling according to an embodiment of this application. The second signaling shown in this embodiment is extended BGP signaling, and the extended BGP signaling is used when a BIER packet encapsulation type of a provider network is BIER over IPv6 unicast or BIER over IPv4 unicast.

As shown in FIG. 24, the some fields of the second signaling include a route distinguisher (RD), a BFR prefix, and an originating router IP address that are carried in BIER information. The route distinguisher (RD) identifies a VPN. An IP prefix length (IP prefix length) indicates a prefix length of a BIER prefix in a customer network. For an IPv4 customer network, a value of the IP prefix length is 32; for an IPv6 customer network, a value of the IP prefix length is 128. An IP prefix (IP prefix) indicates a BFR prefix in the customer network, namely, the BFR prefix carried in the BIER information. The originating router IP address (originating router IP address) identifies a second PE that sends the BIER information in the provider network. Optionally, when the provider network is an IPv4 network, the value is an IPv4 address; when the provider network is an IPv6 network, the value is an IPv6 address.

Optionally, the some fields of the second signaling may further include route flags, used to identify whether the BFR prefix carried in the signaling is a local BFR prefix of a PE sending the signaling. For example, the route flags field is set to a length of one byte, where an L bit is set to 1, and this indicates that the BFR prefix carried in the signaling is a local BFR prefix of the PE sending the signaling.

The following uses the network scenario shown in FIG. 7 as an example to describe a process in which a first PE obtains BIER information.

In FIG. 7, in BIER information of the CE 1, the CE 2, and the CE 3, BFR IDs, sub-domain ids, and BFR prefixes are respectively: CE 1 (BFR ID=1, sub-domain id=0, BFR prefix=1.1.1.1/32), CE 2 (BFR ID=2, sub-domain id=0, BFR prefix=1.1.1.2/32), and CE 3 (BFR ID=3, sub-domain id=0, BFR prefix=1.1.1.3/32). The PE 1, the PE 2, and the PE 3 are configured to implement a connection between a BIER network of a left-side customer (for example, the CE 1) and right-side customers (for example, the CE 2 and the CE 3).

BFR prefixes of the PEs are respectively: PE 1 (BFR-prefix=2.1.1.1/32), PE 2 (BFR-prefix=2.1.1.2/32), and PE 3 (BFR-prefix=2.1.1.3/32). The PE 1, the PE 2, and the PE 3 configure BIER VPN IDs for BIER VPNs. In the scenario described in this embodiment of this application, the BIER VPN ID is a global IP address of a provider public network, and is used to uniquely identify one PE in a provider network. For example, in FIG. 4, the BIER VPN IDs of the PE 1, the PE 2, and the PE 3 are respectively: PE 1 (public network IPv6 1::1 or public network IPv4 1.1.1.11), PE 2 (public network IPv6 2::2 or public network IPv4 2.2.2.22), and PE 3 (public network IPv6 3::3 or public network IPv4 3.3.3.33).

A process in which the PE 1, the PE 2, and the PE 3 obtain BIER information of the PE 1, the PE 2, and the PE 3 from each other is first described. In an implementation, the PE 1, the PE 2, and the PE 3 establish neighbor relationships with each other by using BGP signaling. In another implementation, interconnection between the PE 1, the PE 2, and the PE 3 may alternatively be implemented by using route reflectors. In this way, the PE 1, the PE 2, and the PE 3 advertise the BIER information of the PE 1, the PE 2, and the PE 3 to each other.

For example, the PE 1 advertises the BIER information of the PE 1 to the PE 2 and the PE 3 by using the BGP signaling (namely, second signaling), where the BFR prefix is 2.1.1.1/32, and an RD field is filled with an RD value configured by the PE 1 for the VPN. An L bit in a flags field is set to 1, and an originating router address field is filled with the BIER VPN ID on the PE 1 (where in a public network IPv6 scenario, the field is filled with 1::1; in a public network IPv4 scenario, the field is filled with 1.1.1.11). A BGP signaling field further carries a BIER service encapsulation attribute (BIER service encapsulation attribute), where a value such as MT-ID/IPA/BAR in the attribute inherits relevant information in a corresponding IGP protocol in the VPN of the PE 1. Because no BFR ID of the PE 1 is configured on the PE 1, the BGP signaling may not carry a BIER service identifier attribute (BS-id Attribute).

In addition, the PE 1 learns the BIER information of the CE 1 from the CE 1 by using first signaling, where the information includes the BFR prefix (1.1.1.1/32) and the BFR ID "1" of the CE 1. The PE also advertises the BIER information of the CE 1 to the PE 2 and the PE 3 by using the BGP signaling (namely, the second signaling). The RD field is filled with the RD value configured by the PE 1 for the VPN. The L bit in the flags field is set to 1, and the originating router address field is filled with the BIER VPN ID on the PE 1 (where in the public network IPv6 scenario, the field is filled with 1::1; in the public network IPv4 scenario, the field is filled with 1.1.1.11). The BGP signaling further carries the BIER service encapsulation attribute. Related field values are obtained from the BIER information learned on the CE 1. The BGP signaling further carries a second identifier, namely, a BIER service identifier (BS-id attribute). In the scenario described in this embodiment of this application, when the provider network is an IPv6 network, a BS-id field in the attribute is an IPv6 address. The address is a unique service identifier that is on the PE 1 and that is allocated to a VPN or to some BFR prefixes in the VPN in an IPv6 public network address pool. For example, in FIG. 6, BS-id allocated by the PE 1 to the VPN is 11::1, BS-id allocated by the PE 2 to the VPN is 22::1, and BS-id allocated by the PE 3 to the VPN is 33::1. When the provider network is an IPv4 network, a BS-id field in the attribute is an MPLS label, and the MPLS label is a unique service identifier that is on the PE 1 and that is allocated to the local BIER VPN or to some BFR prefixes in the BIER VPN in MPLS label space. For example, as shown in the foregoing figure, BS-id allocated by the PE 1 to the BIER VPN is 1001, BS-id allocated by the PE 2 to the BIER VPN is 2001, and BS-id allocated by the PE 3 to the BIER VPN is 3001.

Similarly, the PE 2 advertises the BFR prefixes: 2.1.1.2/32 (the BFR prefix of the PE 2), 1.1.1.2/32 (the BFR prefix of the CE 2), and 1.1.1.3/32 (the BFR prefix of the CE 3) to the PE 1 and the PE 3. The PE 3 advertises the BFR prefixes: 2.1.1.3/32 (the BFR prefix of the PE 3), 1.1.1.2/32 (the BFR prefix of the CE 2), and 1.1.1.3/32 (the BFR prefix of the CE 3) to the PE 2 and the PE 3.

In addition, in this embodiment of this application, the PE 1 further performs optimal selection on the received BIER information. For example, according to a BGP route optimal selection policy, for the BIER information of the CE 2 advertised by the PE 2 and the BIER information of the CE 3 advertised by the PE 3, the PE 1 preferentially selects the BIER information of the CE 2 advertised by PE 2. For the BIER information of the CE 3 advertised by the PE 3 and the BIER information of the CE 3 advertised by the PE 2, the PE 1 preferentially selects the BIER information of the CE 3 advertised by the PE 3.

It should be noted that, to reduce a quantity of pieces of BIER information to be advertised, if no sub-domain in the BIER information learned by the PE from the CE carries a valid BFR ID, the PE may not advertise such BIER information to another PE.

That the first PE is the PE 1 in the implementation scenario shown in FIG. 7, and second PEs are the PE 2 and the PE 3 is still used as an example to describe link state database generation.

The PE 1 receives the BFR prefixes: 2.1.1.2/32 (the BFR prefix of the PE 2), 1.1.1.2/32 (the BFR prefix of the CE 2), and 1.1.1.3/32 (the BFR prefix of the CE 3) advertised from the PE 2. The PE 1 receives the BFR prefixes: 2.1.1.3/32 (the BFR prefix of the PE 3), 1.1.1.2/32 (the BFR prefix of the CE 2), and 1.1.1.3/32 (the BFR prefix of the CE 3) advertised from the PE 3. According to the BGP route optimal selection policy, the PE 1 preferentially selects 1.1.1.2/32 (the BFR prefix of the CE 2) advertised by the PE 2, and preferentially selects 1.1.1.3/32 (the BFR prefix of the CE 3) advertised by the PE 3. After completing the foregoing optimal selection, the PE 1 generates 1.1.1.2/32 (the BFR prefix of the CE 2) and 1.1.1.3/32 (the BFR prefix of the CE 3) into a link state database (LSDB) corresponding to an X (ISIS, OSPF, or BGP) protocol in a VPN. Encapsulation information of the BFR prefix in the LSDB is inherited from a BIER service encapsulation attribute (BIER service encapsulation attribute) of corresponding BIER information, and is advertised to the CE 1 by using the first signaling between the PE 1 and the CE 1. It is noted that, to reduce a quantity of cross-site BFR prefixes in the LSDB, if in BIER information, no sub-domain carries a valid BFR ID, the LSDB does not need to be generated for the BIER information.

The implementation scenario shown in FIG. 4 is still used as an example to describe a second relationship generation process.

The first PE is the PE 1 in the implementation scenario shown in FIG. 4, and the second PEs are the PE 2 and the PE 3. The PE 1 receives the BFR prefixes: 2.1.1.2/32 (the BFR prefix of the PE 2), 1.1.1.2/32 (the BFR prefix of the CE 2), and 1.1.1.3/32 (the BFR prefix of the CE 3) advertised from the PE 2. The PE 1 receives the BFR prefixes: 2.1.1.3/32 (the BFR prefix of the PE 3), 1.1.1.2/32 (the BFR prefix of the CE 2), and 1.1.1.3/32 (the BFR prefix of the CE 3) advertised from the PE 3. According to the BGP route optimal selection policy, the PE 1 preferentially selects 1.1.1.2/32 (the BFR prefix of the CE 2) advertised by the PE 2, and preferentially selects 1.1.1.3/32 (the BFR prefix of the CE 3) advertised by the PE 3. After completing the foregoing optimal selection, the PE 1 generates 1.1.1.2/32 (the BFR prefix of the CE 2) and 1.1.1.3/32 (the BFR prefix of the CE 3) into an LSDB corresponding to an X (ISIS, OSPF, or BGP) protocol in a VPN. Encapsulation information of the BFR prefix in the LSDB is inherited from a BIER service encapsulation attribute of corresponding BIER information, and is advertised to the CE 1 by using the first signaling between the PE 1 and the CE 1.

After performing optimal selection on the received BIER information, the PE 1 generates the second relationship, namely, a forwarding entry from the first PE to each second PE, based on an optimal selection result. The forwarding entry is used to guide BIER traffic forwarding across the provider network. The PE 1 determines an originating router IP address of the preferentially selected BIER information, queries for BIER information that includes the same originating router IP address and whose L bit in the flags field is set to 1, and uses a BFR prefix in the BIER information as a remote neighbor. For example, according to the foregoing principle, on the PE 1, a remote neighbor of 1.1.1.2/32 (the BFR prefix of the CE 2) is calculated as the BFR prefix 2.1.1.2/3 2 (the BFR prefix of the PE 2), and a remote BFR neighbor of 1.1.1.3/32 (the BFR prefix of the CE 3) is calculated as the BFR prefix of 2.1.1.3/32 (the BFR prefix of the PE 3).

Then, the PE 1 calculates a bit mask (bit mask) in the forwarding entry based on four granularities whose factors are keys (keys): the sub-domain id, BSL, remote BFR neighbor, and BS-id. For example, when the forwarding entry from the PE 1 to the PE 2 is calculated, keys of the forwarding entry are as follows: sub-domain id=0, BSL=64 (assuming that all PEs and CEs are configured only with BSLs of 64), the BFR neighbor is the BFR prefix 2.1.1.2/32 (the BFR prefix of the PE 2), BS-id=IPv6 address 22::1 or MPLS label 2001 (a BIER service identifier allocated by the PE 2 to the VPN), and the bit mask is 0010 (where the BFR ID of the CE 2 is 2, and other bits whose values are 0 in the bit mask are omitted). When the forwarding entry from the PE 1 to the PE 3 is calculated, keys of the forwarding entry are as follows: sub-domain id=0, BSL=64 (assuming that all PEs and CEs are configured only with BSLs of 64), the BFR neighbor is the BFR prefix 2.1.1.3/32 (the BFR prefix of the PE 3), BS-id=IPv6 address 33::1 or MPLS label 3001 (a BIER service identifier allocated by the PE 3 to the VPN), and the bit mask is 0100 (where the BFR ID of the CE 3 is 3, and other bits whose values are 0 in the bit mask are omitted).

After receiving the BIER information advertised by the PE 1, based on a same processing process, the PE 2 and the PE 3 advertise, to a CE of a connected site, the LSDB obtained based on the BIER information advertised by the PE 1, and calculate the forwarding entry. An encapsulation format of a BIER data flow in the provider network has different representation forms based on BIER encapsulation types of a customer network. For details, refer to the related content descriptions in the packet transmission method shown in FIG. 2. Details are not described herein again.

According to the method provided in this embodiment of this application, a BIER virtual private network VPN and BGP signaling extension are established. In this way, key information such as a BFR prefix, a BFR ID, and a BIER encapsulation type in a customer network, and a BIER service identifier (BS-id) located on a PE in a provider network are mutually advertised and learned between PEs, to establish a correspondence. Based on this, the PE on the provider network receives a packet of the PE, determines, based on a second identifier, a VPN to which a customer BIER packet belongs, and further forwards the customer BIER packet to user equipment corresponding to the VPN.

For ease of understanding, the implementation scenario shown in FIG. 7 is used as an example to describe the second relationship obtaining process provided in this embodiment of this application.

In FIG. 7, the CE 1, the CE 2, and the CE 3 are all located in a same customer network, in other words, the CE 1, the CE 2, and the CE 3 are all located in a same VPN. An interface between the PE 1 and the CE 1, an interface between the PE 2 and the CE 2, and an interface between the PE 3 and the CE 3 are separately bound to the VPN on each PE. It can be learned from the BIER packet transmission path shown in FIG. 7 that, in the customer network, a first sending device of the BIER packet is the CE 1, and the last two receiving devices of the BIER packet are the CE 2 and the CE 3. The CE 1 is used as a first CE, the PE 1 is used as a first PE, and the network to which the CE 1 and the PE 1 belong is used as the first network. When a second CE is the CE 2, the second network includes two sites. A second PE corresponding to one site is the PE 2, and a second PE corresponding to the other site is the PE 3. When a second CE is the CE 3, the second network includes two sites. A second PE corresponding to one site is the PE 3, and a second PE corresponding to the other site is the PE 2. Regardless of whether the second CE is the CE 2 or the second CE is the CE 3, the method described in the embodiment shown in FIG. 20 may be used to obtain the second relationship.

In this embodiment, a bit-forwarding router identifier, a sub-domain identifier, and a BFR prefix are configured for each of the CE 1, the CE 2, and the CE 3. The bit-forwarding router identifier of the CE 1 is 1, the sub-domain identifier is 0, and the BFR prefix is 1.1.1.1/32. The bit-forwarding router identifier of the CE 2 is 2, the sub-domain identifier is 0, and the BFR prefix is 1.1.1.2/32. The bit-forwarding router identifier of the CE 3 is 3, the sub-domain identifier is 0, and the BFR prefix is 1.1.1.3/32.

A sub-domain identifier is configured for each of the PE 1, the PE 2, and the PE 3. In the VPN to which the CE 1, the CE 2, and the CE 3 belong, the PE 1, the PE 2, and the PE 3 are configured with the same sub-domain identifier as the CE 1, the CE 2, and the CE 3, that is, the sub-domain identifier is 0. Because each PE does not act as an edge node in the BIER packet transmission process, no valid bit-forwarding router identifier is configured on each PE in the VPN. BFR prefixes are configured for the PE 1, the PE 2, and the PE 3. The BFR prefix of the PE 1 is configured as 2.1.1.1/32, the BFR prefix of the PE 2 is configured as 2.1.1.2/32, and the BFR prefix of the PE 3 is configured as 2.1.1.3/32. Originating router IP addresses are configured for the PE 1, the PE 2, and the PE 3. When a provider network is an IPv6 network, the originating router IP address of the PE 1 is 1::1; or when a provider network is an IPv4 network, the originating router IP address of the PE 1 is IPv4 1.1.1.11. When a provider network is an IPv6 network, the originating router IP address of the PE 2 is 2::2; or when a provider network is an IPv4 network, the originating router IP address of the PE 2 is 2.2.2.22. When a provider network is an IPv6 network, the originating router IP address of the PE 3 is 3::3; or when a provider network is an IPv4 network, the originating router IP address of the PE 3 is 3.3.3.33.

BIER service identifier attributes are configured for sites connected to the PE 1, the PE 2, and the PE 3. When the provider network is an IPv6 network, a BS-id field in the attribute is an IPv6 address. BS-id allocated by the PE 1 to a VPN in which the connected site is located is 11::1, BS-id allocated by the PE 2 to a VPN in which the connected site is located is 22::1, and BS-id allocated by the PE 3 to a VPN in which the connected site is located is 33::1. When the provider network is an IPv4 network, a BS-id field in the attribute is an MPLS label. BS-id allocated by the PE 1 to the VPN in which the connected site is located is 1001, BS-id allocated by the PE 2 to the VPN in which the connected site is located is 2001, and BS-id allocated by the PE 3 to the VPN in which the connected site is located is 3001.

The PE 1, the PE 2, and the PE 3 advertise BIER information by using first signaling. Optionally, the first signaling may be extended BGP signaling. The PE 1, the PE 2, and the PE 3 may directly establish BGP neighbor relationships with each other, or may be connected to each other by using route reflectors. For example, the following describes a process of obtaining a second relationship, namely, a forwarding entry, by using an example in which a first CE is a CE 1 and a second CE is a CE 2.

801: The CE 2 advertises BIER information of the CE 2 to a PE 2 and a PE 3.

The BIER information of the CE 2 carries a BFR prefix and a BIER service encapsulation attribute of the CE 2. In this example, the BFR prefix carried in the BIER information of the CE 2 is 1.1.1.2/32. In the carried BIER service encapsulation attribute, a sub-domain identifier is 0, a BIER bit-forwarding router identifier is 2, and a bit string length is 64.

802: The PE 2 and the PE 3 receive the BIER information of the CE 2.

The PE 2 keeps the BFR prefix 1.1.1.2/32 and the BIER service encapsulation attribute that are carried in the BIER information of the CE 2 unchanged. In addition, the PE 2 adds a route distinguisher (namely, an RD value) to the BIER information of the CE 2, sets an L bit in a flags field to 1, and fills an originating router IP address with an originating router IP address field of the PE 2. In other words, when a provider network is an IPv6 network, the originating router IP address field is 2::2; or when a provider network is an IPv4 network, the originating router IP address field of the PE 2 is 2.2.2.22. The PE 2 further adds, to the BIER information of the CE 2, a BIER service identifier of a VPN to which the BIER information belongs. In other words, when the provider network is an IPv6 network, the BIER service identifier is 22::1; or when the provider network is an IPv4 network, the BIER service identifier is 2001.

The PE 3 uses, as the BFR prefix and the BIER service encapsulation attribute in the BIER information of the CE 2, the BFR prefix 1.1.1.2/32 and the BIER service encapsulation attribute that are carried in the BIER information of the CE 2. In addition, the PE 3 adds a route distinguisher (namely, an RD value) to the BIER information of the CE 2, sets an L bit in a flags field to 1, and fills an originating router IP address with an originating router IP address field of the PE 3. In other words, when a provider network is an IPv6 network, the originating router IP address field is 3::3; or when a provider network is an IPv4 network, the originating router IP address field of the PE 2 is 3.3.3.33. The PE 3 further adds, to the BIER information of the CE 2, a BIER service identifier of a site to which the CE 2 belongs. In other words, when the provider network is an IPv6 network, the BIER service identifier is 33::1; or when the provider network is an IPv4 network, the BIER service identifier is 3001.

803: The PE 2 advertises BIER information of the PE 2 and the BIER information of the CE 2 to a PE 1, and the PE 3 advertises BIER information of the PE 3 and the BIER information of the CE 2 to the PE 1.

The PE 2 advertises the BIER information of the PE 2 to the PE 1, where the BIER information of the PE 2 carries a BFR prefix 2.1.1.2/32. For a BIER service encapsulation attribute, a value such as MT-ID/IPA/BAR in the attribute inherits related information in a corresponding IGP protocol of the VPN. For a route distinguisher (namely, an RD value), an L bit in a flags field is set to 1. An originating router IP address is filled with the originating router IP address field of the PE 2. In other words, when the provider network is an IPv6 network, the originating router IP address field is 2::2; or when the provider network is an IPv4 network, the originating router IP address field of the PE 2 is 2.2.2.22. Because no bit-forwarding router identifier is configured in the VPN on the PE 2, the BIER information of the PE 2 may not carry a BIER service identifier attribute.

The PE 2 advertises, to the PE 1, the BIER information of the CE 2 obtained in step 802.

The PE 3 advertises the BIER information of the PE 3 to the PE 1, where the BIER information of the PE 3 carries a BFR prefix 2.1.1.3/32. For a BIER service encapsulation attribute, a value such as MT-ID/IPA/BAR in the attribute inherits related information in a corresponding IGP protocol of the VPN. For a route distinguisher (namely, an RD value), an L bit in a flags field is set to 1. An originating router IP address is filled with the originating router IP address field of the PE 3. In other words, when the provider network is an IPv6 network, the originating router IP address field is 3::3; or when the provider network is an IPv4 network, the originating router IP address field of the PE 3 is 3.3.3.33. Because no bit-forwarding router identifier is configured in the VPN on the PE 3, the BIER information of the PE 3 may not carry a BIER service identifier attribute.

The PE 3 advertises, to the PE 1, BIER information of the CE 2 obtained in step 802.

804: The PE 1 receives BIER information of a plurality of CEs 2.

The PE 1 receives the BIER information of the plurality of CEs 2 advertised by the PE 2 and the PE 3. According to a BGP route optimal selection policy, the PE 1 preferentially selects the BIER information of the CE 2 advertised by the PE 2, and uses, as the BIER information of the CE 2, the BIER information of the CE 2 advertised by the PE 2.

805: The PE 1 determines a remote neighbor of the PE 1 based on the BIER information of the CE 2, the BIER information of the PE 2, and the BIER information of the PE 3.

For example, for the BIER information of the CE 2, the PE 1 queries for, from the received BIER information, BIER information that includes a same originating router IP address and whose L bit in a flags field is set to 1, and uses the BIER information as the remote neighbor of the PE 1. In this example, the PE 1 determines that the remote neighbor is the PE 2.

806: The PE 1 obtains the second relationship based on the BIER information of the CE 2 and the remote neighbor.

For example, the PE 1 determines the second relationship based on the sub-domain identifier, the bit string length, the BIER service identifier, and the BFR ID that are carried in the BIER information of the CE 2 and the remote neighbor.

The scenario shown in FIG. 20 is used as an example. The following describes a first relationship generation process.

The PE 1 learns the BIER information of the CE 4, for example, the BFR prefix and first sub-domain information of the CE 4, where the first sub-domain information includes the BFR ID of the CE 4. The PE 1 determines the first forwarding bit mask based on the BFR ID of the CE 4, determines the identifier of the first VPN based on the VPN bound to the connection interface between the PE 1 and the CE 4, and then determines the first relationship based on the first forwarding bit mask and the identifier of the first VPN.

Figure 25:
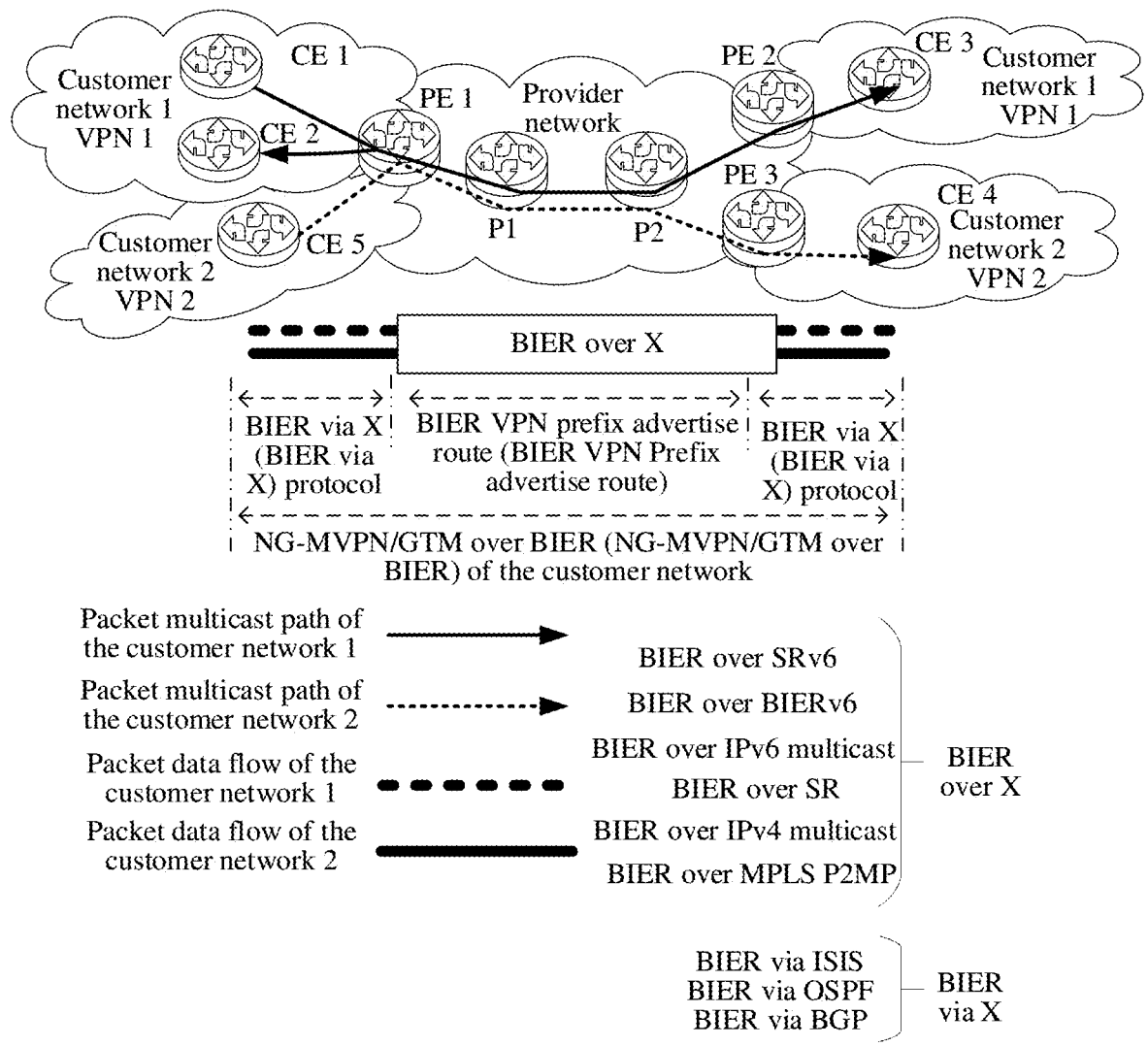
FIG. 25 is a schematic diagram of an implementation scenario of packet transmission according to an embodiment of this application.

It should be noted that the method provided in this embodiment of this application is also applicable to an implementation scenario shown in FIG. 25. As shown in FIG. 25, in addition to being connected to a customer network 1, a PE 1 is further connected to a customer network 2. Because the PE 1 is connected to different customer networks, VPN identifiers included in established correspondences are different. For both a BIER data flow of a customer 1 and a BIER data flow of a customer 2, refer to the packet transmission method shown in FIG. 2. For a process of establishing the correspondence, refer to the method shown in FIG. 20. Details are not described herein again.

In addition, BIER over X in FIG. 25 indicates a packet encapsulation type in a provider public network. As described above, there are at least six types of BIER over X. Details are not described in this embodiment of this application again. A BIER via X protocol is a first signaling type provided in this embodiment of this application. A BIER VPN prefix advertise route is BIER information provided in this embodiment of this application. For related descriptions, refer to the foregoing embodiments. Details are not described herein again.

In the method provided in this embodiment of this application, BIER is provided to a customer side as a service, so that customer network BIER implements interconnection and interworking across VPN sites. A per-flow multicast forwarding status of the customer network does not need to be perceived on any node in a provider network, thereby improving flexibility and flexibility of multicast service deployment.

Figure 26:
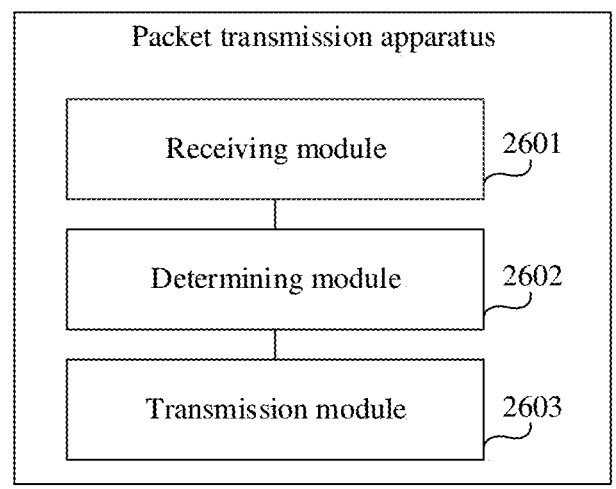
FIG. 26 is a schematic diagram of a structure of a packet transmission apparatus according to an embodiment of this application.

FIG. 26 is a schematic diagram of a packet transmission apparatus according to an embodiment of this application. The apparatus used in a first PE, and may be configured to perform the packet transmission method performed by the first PE. For example, the apparatus may be the PE 1 in FIG. 1, or may be the first PE in FIG. 2 and FIG. 3, and has corresponding functions to perform the packet transmission steps and methods.

In a possible implementation, the apparatus includes the following modules and functions of the modules:
- a receiving module 2601, configured to receive a first BIER packet sent by a first CE;
- a determining module 2602, configured to determine, based on the received first BIER packet, a first VPN to which the first CE belongs; and
- a transmission module 2603, configured to transmit the first BIER packet based on the first VPN.

In a possible implementation, the transmission module 2603 is configured to: determine a correspondence based on the first VPN, and transmit the first BIER packet based on the correspondence, where the correspondence includes at least one of a first relationship and a second relationship; the first relationship includes a correspondence between an identifier of the first VPN and a first forwarding bit mask, the first forwarding bit mask is obtained based on a bit-forwarding router identifier BFR ID of a second CE receiving the first BIER packet, and the second CE is a device in the first VPN; and the second relationship includes a correspondence between a second forwarding bit mask, the identifier of the first VPN, and a second identifier, the second forwarding bit mask is obtained based on a BFR ID of a third CE receiving the first BIER packet, the second identifier is used by a second PE to identify the first VPN to which the first BIER packet belongs, and the third CE receives the first BIER packet via the second PE.

In a possible implementation, the transmission module 2603 is configured to: determine the first forwarding bit mask based on the first VPN and the first relationship, and transmit the first BIER packet based on the first forwarding bit mask.

In a possible implementation, the transmission module 2603 is configured to: determine the second forwarding bit mask and the second identifier based on the first VPN and the second relationship, and transmit the first BIER packet based on the second forwarding bit mask.

In a possible implementation, the first relationship further includes a first packet encapsulation type field. The transmission module 2603 is configured to: encapsulate the first BIER packet based on a first encapsulation type indicated by the first packet encapsulation type field in the first relationship, to obtain a second BIER packet, and transmit the second BIER packet to the second CE based on the first forwarding bit mask.

In a possible implementation, the second relationship further includes a second packet encapsulation type field. The transmission module 2603 is configured to: encapsulate the first BIER packet based on a second encapsulation type indicated by the second packet encapsulation type field in the second relationship, to obtain a third BIER packet, and transmit the third BIER packet to the second PE based on the second forwarding bit mask, where the third BIER packet includes the second identifier.

In a possible implementation, the first encapsulation type includes: BIER over IPv6 unicast, BIER over BIER multicast BIERv6, BIER over IPv6 multicast, BIER over IPv4 unicast, BIER over BIER, BIER over IPv4 multicast, or BIER over multi-protocol label switching MPLS multicast.

In a possible implementation, the second encapsulation type includes: BIER over IPv6 unicast, BIER over BIER multicast BIERv6, BIER over IPv6 multicast, BIER over IPv4 unicast, BIER over BIER, BIER over IPv4 multicast, or BIER over multi-protocol label switching MPLS multicast.

In a possible implementation, when the second encapsulation type includes the BIER over IPv6 unicast, a destination address field of the third BIER packet includes the second identifier; or when the second encapsulation type includes the BIER over MPLS multicast, an MPLS label of the third BIER packet includes the second identifier.

In a possible implementation, the first PE is located in a first network and a provider network, the provider network is connected to the first network and a second network, and the first CE is located in the first network.

In a possible implementation, the second PE is located in the second network and the provider network.

Figure 27:
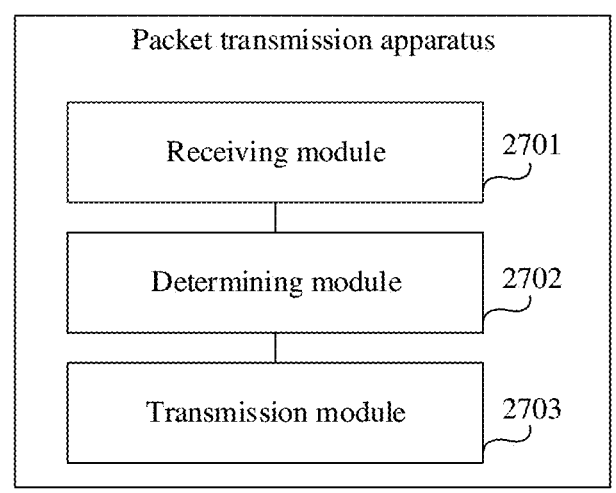
FIG. 27 is a schematic diagram of a structure of a packet transmission apparatus according to an embodiment of this application.

FIG. 27 is a schematic diagram of a packet transmission apparatus according to an embodiment of this application. The apparatus is used in a second PE, and can perform the packet transmission method performed by the second PE. For example, the apparatus may be the PE 2 in FIG. 1, or may be the second PE in FIG. 2 and FIG. 3, and has corresponding functions to perform the packet transmission steps and methods.

In a possible implementation, the apparatus includes the following modules and functions of the modules:

a receiving module 2701, configured to receive a third BIER packet transmitted by a first PE, where the third BIER packet includes a second identifier, and the second identifier is used by a second PE to distinguish a VPN to which the third BIER packet belongs;

a determining module 2702, configured to: determine, based on the second identifier, that a VPN to which the third BIER packet belongs is a first VPN, and determine a third relationship based on the first VPN; and a transmission module 2703, configured to transmit the third BIER packet based on the third relationship.

In a possible implementation, the third relationship includes a third forwarding bit mask, an identifier of the first VPN, and a packet encapsulation type field, the third forwarding bit mask is obtained based on a bit-forwarding router identifier BFR ID of a third CE receiving the third BIER packet, the identifier of the first VPN is used by the second PE to identify the first VPN, and the third CE receives the third BIER packet via the second PE; and the transmission module 2703 is configured to: encapsulate the third BIER packet based on a third encapsulation type indicated by the packet encapsulation type field in the third relationship, to obtain a fourth BIER packet, and transmit the fourth BIER packet to the third CE based on the third forwarding bit mask.

In a possible implementation, the third encapsulation type includes: BIER over IPv6 unicast, BIER over BIER multicast BIERv6, BIER over IPv6 multicast, BIER over IPv4 unicast, BIER over BIER, BIER over IPv4 multicast, or BIER over MPLS multicast.

Figure 28:
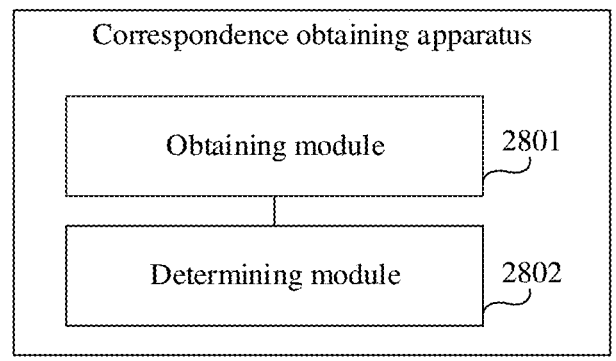
FIG. 28 is a schematic diagram of a structure of a correspondence obtaining apparatus according to an embodiment of this application.

FIG. 28 is a schematic diagram of a correspondence obtaining apparatus according to an embodiment of this application. The apparatus may be used in a first PE device, and can perform the correspondence obtaining method performed by the first PE. For example, the apparatus may be the PE 1 in FIG. 1, or may be the first PE in FIG. 2 and FIG. 3, and has corresponding functions to perform correspondence obtaining steps and methods. The apparatus includes the following modules:

an obtaining module 2801, configured to obtain BIER information, where the BIER information includes at least one of first BIER information and second BIER information, the first BIER information includes BIER information of a second customer edge CE, the second BIER information includes BIER information of a second PE and BIER information of a third CE that are sent by the second PE, and the second CE and the third CE are devices in a first VPN; and a determining module 2802, configured to determine a correspondence based on the BIER information, where the correspondence is used by the first PE to transmit a BIER packet.

In a possible implementation, the correspondence includes at least one of a first relationship and a second relationship; the first relationship includes a first forwarding bit mask and an identifier of the first VPN, the first forwarding bit mask is obtained based on a bit-forwarding router identifier BFR ID of the second CE, and the identifier of the first VPN is used by the first PE to identify the first virtual private network VPN to which the second CE belongs; and the second relationship includes a second forwarding bit mask, the identifier of the first VPN, and a second identifier, the second forwarding bit mask is obtained based on a BFR ID of the third CE, the second identifier is used by the second PE to identify the first VPN to which the first BIER packet belongs, and the third CE receives the BIER packet via the second PE.

In a possible implementation, the BIER information of the second CE includes the BFR ID of the second CE; and the determining module 2802 is configured to: determine the first forwarding bit mask based on the BFR ID of the second CE, determine the identifier of the first VPN based on a VPN bound to a connection interface between the first PE and the second CE, and determine the first relationship based on the first forwarding bit mask and the identifier of the first VPN.

In a possible implementation, the BIER information of the second PE includes the second identifier, the BIER information of the second PE further includes at least one of a route distinguisher RD and a route target RT, the RD and the RT identify a VPN, and the BIER information of the third CE includes the BFR ID of the third CE; and the determining module 2802 is configured to: determine the second forwarding bit mask based on the BFR ID of the third CE, determine the identifier of the first VPN based on the RD or the RT, determine the second identifier based on the BIER information of the second PE, and determine the second relationship based on the second forwarding bit mask, the identifier of the first VPN, and the second identifier.

In a possible implementation, the BIER information of the second PE further includes an originating router IP address of the second PE. The determining module 2802 is configured to: determine, based on the originating router IP address in the BIER information of the second PE, that the second PE is used as a remote neighbor of the first PE, where the second PE includes the originating router IP address that is the same as that of the third CE; and determine the second identifier based on the BIER information of the second PE.

In a possible implementation, after obtaining the bit index explicit replication BIER information, the obtaining module 2801 is further configured to: generate a link state database based on the BIER information of the third CE, and advertise the link state database to a first CE.

In a possible implementation, the obtaining module 2801 is configured to generate the link state database based on the BFR ID of the third CE being valid.

In a possible implementation, the obtaining module 2801 is configured to send first signaling to the first CE, where the first signaling carries the link state database, and the first signaling includes BIER via border gateway protocol BGP signaling, BIER via intermediate system to intermediate system ISIS signaling, or BIER via open shortest path first OSPF signaling.

In a possible implementation, the obtaining module 2801 is configured to receive second signaling sent by the second PE, where the second signaling carries the second BIER information; and the second signaling includes BIER via BGP signaling, BIER via ISIS signaling, or BIER via OSPF signaling.

In a possible implementation, when the second signaling includes the BIER via BGP signaling, the second identifier is carried in a BIER service identifier attribute in the BIER via BGP signaling, the BFR ID of the third CE is carried in a BIER service encapsulation attribute in the BIER via BGP signaling, and the RT is carried in an extended community attribute in the BIER via BGP signaling.

It should be understood that, when the apparatuses provided in FIG. 26 to FIG. 28 implement functions of the apparatuses, division of the foregoing functional modules is merely used as an example for description. During actual application, the foregoing functions may be allocated to different functional modules for implementation according to a requirement. In other words, an internal structure of the device is divided into different functional modules to implement all or part of the functions described above. In addition, the apparatus provided in the foregoing embodiment and the method embodiment belong to a same concept. For a specific implementation process thereof, refer to the method embodiment. Details are not described herein again.

Figure 29:
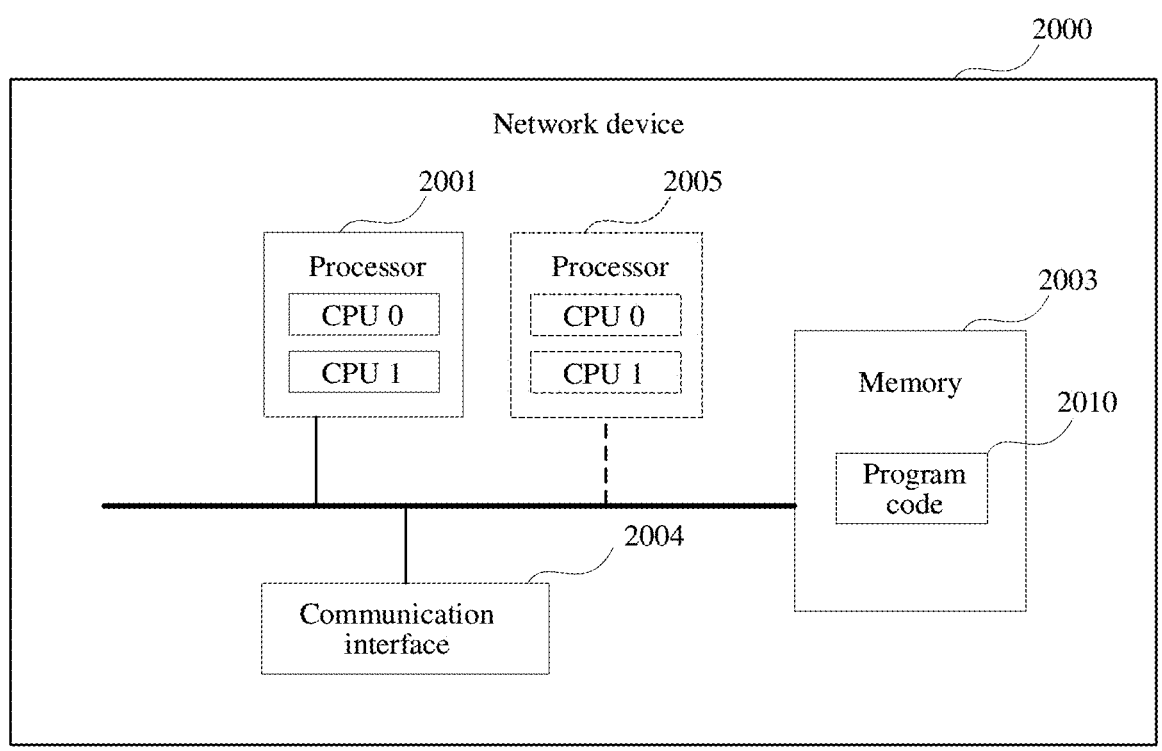
FIG. 29 is a schematic diagram of a structure of a network device according to an embodiment of this application.

FIG. 29 is a schematic diagram of a structure of a network device 2000 according to an example embodiment of this application. The network device 2000 shown in FIG. 29 may be a packet transmission device, and is configured to perform the packet transmission method shown in FIG. 2 to FIG. 25. For example, the network device 2000 may perform operations related to any one of the first PE and the second PE in the packet transmission method shown in FIG. 2 to FIG. 25. Alternatively, the network device 2000 is a correspondence obtaining device, and is configured to perform the correspondence obtaining method. The network device 2000 is, for example, a switch or a router, and the network device 2000 may be implemented by using a general bus architecture.

As shown in FIG. 29, the network device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor may implement or execute various logical blocks, modules, and circuits described with reference to the content disclosed in embodiments of the present invention. Alternatively, the processor may be a combination of processors implementing a computing function, for example, a combination of one or more microprocessors, or a combination of the DSP and the microprocessor.

Optionally, the network device 2000 further includes a bus. The bus is configured to transmit information between components of the network device 2000. The bus may be a peripheral component interconnect (PCI for short) bus, an extended industry standard architecture (EISA for short) bus, or the like. The bus may include an address bus, a data bus, a control bus, and the like. For ease of representation, only one thick line is used in FIG. 29 for representation, but it does not indicate that there is only one bus or only one type of bus.

The memory 2003 is, for example, a read-only memory (ROM) or another type of static storage device that can store static information and instructions, for another example, a random access memory (RAM) or another type of dynamic storage device that can store information and instructions, for another example, an electrically erasable programmable read-only memory (EEPROM), a compact disc read-only memory (CD-ROM) or other optical disk storage, an optical disk storage (including compact disc, laser disc, optical disc, digital versatile disc, Blu-ray disc, and the like), a magnetic disk storage medium or another magnetic storage device, or any other medium that can be used to carry or store desired program code in a form of an instruction or a data structure and that can be accessed by a computer, but is not limited thereto. For example, the memory 2003 exists independently, and is connected to the processor 2001 by using the bus. Alternatively, the memory 2003 may be integrated with the processor 2001.

The communication interface 2004 uses any apparatus such as a transceiver, and is configured to communicate with another device or a communication network. The communication network may be an Ethernet, a radio access network (RAN), a wireless local area network (WLAN), or the like. The communication interface 2004 may include a wired communication interface, or may include a wireless communication interface. Specifically, the communication interface 2004 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 2004 may be used by the network device 2000 to communicate with another device.

During specific implementation, in an embodiment, the processor 2001 may include one or more CPUs, for example, a CPU 0 and a CPU 1 shown in FIG. 29. Each of these processors may be a single-core processor (single-CPU), or may be a multi-core processor (multi-CPU). The processor herein may be one or more devices, circuits, and/or processing cores configured to process data (for example, computer program instructions).

During specific implementation, in an embodiment, the network device 2000 may include a plurality of processors, for example, a processor 2001 and a processor 2005 shown in FIG. 29. Each of these processors may be a single-core processor (single-CPU), or may be a multi-core processor (multi-CPU). The processor herein may be one or more devices, circuits, and/or processing cores configured to process data (for example, computer program instructions).

In some embodiments, the memory 2003 is configured to store program code 2010 for executing the solutions of this application, and the processor 2001 may execute the program code 2010 stored in the memory 2003. In other words, the network device 2000 may implement, by using the processor 2001 and the program code 2010 in the memory 2003, the packet transmission method or the correspondence obtaining method provided in the method embodiment. The program code 2010 may include one or more software modules. Optionally, the processor 2001 may alternatively store program code or instructions for executing the solutions of this application.

In a specific embodiment, the network device 2000 in this embodiment of this application may correspond to the first PE in the foregoing packet transmission method embodiments or correspondence obtaining method embodiments, and the processor 2001 in the network device 2000 reads the instructions in the memory 2003, so that the network device 2000 shown in FIG. 29 can perform all or some of operations performed by the first PE.

Specifically, the processor 2001 is configured to send a second packet to a second device through the communication interface, where the second packet includes an updated first part and a node address list, and the updated first part indicates a location, in the node address list, of a next device that is of the second device and that processes the packet. For brevity, another optional implementation is not described herein again.

For another example, the network device 2000 in this embodiment of this application may correspond to the second PE in the foregoing method embodiments. The processor 2001 in the network device 2000 reads the instructions in the memory 2003, so that the network device 2000 shown in FIG. 29 can perform all or some of operations performed by the second PE.

Specifically, the processor 2001 is configured to receive, through the communication interface, a third BIER packet sent by the first PE to the second PE, where the second BIER packet includes a second identifier. For brevity, another optional implementation is not described herein again.

The network device 2000 may further correspond to the packet transmission apparatus shown in FIG. 26 and FIG. 27 or the correspondence obtaining apparatus shown in FIG. 28. Each functional module in the packet transmission apparatus or the correspondence obtaining apparatus is implemented by using software of the network device 2000. In other words, the functional module included in the packet transmission apparatus or the correspondence obtaining apparatus is generated after the processor 2001 of the network device 2000 reads the program code 2010 stored in the memory 2003.

The steps of the packet transmission method or the correspondence obtaining method shown in FIG. 2 to FIG. 25 are completed by using an integrated logic circuit of hardware in the processor of the network device 2000 or instructions in a form of software. The steps of the method disclosed with reference to embodiments of this application may be directly performed and completed by using a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing method in combination with the hardware of the processor. To avoid repetition, details are not described herein again.

Figure 30:
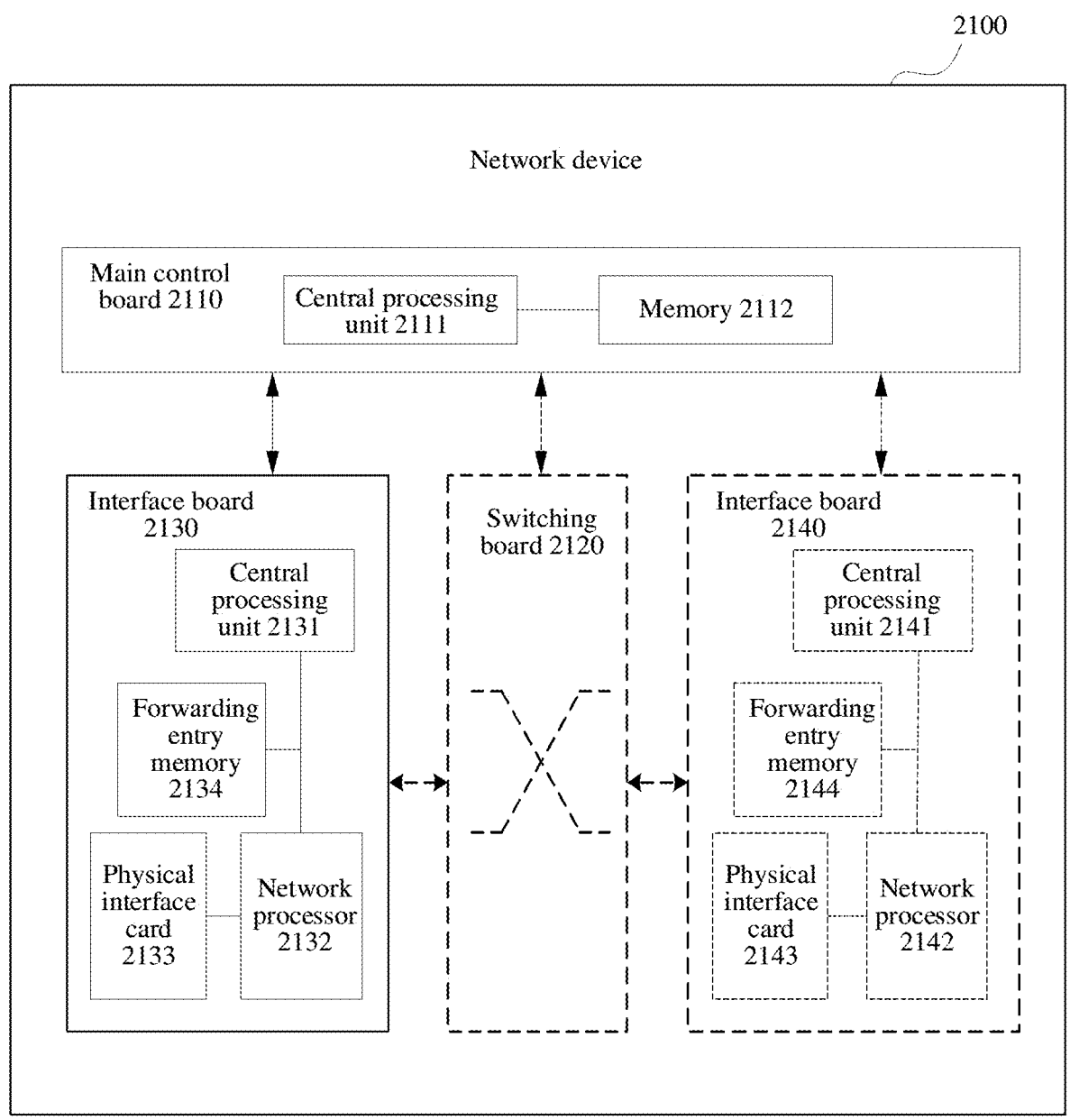
FIG. 30 is a schematic diagram of a structure of a network device according to an embodiment of this application.

FIG. 30 is a schematic diagram of a structure of a network device 2100 according to another example embodiment of this application. The network device 2100 shown in FIG. 30 may be a packet transmission device, and is configured to perform the packet transmission method shown in FIG. 2 to FIG. 25. For example, the network device 2100 may perform operations related to any one of the first PE and the second PE in the packet transmission method shown in FIG. 2 to FIG. 25. Alternatively, the network device 2100 is a correspondence obtaining device, and is configured to perform the correspondence obtaining method. The network device 2100 is, for example, a switch or a router, and the network device 2000 may be implemented by using a general bus architecture.

As shown in FIG. 30, the network device 2100 includes a main control board 2110 and an interface board 2130.

The main control board is also referred to as a main processing unit (MPU) or a route processor card. The main control board 2110 is configured to: control and manage each component in the network device 2100, including functions of route calculation, device management, device maintenance, and protocol processing. The main control board 2110 includes a central processing unit 2111 and a memory 2112.

The interface board 2130 is also referred to as a line interface unit card (LPU), a line card, or a service board. The interface board 2130 is configured to: provide various service interfaces and implement data packet forwarding. The service interface includes but is not limited to an Ethernet interface, a POS (packet over SONET/SDH) interface, and the like. The Ethernet interface is, for example, a flexible Ethernet service interface (FlexE Clients). The interface board 2130 includes: a central processing unit 2131, a network processor 2132, a forwarding entry memory 2134, and a physical interface card (PIC) 2133.

The central processing unit 2131 on the interface board 2130 is configured to: control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a network processor (NP). In some embodiments, the forwarding chip may be implemented by using an application-specific integrated circuit (ASIC) or a field programmable gate array (FPGA). Specifically, the network processor 2132 is configured to: forward a received packet based on a forwarding entry stored in the forwarding entry memory 2134; and if a destination address field of the packet is an address of the network device 2100, continue to send the packet to an upper layer device for processing by the CPU (for example, the central processing unit 2131); or if a destination address field of the packet is not an address of the network device 2100, find, based on the destination address field, a next hop and an outbound interface corresponding to the destination address field from the forwarding entry, and forward the packet to the outbound interface corresponding to the destination address field. Processing an uplink packet may include: processing an inbound interface of the packet and searching a forwarding entry. Processing a downlink packet may include: searching a forwarding entry, and the like. In some embodiments, the central processing unit may also perform a function of a forwarding chip, for example, implement software forwarding based on a general-purpose CPU, so that no forwarding chip is required in the interface board.

The physical interface card 2133 is configured to implement a physical layer interconnection function, so that original traffic enters the interface board 2130, and a processed packet is sent out from the physical interface card 2133. The physical interface card 2133 is also referred to as a subcard, may be installed on the interface board 2130, and is responsible for converting an optical/electrical signal into a packet, performing validity check on the packet, and then forwarding the packet to the network processor 2132 for processing. In some embodiments, the central processing unit 2131 may also perform a function of the network processor 2132, for example, implement software forwarding based on a general-purpose CPU. Therefore, the network processor 2132 is not required in the physical interface card 2133.

Optionally, the network device 2100 includes a plurality of interface boards. For example, the network device 2100 further includes an interface board 2140. The interface board 2140 includes a central processing unit 2141, a network processor 2142, a forwarding entry memory 2144, and a physical interface card 2143. Functions and implementations of components in the interface board 2140 are the same as or similar to those of the interface board 2130, and details are not described herein again.

Optionally, the network device 2100 further includes a switching board 2120. The switching board 2120 may also be referred to as a switch fabric unit (SFU). When the packet transmission device has a plurality of interface boards, the switching board 2120 is configured to complete data exchange between the interface boards. For example, the interface board 2130 and the interface board 2140 may communicate with each other by using the switching board 2120.

The main control board 2110 is coupled to the interface board. For example, the main control board 2110, the interface board 2130, the interface board 2140, and the switching board 2120 are connected to the system backplane by using a system bus to implement interworking. In a possible implementation, an inter-process communication (IPC) protocol channel is established between the main control board 2110, the interface board 2130, and the interface board 2140. The main control board 2110 communicates with the interface board 2130 and the interface board 2140 through the IPC channel.

Logically, the network device 2100 includes a control plane and a forwarding plane. The control plane includes a main control board 2110 and a central processing unit 2111. The forwarding plane includes components that perform forwarding, for example, a forwarding entry memory 2134, a physical interface card 2133, and a network processor 2132. The control plane performs functions such as a router, generating a forwarding entry, processing signaling and protocol packets, and configuring and maintaining a state of the network device. The control plane delivers the generated forwarding entry to the forwarding plane. On the forwarding plane, the network processor 2132 searches, based on the forwarding entry delivered by the control plane, a table for forwarding the packet received by the physical interface card 2133. The forwarding entry delivered by the control plane may be stored in the forwarding entry memory 2134. In some embodiments, the control plane and the forwarding plane may be completely separated, and are not on a same network device.

It should be noted that there may be one or more main control boards, and when there are a plurality of main control boards, there may be an active main control board and a standby main control board. There may be one or more interface boards. A stronger data processing capability of the packet transmission device indicates more interface boards that are provided. An interface board can also have one or more physical interface cards. There may be no switching boards, or there may be one or more switching boards. If there are a plurality of switching boards, the switching boards can work in load-sharing mode. In a centralized forwarding architecture, the packet transmission device does not need the switching board, and the interface board processes service data of the entire system. In a distributed forwarding architecture, the packet transmission device may have at least one switching board, and data exchange between a plurality of interface boards is implemented by using the switching board, thereby providing large-capacity data exchange and processing capabilities. Therefore, data access and processing capabilities of the packet transmission device in the distributed architecture are greater than those of the packet transmission device in the centralized architecture. Optionally, a form of the packet transmission device may alternatively be that there is only one board, that is, there is no switching board, and functions of the interface board and the main control board are integrated on the board. In this case, the central processing unit on the interface board and the central processing unit on the main control board may be combined into one central processing unit on the board to execute the superimposed functions of the two central processing units. This form of packet transmission device (for example, a network device such as a low-end switch or router) has low data exchange and processing capabilities. A specific architecture to be used depends on a specific networking deployment scenario, and is not limited herein.

In a specific embodiment, the network device 2100 corresponds to the packet transmission apparatus used in the first PE shown in FIG. 26. In some embodiments, the receiving module 2601 and the transmission module 2603 in the packet transmission apparatus shown in FIG. 26 are equivalent to the physical interface card 2133 in the network device 2100. The determining module 2602 is equivalent to the central processing unit 2111 or the network processor 2132 in the network device 2100.

In some embodiments, the network device 2100 further corresponds to the packet transmission apparatus used in the second PE shown in FIG. 27. In some embodiments, the receiving module 2701 and the transmission module 2703 in the packet transmission apparatus shown in FIG. 27 are equivalent to the physical interface card 2133 in the network device 2100. The determining module 2702 is equivalent to the central processing unit 2111 or the network processor 2132 in the network device 2100.

In some embodiments, the network device 2100 further corresponds to the correspondence obtaining apparatus used in the first PE shown in FIG. 28. In some embodiments, the obtaining module 2801 in the correspondence obtaining apparatus shown in FIG. 28 is equivalent to the physical interface card 2133 in the network device 2100. The determining module 2802 is equivalent to the central processing unit 2111 or the network processor 2132 in the network device 2100.

Based on the network devices shown in FIG. 29 and FIG. 30, an embodiment of this application further provides a packet transmission system. The system includes a first PE and a second PE. Optionally, the first PE is the network device 2000 shown in FIG. 29 or the network device 2100 shown in FIG. 30, and the second PE is the network device 2000 shown in FIG. 29 or the network device 2100 shown in FIG. 30.

For a packet transmission method performed by the first PE and the second PE, refer to related descriptions of the first PE and the second PE in embodiments shown in FIG. 2 to FIG. 25. Details are not described herein again.

Based on the network devices shown in FIG. 29 and FIG. 30, an embodiment of this application further provides a correspondence obtaining system. The system includes a first PE and a second PE. Optionally, the first PE is the network device 2000 shown in FIG. 29 or the network device 2100 shown in FIG. 30.

For a packet transmission method performed by the first PE, refer to related descriptions of the first PE in embodiments shown in FIG. 2 to FIG. 25. Details are not described herein again.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform a packet transmission method or a correspondence obtaining method that needs to be performed by the first PE.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform a packet transmission method that needs to be performed by the second PE.

It should be understood that the processor may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set machine (ARM) architecture.

Further, in an optional embodiment, the memory may include a read-only memory and a random access memory, and provide instructions and data for the processor. The memory may further include a non-volatile random access memory. For example, the memory may further store information about a device type.

The memory may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative descriptions, many forms of RAM are available, for example, a static random access memory (static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

An embodiment of this application further provides a computer-readable storage medium. The computer-readable storage medium includes instructions or code. When the instructions or the code are or is executed on a computer, the computer is enabled to perform any one of the foregoing packet transmission methods.

An embodiment of this application further provides a computer-readable storage medium. The computer-readable storage medium includes instructions or code. When the instructions or the code are or is executed on a computer, the computer is enabled to perform any one of the foregoing correspondence obtaining methods.

An embodiment of this application further provides a computer program product. The computer program product includes a program or code. When the program or the code is run on a computer, the computer is enabled to perform any one of the foregoing packet transmission methods.

An embodiment of this application further provides a computer program product. The computer program product includes a program or code. When the program or the code is run on a computer, the computer is enabled to perform any one of the foregoing correspondence obtaining methods.

An embodiment of this application further provides a chip, including a processor, configured to: invoke, from a memory, instructions stored in the memory and run the instructions, to enable a communication device on which the chip is installed to perform any one of the foregoing packet transmission methods.

An embodiment of this application further provides another chip, including an input interface, an output interface, a processor, and a memory. The input interface, the output interface, the processor, and the memory are connected through an internal connection path. The processor is configured to execute code in the memory. When the code is executed, the processor is configured to perform any one of the foregoing packet transmission methods.

An embodiment of this application further provides a chip, including a processor, configured to: invoke, from a memory, instructions stored in the memory and run the instructions, to enable a communication device on which the chip is installed to perform any one of the foregoing correspondence obtaining methods.

An embodiment of this application further provides another chip, including an input interface, an output interface, a processor, and a memory. The input interface, the output interface, the processor, and the memory are connected through an internal connection path. The processor is configured to execute code in the memory. When the code is executed, the processor is configured to perform any one of the foregoing correspondence obtaining methods.

An embodiment of this application further provides a packet transmission system. The packet transmission system includes a first provider edge PE and a second PE. The first PE performs operations related to the first PE in the packet transmission method shown in FIG. 2 to FIG. 25. The second PE performs operations related to any device of the first PE and the second PE in the foregoing packet transmission method shown in FIG. 2 to FIG. 25.

An embodiment of this application further provides a correspondence obtaining system. The correspondence obtaining system includes a first PE and a second PE. The second PE sends BIER information of the second PE and BIER information of a third CE, and the third CE is a device in a first virtual private network VPN. The first PE performs operations related to the first PE in the foregoing correspondence obtaining method shown in FIG. 2 to FIG. 25.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive), or the like.

A person of ordinary skill in the art may be aware that, with reference to the method steps and modules described in embodiments disclosed in this specification, the method steps and modules can be implemented by using software, hardware, firmware, or any combination thereof. To clearly describe interchangeability between the hardware and the software, the steps and compositions of embodiments have been generally described in terms of functions in the foregoing descriptions. Whether the functions are performed by using hardware or software depends on particular applications and design constraint conditions of the technical solutions. A person of ordinary skill in the art may use different methods to implement the described functions for each particular application, but it should not be considered that the implementation goes beyond the scope of this application.

A person of ordinary skill in the art may understand that all or some of the steps of the foregoing embodiments may be implemented by using hardware, or may be implemented by a program instructing related hardware. The program may be stored in a computer-readable storage medium. The storage medium mentioned above may be a read-only memory, a magnetic disk, a compact disc, or the like.

When software is used to implement the embodiments, all or some of the embodiments may be implemented in a form of a computer program product. The computer program product includes one or more computer program instructions. In an example, the method according to embodiments of this application may be described in the context of machine-executable instructions. For example, the machine-executable instructions are included in a program module that is in a component for execution on a real or virtual processor of a target. Usually, program modules include routines, programs, libraries, objects, classes, components, data structures, and the like, and perform specific tasks or implement specific abstract data structures. In various embodiments, the functions of the program modules may be combined or split between the described program modules. The machine-executable instructions for the program modules may be executed locally or in a distributed device. In the distributed device, program modules may be located in both local and remote storage media.

Computer program code used to implement the method according to embodiments of this application may be written in one or more programming languages. The computer program code may be provided to a processor of a general-purpose computer, a dedicated computer, or another programmable data processing apparatus, so that when the program code is executed by the computer or another programmable data processing apparatus, a function/operation specified in the flowchart and/or block diagram is implemented. The program code may be executed completely on a computer, partially on a computer, as a stand-alone software package, partially on a computer and partially on a remote computer, or completely on a remote computer or server.

In the context of embodiments of this application, computer program code or related data may be carried in any appropriate carrier, so that the device, the apparatus, or the processor can perform various processing and operations described above. Examples of the carrier include a signal, a computer-readable medium, and the like.

Examples of the signal may include electrical, optical, radio, acoustic, or another form of propagated signal, such as a carrier wave or an infrared signal.

The machine-readable medium may be any tangible medium that includes or stores programs for or with respect to an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

It may be clearly understood by a person skilled in the art that, for the purpose of convenient and brief description, for a specific working process of the foregoing system, device, and module, refer to a corresponding process in the foregoing method embodiments. Details are not described herein again.

In the several embodiments provided in this application, it should be understood that the disclosed system, device, and method may be implemented in other manners. For example, the described device embodiment is merely an example. For example, division into the modules is merely logical function division and may be other division during actual implementation. For example, a plurality of modules or components may be combined or integrated into another system, or some features may be ignored or not performed. In addition, the displayed or discussed mutual couplings or direct couplings or communication connections may be indirect couplings or communication connections through some interfaces, devices, or modules, or may be implemented in electrical, mechanical, or other forms of connection.

The modules described as separate parts may or may not be physically separated, and parts displayed as modules may or may not be physical modules, may be located in one location, or may be distributed on a plurality of network modules. Some or all of the modules may be selected based on an actual requirement to implement the objectives of the solutions in embodiments of this application.

In addition, functional modules in embodiments of this application may be integrated into one processing module, or each module may exist alone physically, or two or more modules may be integrated into one module. The foregoing integrated module may be implemented in a form of hardware, or may be implemented in a form of a software functional module.

If the integrated module is implemented in a form of a software functional module and sold or used as an independent product, the integrated module may be stored in a computer-readable storage medium. Based on this understanding, the technical solutions of this application essentially, or the part contributing to the prior art, or all or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application. The foregoing storage medium includes any medium that can store program code, such as a USB flash drive, a removable hard disk, a read-only memory (ROM), a random access memory (RAM), a magnetic disk, or a compact disc.

In this application, terms such as "first" and "second" are used to distinguish between same items or similar items that have basically same roles and functions. It should be understood that there is no logical or time sequence dependency between "first", "second", and "$n^{th}$". A quantity and an execution sequence are not limited. It should also be understood that although the following description uses the terms first, second, and the like to describe various elements, these elements should not be limited by the terms. These terms are simply used to distinguish one element from another. For example, a first image may be referred to as a second image without departing from the scope of the various described examples, and similarly, the second image may be referred to as the first image. Both the first image and the second image may be images, and may be separate and different images in some cases.

It should be further understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

In this application, the term "at least one" means one or more, and the term "a plurality of" in this application means two or more. For example, a plurality of second packets means two or more second packets. The terms "system" and "network" are often used interchangeably herein.

It should be understood that the terms used in the descriptions of the various examples herein are merely intended to describe specific examples and are not intended to limit this application. As used in the descriptions of the various examples and in the appended claims, singular forms "one ("a", "an")" and "the" are intended to include plural forms as well, unless otherwise specified in the context clearly.

It should also be understood that the term "and/or" used herein refers to and covers any and all possible combinations of one or more of the associated listed items. The term "and/or" is an association relationship between associated objects and indicates that there may be three relationships. For example, A and/or B may represent the following three cases: Only A exists, both A and B exist, and only B exists. In addition, the character "/" in this application usually indicates an "or" relationship between the associated objects.

It should be further understood that when being used in this specification, the term "include" (also referred to as "includes", "including", "comprises", and/or "comprising") specify that the stated features, integers, steps, operations, elements, and/or components are present, but it is not excluded that one or more other features, integers, steps, operations, elements, components, and/or groupings thereof are present or added.

It should be further understood that the terms "if" may be interpreted to mean "when" ("when" or "upon") or "in response to determining" or "in response to detecting". Similarly, based on the context, the phrase "if it is determined . . . " or "if [the stated condition or event] is detected" may be interpreted to mean "when determining", "in response to determining", "when detecting [the stated condition or event]", or "in response to detecting [the stated condition or event]".

It should be understood that determining B based on A does not mean that B is determined only based on A, and B may also be determined based on A and/or other information.

It should be further understood that "one embodiment", "an embodiment", and "a possible implementation" mentioned throughout the specification mean that a specific feature, structure, or characteristic related to the embodiment or implementation is included in at least one embodiment of this application. Therefore, "in one embodiment", "in an embodiment", or "a possible implementation" appearing throughout the specification may not necessarily refer to a same embodiment. In addition, these particular features, structures, or characteristics may be combined in one or more embodiments in any suitable manner.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A method, applied to a first provider edge (PE), the method comprising:
    receiving, by the first PE, a first bit index explicit replication (BIER) packet sent by a first customer edge (CE);
    determining, by the first PE based on the first BIER packet, a first virtual private network (VPN) to which the first CE belongs; and
    transmitting, by the first PE, the first BIER packet based on the first VPN.

2. The method according to claim 1, wherein transmitting, by the first PE, the first BIER packet based on the first VPN comprises:
    determining, by the first PE, a first forwarding bit mask based on the first VPN and a first relationship, and transmitting the first BIER packet based on the first forwarding bit mask, wherein the first relationship comprises a correspondence between an identifier of the first VPN and the first forwarding bit mask, the first forwarding bit mask is obtained based on a bit-forwarding router identifier (BFR ID) of a second CE receiving the first BIER packet, and the second CE is a device in the first VPN.

3. The method according to claim 1, wherein transmitting, by the first PE, the first BIER packet based on the first VPN comprises:
    determining, by the first PE, a second forwarding bit mask and a second identifier based on the first VPN and a second relationship, and transmitting the first BIER packet based on the second forwarding bit mask, wherein the second relationship comprises a correspondence between the second forwarding bit mask, an identifier of the first VPN, and the second identifier, the second forwarding bit mask is obtained based on a bit-forwarding router identifier (BFR ID) of a third CE receiving the first BIER packet, the second identifier is used by a second PE to identify the first VPN to which the first BIER packet belongs, and the third CE receives the first BIER packet via the second PE.

4. The method according to claim 2, wherein the first relationship further comprises a first packet encapsulation type field; and
    wherein transmitting the first BIER packet based on the first forwarding bit mask comprises:
        encapsulating, by the first PE, the first BIER packet based on a first encapsulation type indicated by the first packet encapsulation type field in the first relationship, to obtain a second BIER packet; and
        transmitting, by the first PE, the second BIER packet to the second CE based on the first forwarding bit mask.

5. The method according to claim 3, wherein the second relationship further comprises a second packet encapsulation type field; and
    wherein transmitting the first BIER packet based on the second forwarding bit mask comprises:
        encapsulating, by the first PE, the first BIER packet based on a second encapsulation type indicated by the second packet encapsulation type field in the second relationship, to obtain a third BIER packet, wherein the third BIER packet comprises the second identifier; and
        transmitting, by the first PE, the third BIER packet to the second PE based on the second forwarding bit mask.

6. The method according to claim 4, wherein the first encapsulation type comprises: BIER over IPv6 unicast, BIER over BIER multicast BIERv6, BIER over IPv6 multicast, BIER over IPv4 unicast, BIER over BIER, BIER over IPv4 multicast, or BIER over multi-protocol label switching (MPLS) multicast.

7. The method according to claim 5, wherein the second encapsulation type comprises: BIER over IPv6 unicast, BIER over BIER multicast BIERv6, BIER over IPv6 multicast, BIER over IPv4 unicast, BIER over BIER, BIER over IPv4 multicast, or BIER over multi-protocol label switching (MPLS) multicast.

8. The method according to claim 7, wherein:
    when the second encapsulation type comprises the BIER over IPv6 unicast, a destination address field of the third BIER packet comprises the second identifier; or
    when the second encapsulation type comprises the BIER over MPLS multicast, an MPLS label of the third BIER packet comprises the second identifier.

9. The method according to claim 1, wherein the first PE is located in a first network and a provider network, the provider network is connected to the first network and a second network, and the first CE is located in the first network.

10. The method according to claim 3, wherein the second PE is located in a second network and a provider network.

11. An apparatus, wherein the apparatus is used in a first provider edge (PE), the apparatus comprises:
    a memory storing instructions that are executable by at least one processor; and
    the at least one processor coupled to the memory, configured to execute the instructions to:
        obtain bit index explicit replication (BIER) information, wherein the BIER information comprises at least one of first BIER information and second BIER information, the first BIER information comprises BIER information of a second customer edge (CE), the second BIER information comprises BIER information of a second PE and BIER information of a third CE that are sent by the second PE, and the second CE and the third CE are devices in a first virtual private network (VPN); and
        determine a correspondence based on the BIER information, wherein the correspondence is used by the first PE to transmit a BIER packet.

12. The apparatus according to claim 11, wherein the correspondence comprises at least one of a first relationship or a second relationship;
    wherein the first relationship comprises a first forwarding bit mask and an identifier of the first VPN, the first forwarding bit mask is obtained based on a bit-forwarding router identifier (BFR ID) of the second CE, and the identifier of the first VPN is used by the first PE to identify the first VPN to which the second CE belongs; and
    wherein the second relationship comprises a second forwarding bit mask, the identifier of the first VPN, and a second identifier, the second forwarding bit mask is obtained based on a BFR ID of the third CE, the second identifier is used by the second PE to identify a VPN to which the BIER packet belongs, and the third CE receives the BIER packet via the second PE.

13. The apparatus according to claim 12, wherein the BIER information of the second CE comprises the BFR ID of the second CE; and
    wherein the at least one processor is configured to execute the instructions to determine the first forwarding bit mask based on the BFR ID of the second CE, determine the identifier of the first VPN based on a VPN bound to a connection interface between the first PE and the second CE, and determine the first relationship based on the first forwarding bit mask and the identifier of the first VPN.

14. The apparatus according to claim 12, wherein the BIER information of the second PE comprises the second identifier, the BIER information of the second PE further comprises at least one of a route distinguisher (RD) or a route target (RT), the RD and the RT identify a VPN, and the BIER information of the third CE comprises the BFR ID of the third CE; and
wherein the at least one processor is configured to execute the instructions to determine the second forwarding bit mask based on the BFR ID of the third CE, determine the identifier of the first VPN based on the RD or the RT, determine the second identifier based on the BIER information of the second PE, and determine the second relationship based on the second forwarding bit mask, the identifier of the first VPN, and the second identifier.

15. The apparatus according to claim 14, wherein the BIER information of the second PE further comprises an originating router internet protocol (IP) address of the second PE; and
wherein the at least one processor is configured to execute the instructions to determine, based on the originating router IP address in the BIER information of the second PE, that the second PE is used as a remote neighbor of the first PE, wherein the second PE comprises the originating router IP address that is the same as that of the third CE; and determine the second identifier based on the BIER information of the second PE.

16. The apparatus according to claim 11, wherein after obtaining the BIER information, the at least one processor is configured to further execute the instructions to:

generate a link state database based on the BIER information of the third CE; and
advertise the link state database to a first CE, wherein the first CE is a device in the first VPN.

17. The apparatus according to claim 16, wherein the at least one processor is configured to execute the instructions to generate the link state database based on the BFR ID of the third CE being valid.

18. The apparatus according to claim 16, wherein the at least one processor is configured to execute the instructions to:
send first signaling to the first CE, wherein the first signaling carries the link state database, and the first signaling comprises BIER via border gateway protocol (BGP) signaling, BIER via intermediate system to intermediate system (ISIS) signaling, or BIER via open shortest path first (OSPF) signaling.

19. The apparatus according to claim 11, wherein the at least one processor is configured to execute the instructions to receive second signaling sent by the second PE, wherein the second signaling carries the second BIER information; and
wherein the second signaling comprises BIER via border gateway protocol (BGP) signaling, BIER via intermediate system to intermediate system (ISIS) signaling, or BIER via open shortest path first (OSPF) signaling.

20. The apparatus according to claim 19, wherein:
when the second signaling comprises the BIER via BGP signaling, a second identifier is carried in a BIER service identifier attribute in the BIER via BGP signaling, the BFR ID of the third CE is carried in a BIER service encapsulation attribute in the BIER via BGP signaling, and the RT is carried in an extended community attribute in the BIER via BGP signaling.

* * * * *